(12) United States Patent
Keith

(10) Patent No.: US 6,388,417 B1
(45) Date of Patent: May 14, 2002

(54) HIGH STABILITY DYNAMIC FORCE MOTOR

(75) Inventor: F. Joseph Keith, Richmond, VA (US)

(73) Assignee: Macrosonix Corporation, Richmond, VA (US)

( * ) Notice: Subject to any disclaimer, the term of this patent is extended or adjusted under 35 U.S.C. 154(b) by 0 days.

(21) Appl. No.: 09/455,180

(22) Filed: Dec. 6, 1999

(51) Int. Cl.$^7$ ................................................ H02P 7/36
(52) U.S. Cl. ....................... 318/701; 318/638; 318/639; 318/700; 318/799
(58) Field of Search .............. 318/638, 701, 318/799, 639

(56) References Cited

U.S. PATENT DOCUMENTS

| | | | |
|---|---|---|---|
| 1,945,015 A | 1/1934 | Wurzbach et al. | 172/126 |
| RE19,817 E | 1/1936 | Wurzbach et al. | 172/126 |
| 2,180,189 A | 11/1939 | Alvord | 172/240 |
| 2,434,337 A | 1/1948 | Soderstrom | 172/126 |
| 3,219,969 A | 11/1965 | Snavely | 340/8 |
| 3,293,515 A | 12/1966 | Klemm | 318/37 |
| 3,670,223 A | 6/1972 | Pommeret | 318/124 |
| 3,775,625 A * | 11/1973 | Brosch et al. | 310/19 |
| 3,947,155 A | 3/1976 | Bidol | 417/417 |
| 3,956,678 A * | 5/1976 | Byrne et al. | 318/138 |
| 4,053,817 A | 10/1977 | Yeasting | 318/138 |
| 4,143,308 A * | 3/1979 | Deplante et al. | 318/138 |
| 4,179,630 A | 12/1979 | Stuber | 310/15 |
| 4,360,770 A * | 11/1982 | Ray et al. | 318/701 |
| 4,563,619 A | 1/1986 | Davis et al. | 318/138 |
| 4,661,756 A * | 4/1987 | Murphy et al. | 318/701 |
| 4,663,536 A * | 5/1987 | Roesel, Jr. et al. | 290/7 |
| 4,684,867 A * | 8/1987 | Miller et al. | 318/701 |
| 4,698,576 A | 10/1987 | Maresca | 318/687 |
| 5,084,662 A * | 1/1992 | Palaniappan et al. | 318/701 |
| 5,206,839 A | 4/1993 | Murray | 367/175 |
| 5,266,854 A | 11/1993 | Murray | 310/36 |
| 5,304,882 A * | 4/1994 | Lipo et al. | 318/156 |
| 5,375,101 A | 12/1994 | Wolfe et al. | 367/175 |

(List continued on next page.)

FOREIGN PATENT DOCUMENTS

| | | |
|---|---|---|
| EP | 0580117 | 1/1994 |
| EP | 0678972 | 10/1995 |
| EP | 0778661 | 6/1997 |
| EP | 09294394 | 11/1997 |
| EP | 0952663 | 10/1999 |
| GB | 2273212 | 6/1994 |
| WO | 9848172 | 12/1997 |

OTHER PUBLICATIONS

Article—"Parametric Modeling and Control of a Long–Range Actuator Using Magnetic Servo Levitation", vol. 34, No. 5 (Sep. 1998), pp. 3689–3695.
Article—IEEE Transactions on Energy Conversion, vol. 14, No. 3, Sep., 1999—"Comparison of the Performance of a Linear Reluctance Oscillating Motor Operating Under AC Supply With One Under DC Supply", pp. 328–332.

*Primary Examiner*—Robert E. Nappi
*Assistant Examiner*—Tyrone Smith
(74) *Attorney, Agent, or Firm*—Foley & Lardner

(57) ABSTRACT

Motor control of a variable reluctance motor is obtained by providing a periodic voltage waveform to a coil of a motor. No coil current control or current or flux feedback is needed to obtain flux waveforms that allow for low-distortion or distortion-free operation of the motor. The periodic voltage waveform may be a sinusoidal or sawtooth signal, for example, and has a substantially zero mean for each cycle of the signal. The periodic voltage waveform may be offset to compensate for the resistance of the coil, and the coil current may be monitored in order to determine the amount of offset required. By providing a zero-mean or substantially zero-mean periodic voltage waveform, the coil current and flux in the gap between the core and the moving part are guaranteed to reach a zero value at some point during each period (or cycle) of the periodic voltage waveform.

41 Claims, 41 Drawing Sheets

U.S. PATENT DOCUMENTS

| | | | |
|---|---|---|---|
| 5,469,039 A | * 11/1995 | Stephenson et al. | 318/701 |
| 5,621,293 A | 4/1997 | Gennesseaux | 318/687 |
| 5,742,139 A | * 4/1998 | Kolomeitsev | 318/254 |
| 5,760,565 A | 6/1998 | Randall | 318/701 |
| 5,811,954 A | * 9/1998 | Randall | 318/701 |
| 5,825,113 A | 10/1998 | Lipo et al. | 310/181 |
| 5,883,478 A | 3/1999 | Thesling | 318/119 |
| 5,986,418 A | * 11/1999 | Horst et al. | 318/254 |
| 5,994,854 A | * 11/1999 | Lawrenson et al. | 318/114 |
| 5,998,945 A | * 12/1999 | Elliott | 318/254 |
| 6,014,002 A | * 1/2000 | Guinet | 318/701 |
| 6,051,942 A | * 4/2000 | French | 318/254 |
| 6,072,260 A | * 6/2000 | Randall | 310/216 |
| 6,078,161 A | * 6/2000 | Kim et al. | 318/701 |
| 6,087,799 A | * 7/2000 | Turner | 318/701 |
| 6,091,215 A | * 7/2000 | Lovett et al. | 318/254 |
| 6,097,126 A | * 8/2000 | Takura | 310/166 |
| 6,104,113 A | * 8/2000 | Beifus | 310/68 |
| 6,107,764 A | * 8/2000 | Blackburn | 318/254 |
| 6,181,092 B1 | * 1/2001 | Turner | 318/254 |

* cited by examiner

SINUSOIDAL FLUX WAVEFORMS - SET 2

FIG. 7
SIN DRIVE FLUX VS. PULSE DRIVE FLUX
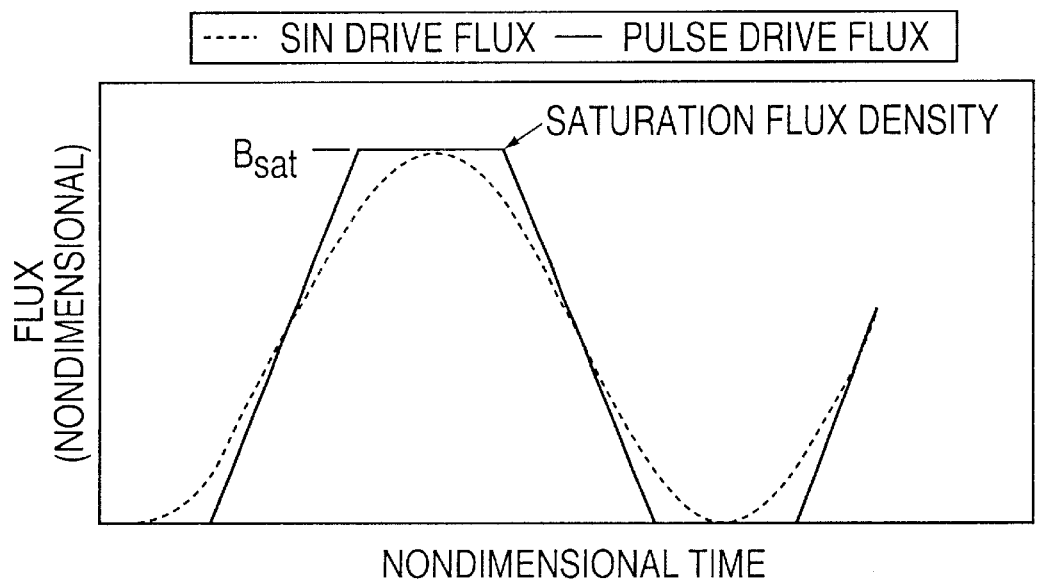
SIN DRIVE FORCE VS. PULSE DRIVE FORCE
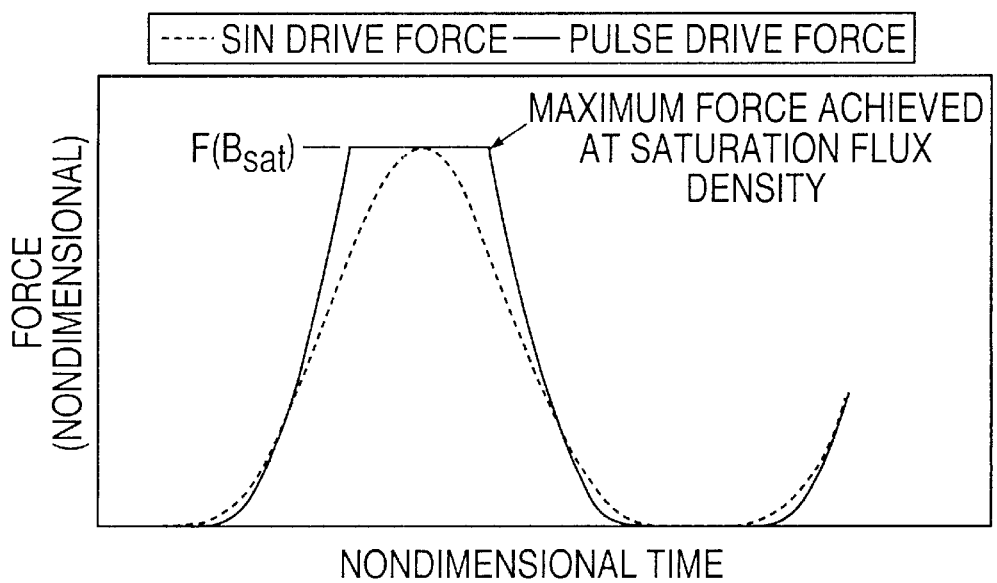

2V DIODE, 3 OHM COIL

HIGH STABILITY DYNAMIC FORCE MOTOR

BACKGROUND OF THE INVENTION

1. Field of the Invention

The present invention relates to variable reluctance dynamic force motors (or actuators) used to convert electrical energy into oscillating or reciprocating mechanical force.

2. Description of the Related Art

To produce a high reciprocating force with reasonable transduction efficiency, one often employs a variable reluctance electromagnetic motor (VR motor). In particular, VR motors are generally lighter and more efficient than electrodynamic (voice coil) motors capable of producing similar peak forces. However, VR motors, as commonly controlled, can exhibit substantial instabilities that must be overcome before useful operation is attained. These instabilities can be particularly severe when the motor stroke is a high percentage of the nominal gap length, a situation often encountered when driving dynamically reactive loads. Also, transient disturbances can also lead to instabilities in VR motors controlled according to common prior art methods.

Representative examples of the manner in which VR motors have traditionally been analyzed and operated can be found in U.S. Pat. Nos. 5,206,839 and 5,266,854 to Murray, and U.S. Pat. No. 5,375,101 to Wolfe et al. The method of control described in this prior art can be generally described as "current control." The following analyses (and assumptions) are common to these patents:

1. The flux established in a gapped electromagnetic device is proportional to the current in the electromagnet coil. Since the actual current-to-flux relation is described by $\phi \sim i/g$ (where $\phi$ is the flux in the gap, i is the current in the coil, and g is the length of the air gap), this assumption is only valid when the gap length g is constant.

2. The force developed across the air gap of a gapped electromagnetic device is proportional to the square of the established flux ($F \sim \phi^2$).

3. Therefore, $F \sim i^2$.

If VR motors could be operated effectively by simply appealing to point 3 (namely, that $F \sim i^2$), then one could generate an arbitrary force response by simply controlling the motor coil current to be the square root of the desired force. Unfortunately, for a dynamic force motor to deliver any real power to a load, the "movable" part must, in fact, experience displacement with respect to the "stationary" part (the "movable" and "stationary" parts of the motor are henceforth referred to as the armature and core, respectively). In other words, the gap length g in point 1 is not constant. Operation in this manner (allowing the motor parts to move) violates the "no gap motion" assumption expressed earlier, and, to a greater or lesser extent, invalidates the $F \sim i^2$ relationship. Or, put in another way, the actual relationship to consider is $F \sim (i/g)^2$.

One way of overcoming this complication of the $F \sim (i/g)^2$ relation is to require that the motor air gap(s) remain nearly constant. For example, if a motor has a nominal 1 mm unenergized air gap, one might choose to limit relative dynamic motion to 0.05 mm, or a 5% excursion of the nominal gap length. It is generally accepted by those skilled in the art that if the gap motion is tightly constrained in this manner, then $F \sim i^2$ reasonably represents the behavior of the motor. Furthermore, schemes that establish a substantial bias current in the motor coils and then employ small-signal perturbation techniques with respect to this bias point are common in the prior art. Prior art vibrators, such as the one described in U.S. Pat. No. 3,775,626 to Brosch, have noted that the air gap length must, for some material handling applications, be set large enough to be robust to changes in the operating conditions of the vibratory material handling system.

However, those skilled in the art will also appreciate that, for a given desired dynamic force, one can minimize the corresponding motor coil currents by minimizing the length of the air gap between the armature and the core. To do this, and still have a motor that can experience relatively large strokes, one must allow large gap excursions (up to 100% of the nominal unenergized gap length). In the presence of large gap excursions, the $F \sim i^2$ relation is no longer adequate to describe the behavior of the motor, and one must deal with the added nonlinearity exhibited by $F \sim (i/g)^2$.

An important attribute of the present invention (to be discussed in detail in another section) is the inherent stability that it provides in the context of VR motor control. In classical control theory, stability means that the output of the VR motor (either the relative positions of the armature and core, or the force generated between them) will not grow without bound due to a bounded input, initial condition, or unwanted disturbance. In other words, there will always be a reasonable, bounded relationship between the motor action requested via an input signal and the resulting actual motor action, even in the presence of external noise, transients, or other disturbances.

When evaluating the control stability consequences of the $F \sim (i/g)^2$ relationship that has been discussed previously, it is instructive to consider a simple example. In a one-sided motor structure such as that shown in FIG. 1, start with an initial fixed coil current Io that flows through coil 4, and an initial gap length 12 $G_0$ (denoted by label 12 in FIG. 1). Thus, the initial force between the two moving motor parts (core 2 and armature 8) will be, by $F \sim (ig)^2$, proportional to $(I_0/G_0)^2$. As this initial force acts to move the two motor parts closer together, the instantaneous gap length will decrease to values smaller than $G_0$, and as the gap reduces, the instantaneous force will increase as $1/g_2$, even while the coil current is held constant. With most common VR motors, the suspension stiffness is linear ($F = -kx$), but this increase in electromagnetic force is quadratic ($1g^2$), so the net effect can be a rapidly increasing force that moves the motor parts together until they collide and clamp. Or, for motor designs such as those described in U.S. Pat. No. 5,266,854 to Murray, the suspension can be stiff enough so that for small displacements from the nominal gap, the motor is stable, but for larger displacements, one experiences such "runaway" instability. In particular, see column 3 and FIG. 3 of U.S. Pat. No. 5,266,854 to Murray for further details. To more fully stabilize such "current-controlled" motors, one must vary the coil current in relation to the instantaneous gap length or measured magnetic flux via a feedback mechanism, and even these feedback circuits can suffer from bandwidth and gap displacement limitations.

Examples of prior art that addresses these concerns may be found in U.S. Pat. No. 5,621,293 to Gennesseaux, and "Parametric Modeling and Control of a Long-Range Actuator Using Magnetic Servo Levitation", IEEE Transactions on Magnetics, authored by H. Gutierrez and P. Ro (September, 1998). In Gennesseaux, gap-motion-induced instabilities are compensated via two distinct means: 1) measuring the actual armature motion with a displacement sensor and compensating the coil current accordingly and 2) measuring the air gap flux with a Hall-effect flux sensor and compensating the coil current accordingly. In Gutierrez & Ro, the authors attempt to compensate not only the gap-motion nonlinearities, but also distortions to the first-order relations introduced by material non-idealities, flux density non-uniformity, and the like. In both of these cases, extensive and complex controllers are used to achieve gap excursions larger than is common in the traditional art, but in neither case is evidence presented that large gap excursions, such as gap excursions approaching 100% are possible. U.S. Pat. No. 3,219,919 to Snavely also uses a position transducer and feedback circuit to compensate the F~(i/g)² relation.

It is worth noting that, historically, there have been a few predominant applications for VR motors. The first is for acoustic transduction, particularly in the generation of high-amplitude sound waves for underwater applications (sonar systems, for example). In such acoustic applications, designers were primarily interested in flat wide-band frequency response, stable transducer operation, and low distortion output. Similarly, VR motors are sometimes used to excite mechanical structures for the purpose of performing modal analyses, and for these applications, similar motor characteristics are valued. Generally, though, the control schemes common in the prior art are not sufficiently robust for the high gap excursions and highly dynamic reaction forces exhibited by such loads as resonant acoustic compressors.

Another predominant application for motor structures of this sort is for vibrator applications, especially in the context of vibratory material handling (conveying sand, beans, rocks, and other granular materials). Primarily, the vibrator community is interested in physically robust vibratory devices, simple operation, and low cost. Typical vibrators are run at 50/60 Hz (line frequencies) or integer multiples or sub-multiples of these frequencies.

As discussed above, the VR motor/vibrator communities have often resorted to closed-loop feedback schemes to enhance the stability of VR motors. Ironically, the present invention demonstrates that, properly understood, maximum stability when operating a dynamic force VR motor is achieved by simply removing all feedback mechanisms, leading one to the unobvious result that the highest operational stability with such devices is achieved with no feedback at all.

SUMMARY OF THE INVENTION

An object of this invention to overcome the aforementioned limitations formerly associated with VR motors by providing an apparatus and/or method whereby a VR dynamic force motor can be operated stably over a wide range of frequencies with gap excursions approaching 100%.

Another object of this invention is to provide a VR motor drive scheme that demonstrates low-distortion characteristics previously associated with current-control schemes via open-loop, stable, voltage control schemes.

Another object of this invention is to provide for large gap excursion operation with relatively simple, high efficiency control schemes.

Another object of this invention is to provide for variable amplitude operation of a VR motor where the force amplitude is controlled via relatively simple, open-loop control schemes.

Another object of this invention is to provide for large gap excursion operation with efficient, open-loop drive systems that employ no feedback.

Another object of this invention is to provide "flat" force output over a wide range of frequencies while not resorting to the current feedback approaches common in the prior art.

Another object of this invention is to provide open-loop-stable operation of a VR motor when driving dynamically reactive loads such as acoustic compressors or other mechanically resonant systems.

Another object of this invention is to provide open-loop-stable, large gap excursion operation of VR motors that simultaneously generate dynamic force at multiple operating frequencies.

Another object of this invention is to provide for operation of VR motors that in some cases approaches the ideal case without employing any flux feedback.

At least one of the above-mentioned objects and advantages may be achieved by a method of controlling a VR motor, which includes providing, via an open-loop active circuit, a dynamic voltage to a coil of said motor to result in a substantially unipolar current flowing in the coil, said periodic voltage being applied so as to maintain control of said motor irrespective of instantaneous motor gap and driven load characteristics.

At least one of the above-mentioned objects and advantages may also be achieved by a method of controlling a VR motor that is operable at a plurality of operating frequencies. The method includes receiving a signal that includes a plurality of discrete frequencies, as a command input to the VR motor. The method also includes precompensating the command input in accordance with a 1/ω characteristic of the VR motor. The method further includes generating a low-distortion force representative of the command input.

At least one of the above-mentioned objects and advantages may also be achieved by a method of controlling a VR motor, which includes providing, via an open-loop active circuit, a bipolar periodic voltage to a coil of said motor to result in a substantially unipolar current flowing in the coil, said periodic voltage being applied so as to maintain control of said motor irrespective of instantaneous motor gap and driven load characteristics, said bi-polar periodic voltage being derived from a uni-polar voltage source.

At least one of the above-mentioned objects and advantages may also be achieved by a method of controlling a VR motor, which includes providing a dynamic voltage to a coil of said motor so that a substantially unipolar coil current flows in the coil, said periodic voltage being applied so as to maintain control of said motor irrespective of instantaneous motor gap and driven load characteristics. The method also includes measuring the current in a conductive winding of said VR motor. The method further includes generating a DC offset voltage that is summed with said applied dynamic voltage such that a time duration and magnitude of excursions of said measured current are minimized.

At least one of the above-mentioned objects and advantages may also be achieved by a method of generating a substantially sinusoidal flux waveform for a variable reluctance (VR) motor, which includes applying a voltage waveform to a coil of the motor, the voltage waveform having a substantially zero mean, the voltage waveform being maintained irrespective as to a change in a size of the gap, wherein no current control with respect to the coil is utilized during operation of the motor.

At least one of the above-mentioned objects and advantages may also be achieved by a method of controlling a variable reluctance (VR) motor, which includes applying a substantially zero-mean voltage waveform to a coil of the motor. Each cycle of the substantially zero-mean voltage waveform includes: 1) a first time period in which a first positive voltage value is provided, 2) a second time period in which a zero voltage value is applied, and 3) a third time period in which a second negative voltage value is applied, wherein an absolute value of the first and second voltage values is substantially equal to each other.

At least one of the above-mentioned objects and advantages may also be achieved by a method of controlling a multi-frequency variable reluctance motor that operates in at least a first operation frequency and a second operating frequency, which includes calculating a sinusoidal voltage to be applied to a coil of the motor, the sinusoidal voltage being calculated as $A \sin(\omega 1) + B \sin(\omega 2)t + C$, wherein A, B and C are constants. The method also includes applying the sinusoidal voltage to the coil for at least a plurality of cycles of the sinusoidal voltage, the sinusoidal voltage being applied irrespective as to a gap width change between the core and the armature.

At least one of the above-mentioned objects and advantages may also be achieved by a variable reluctance (VR) motor, which includes a core having a coil. The motor also includes a movable part that moves based on a force provided in a gap disposed between the core and the armature. The motor further includes a voltage source that is configured to apply a dynamic voltage waveform to the coil that results in a substantially unipolar current flowing in the coil, the dynamic voltage being applied so as to maintain control of said motor irrespective of instantaneous motor gap and driven load characteristics.

At least one of the above-mentioned objects and advantages may also be achieved by a control apparatus for a two-sided variable reluctance motor that has an armature and a core with a first coil on the core and a second coil on the core, and with a first air gap between the first coil and the armature and a second air gap between the second coil and the armature. The control apparatus includes a voltage source that provides a voltage waveform to the first and second coils. The control apparatus also includes a first diode that is provided between the voltage source and the first coil. The control apparatus further includes a second diode that is provided between the voltage source and the second coil, wherein an anode of the first diode and a cathode of the second diode are directly connected to the first and second coils, respectively.

At least one of the above-mentioned objects and advantages may also be achieved by a control apparatus for a variable reluctance motor that has a core with a coil and an armature. The control apparatus includes an offset voltage source for providing a DC offset voltage. The control apparatus also includes a voltage source for outputting a sinusoidal voltage to the coil that is offset by the DC offset voltage. The control apparatus further includes a current sensing unit for sensing current presently passing through the coil. The control apparatus still further includes a rectifying circuit that removes all portions of the sensed current except for negative current pulses. The control apparatus also includes a low-pass filter that filters and output of the rectifying circuit, wherein an output of the low-pass filter is provided to the offset voltage source to provide an adjustment signal to either increase, decrease or maintain a current value of the DC offset voltage.

An understanding of the operation of the invention can be gained by utilizing the following relations that describe the behavior of VR motors:

1. To a first approximation, the force generated across the air gap of a VR motor is proportional to the square of the magnetic flux established in that gap ($F \sim \omega^2$). This relation assumes that the flux density in the air gap of the motor is uniformly distributed, an assumption that is commonly regarded as reasonable for small gap VR motors by those skilled in the art.

2. For gapped magnetic circuits such as those discussed herein, the relationship between the voltage applied to the motor coil and the resulting magnetic flux is $v = N(d\omega/dt) + iR$, where v is the voltage applied to the coil, N is the number of turns of wire that constitute the coil, $\omega$ is the magnetic flux in the air gap, t is time, i is the current in the coil, and R is the resistance of the coil. This relation is commonly known as Faraday's Law.

3. For gapped magnetic circuits such as those discussed herein, the relationship between the coil current and the magnetic flux in the air gap is $\omega \sim i/g$.

Using these relations, the following features have been found:

1. Except for the iR term in the $v = N(d\omega/dt) + iR$ relation, the relationship between coil voltage and magnetic flux is independent of gap. The present invention has been developed based in part on the finding that the presence of this iR term does not adversely affect the operation of the invention, especially when not operating at low frequencies.

2. The magnetic flux is guaranteed to be zero whenever the coil current is zero, regardless of the instantaneous gap length.

In the present invention, stable, high gap excursion operation of VR dynamic force motors is accomplished by combining voltage control (applying an open-loop voltage v to a motor coil yields flux $$\phi = \int \frac{v - iR}{N} dt + C)$$

and by employing ways to ensure that the current periodically returns to zero (which guarantees that the constant C in $$\phi = \int \frac{v - iR}{N} dt + C$$

remains at a value between zero and the peak flux).

BRIEF DESCRIPTION OF THE DRAWINGS

The invention will become more fully apparent from the following detailed description when read in conjunction with the accompanying drawings with like reference numerals indicating corresponding parts throughout, and wherein:

FIG. 7 shows flux and force waveforms typical of sinusoidal and pulsed VR motor drive, in accordance with an embodiment of the present invention;

DETAILED DESCRIPTION OF THE PREFERRED EMBODIMENTS

Preferred embodiments of the invention will be described in detail hereinbelow, with reference to the drawings.

The devices described with respect to the present invention are adapted for applying oscillatory forces to a load structure. These devices are often categorized as "linear motors", "dynamic force motors", "shakers", or "vibrators". These devices generate their oscillatory forces by working against an inertial or reaction mass which is typically composed of the larger portion of the electromagnetic circuit and its energizing windings. Note that, in normal operation, both the mass to which the load is attached and the reaction mass will likely experience significant vibratory motion. The respective masses of the two moving portions of the motor are commonly altered by attaching additional ballast masses for the purpose of improving the overall system dynamics. The load to which the oscillatory forces are applied is typically connected to the motor armature which is oscillated with respect to the reaction mass (typically, the core assembly). The load may be attached to the motor rigidly or by way of a spring or other suspension, and this attachment may be made, in some cases, to the motor core assembly. The load may be, as one example, an acoustic resonator, but other kinds of loads may also be utilized with a VR motor that is controlled in accordance with the present invention.

Figure 2:
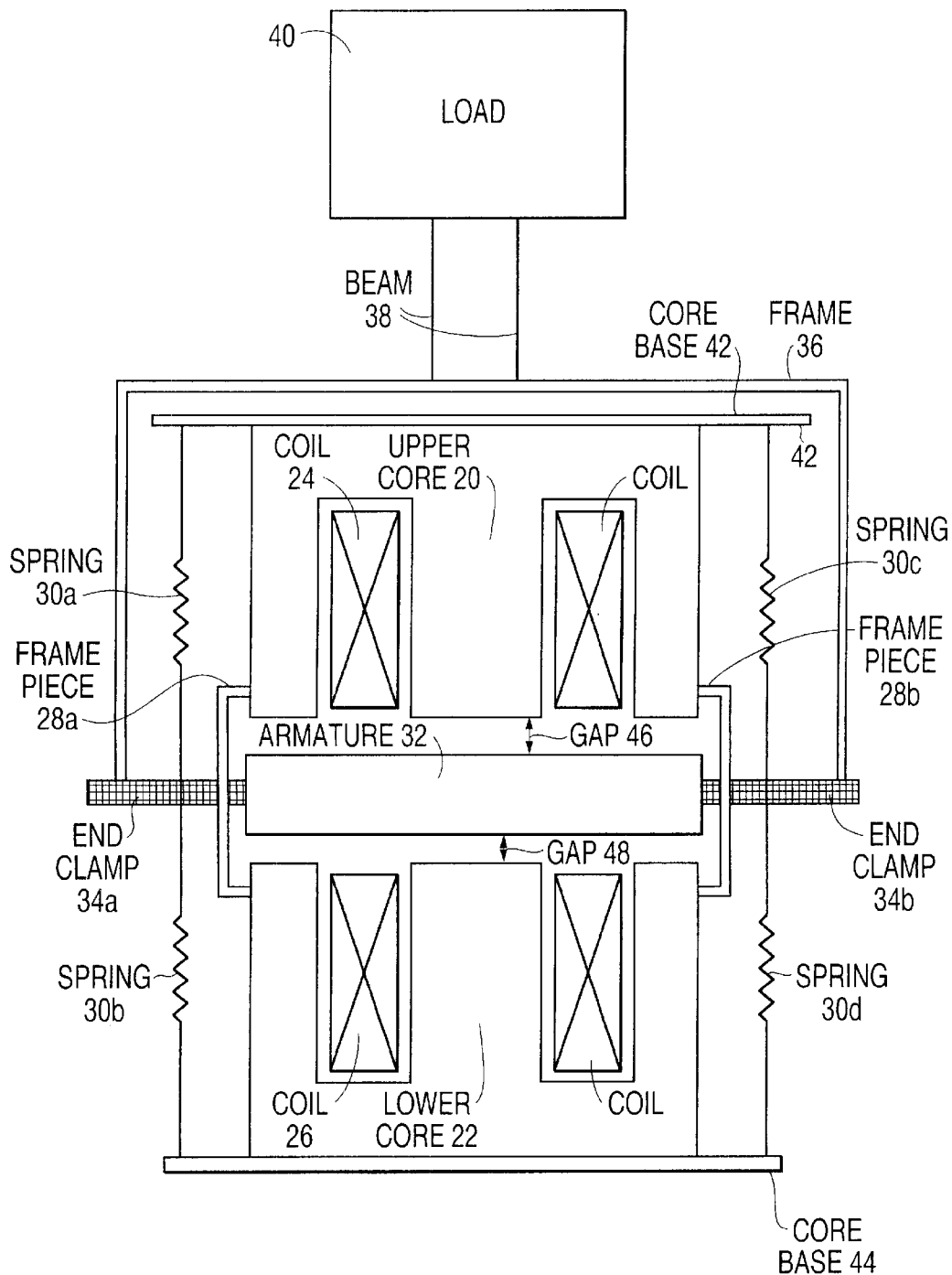
FIG. 2 shows a conventional two-sided VR motor.

The basic electro-magneto-mechanical operation of the VR dynamic force motor may be better understood by considering FIG. 2, which shows a two-sided structure. The load structure to be driven is indicated generally by reference block 40, and this load 40 is connected through a beam 38 to the motor armature structure comprised of armature element 32, end clamp 34a, end clamp 34b and frame 36 rigidly attached as shown in FIG. 2.

Figure 13:
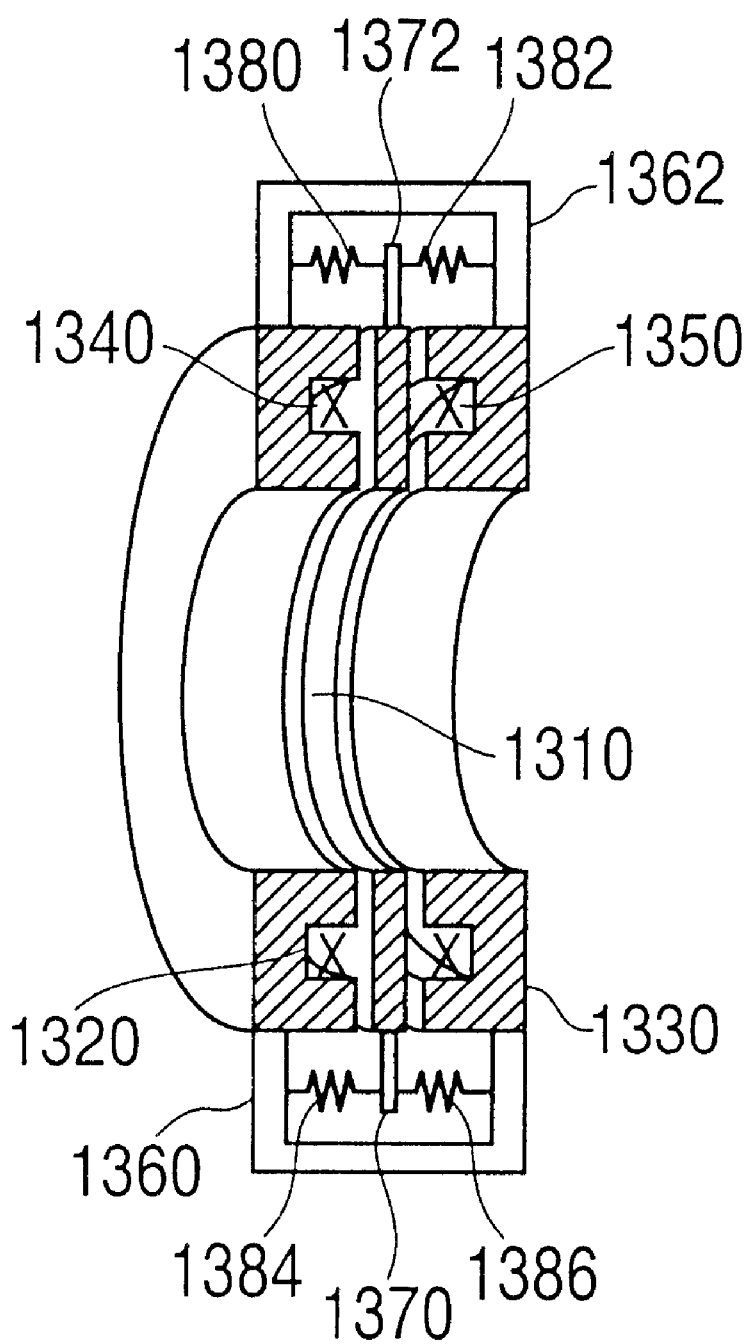
FIG. 13 shows a "round topology" VR motor that can be controlled in accordance with the present invention.
Figure 14:
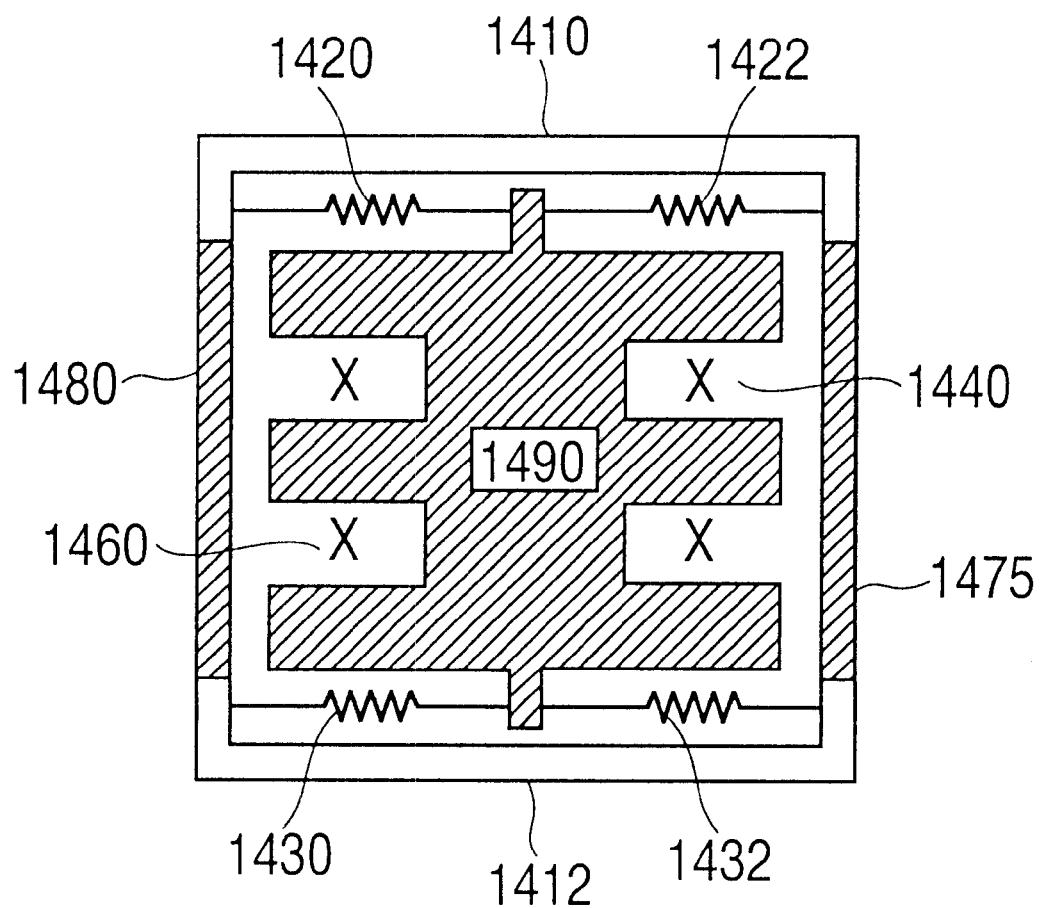
FIG. 14 shows an IEI VR motor that can be controlled in accordance with the present invention.
Figure 15:
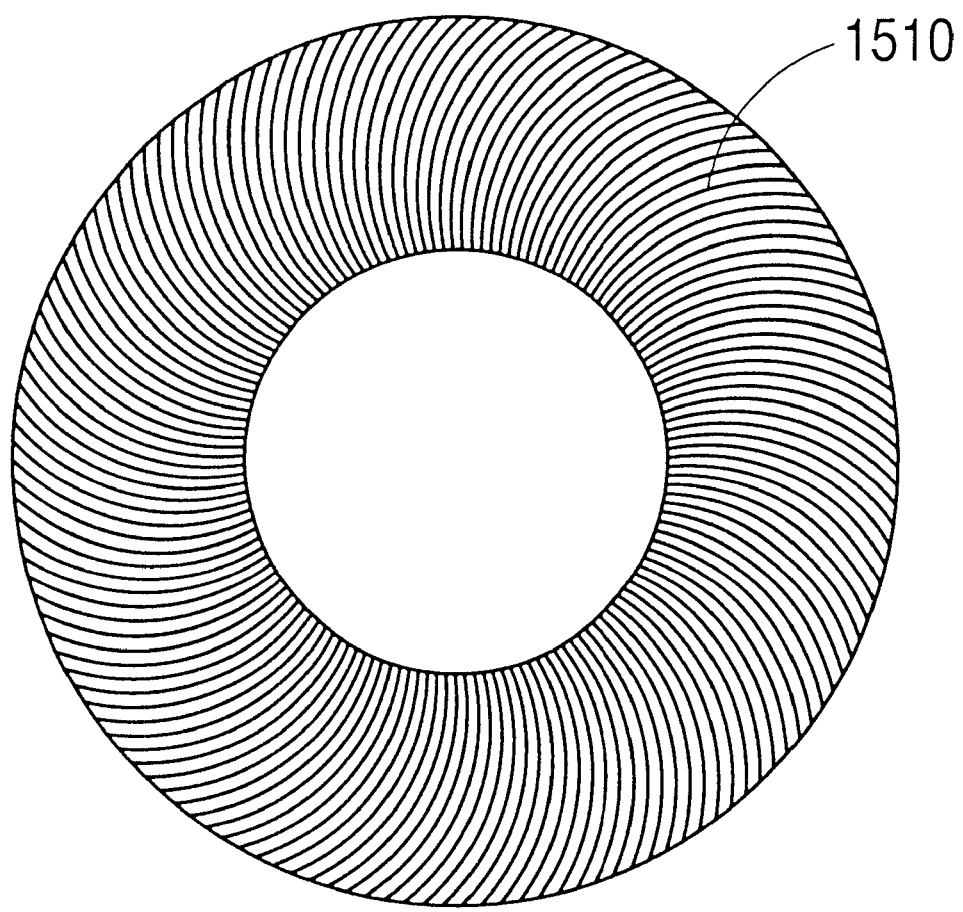
FIG. 15 shows a spiro-wrap VR motor that can be controlled in accordance with the present invention.

The magnetic structures employed in the motors described herein are similar to those used in other common electromagnetic devices, and they typically employ both E-shaped laminations which have energizing windings or coils wound around the middle leg of the E, and I-shaped laminations which complete the magnetic circuit across the ends of the legs of the I-shaped laminations. Those skilled in the art will appreciate that a VR dynamic force motor could readily be constructed using shapes other than E and I stacks. Examples of alternate motor structures that can be controlled in accordance with this invention are shown in FIGS. 13 and 14, where each of these structures shares the same basic electromagnetic operating characteristics. FIG. 13 shows a "round-topology" VR motor, with an annular ring 1310 that constitutes the armature disposed between inner and outer annular rings 1320 and 1330 which constitute the core elements. Coils 1340 and 1350 are contained within the core elements 1320 and 1330, support structures are noted by 1360, 1362, 1370, and 1372, and the armature and core assembly are resiliently attached by springs 1380, 1382, 1384, and 1386. FIG. 14 shows an IEI motor, with support structures 1410, 1412, springs 1420, 1422, 1430, 1432, coils 1440, 1460, armatures 1475, 1480, and core 1490. FIG. 15 shows a "spiro-wrap" construction technique whereby a plurality of thin sheet steel elements 1510 are banded together to form the constituent pieces of a "round-topology" motor structure such as shown in FIG. 13. The round-topology motor may be configured as either a one-sided or a two-sided motor.

Referring back to FIG. 2, a pair of stacks of E-shaped laminations, i.e., open magnetic core structures, are designated by reference characters 20 (upper core) and 22 (lower core), respectively, and are oppositely oriented with their leg portions facing inwardly and are held in spaced relationship with a space therebetween by frame structures 28a and 28b. An armature structure 32 is positioned between the upper core 20 and the lower core 22 and is composed of a stack of I-shaped laminations bound together by end clamps 34a and 34b. These I-shaped laminations complete the magnetic circuits of cores 20 and 22 with respective gaps 46 and 48. Springs, illustrated diagrammatically and designated by reference characters 30a, 30b, 30c, and 30d, resiliently center the armature structure 32 between cores 20 and 22 so that gaps 46 and 48 are nominally equal. As discussed earlier, the structure comprising cores 20 and 22, coils 24 and 26, frame pieces 28a and 28b, and core bases 42 and 44 constitute an inertial or reaction mass. For this motor, the mass of the armature structure is less than that of the core structure; however, this need not necessarily be the case to provide stable control in accordance with the present invention.

Figure 1:
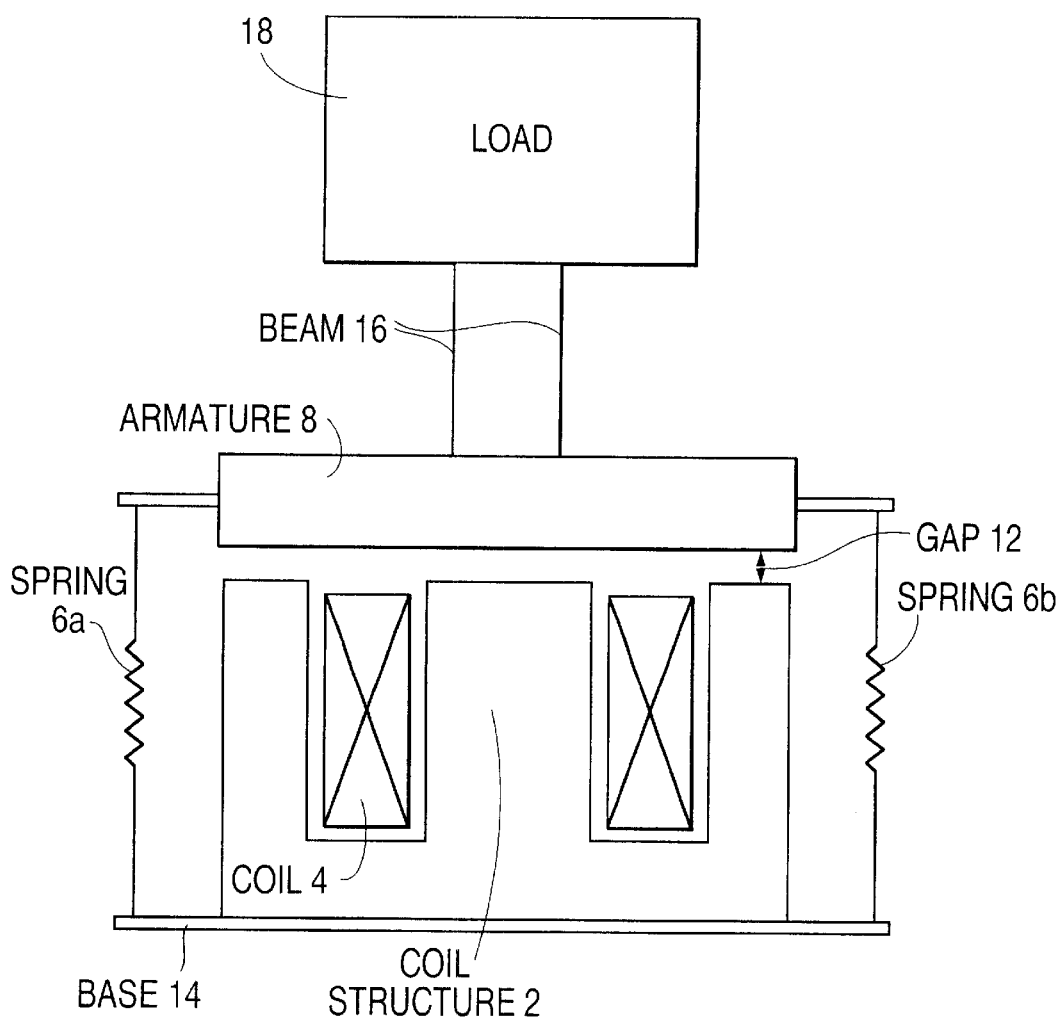
FIG. 1 shows a conventional one-sided VR motor.

A variation on the motor illustrated in FIG. 2 is comprised of only one E-stack and one I-stack and a spring suspension attaching the two stacks, as seen by the one-sided motor in FIG. 1. With this motor, springs 6a and 6b set the nominal unenergized gap 12 at its desired length, and the armature I-stack laminations 8 complete the magnetic circuit of the core E-stack 2. Again, with the single E-stack motor, the core assembly (comprising core structure 2, coil 4 and base 14) is often heavier than the armature 8, and it constitutes the inertial or reaction mass. One may, as appropriate, attach the driven load to the core assembly instead of the armature assembly as shown. Also note that, for some VR motor designs, conductive windings may be attached to the core pieces or the armature pieces or both. Additionally, one could envision a design where two E-cores (with conductive windings) were oriented so that their pole faces aligned across a small air gap across which electromagnetic forces were generated.

Those skilled in the art will appreciate that the spring suspension illustrated diagrammatically by reference characters 30a, 30b, 30c and 30d in FIG. 2 could be formed by coil springs, leaf springs, flexures, slides, or other mechanical means. The composite spring rate of this suspension can exhibit either low or high stiffness, and one can tune the stiffness of the suspension to exploit the dynamic advantages of the mechanical resonance resulting from the core mass, the armature mass, and the suspension attaching the two masses. For proper operation of the invention, the springs are set to locate the armature so that the air gaps (or air gap, for the single-core motor) are set to their desired unenergized length and whereby the springs restrain the armature in such a way that the armature always moves parallel to the legs of the E-stack.

For the single E-stack motor, the suspension springs also serve to force the armature motion to be perpendicular to the core face, but, in addition, these springs must be sufficiently stiff to keep the armature and core stacks from contacting when they experience the static forces inherent in single-sided designs.

The motor suspensions may be tuned to exploit dynamic advantages as appropriate, or may be only as stiff as necessary to keep parts square to each other. It should be designed to give perpendicular travel of the armature with respect to the ends of the core legs. The suspension could be a slide type suspension rather than the flexure type shown in the figures (see U.S. Pat. No. 5,621,293 to Gennesseaux for an example of a slide suspension). In addition, the suspension may include either one or several levels of suspension (for example, a multi-leaf flexure suspension).

This description of the electromagnetic operation of these dynamic force motors may be better understood by reference to the following definitions. In FIG. 2, "upper force" refers to mechanical force generated between the upper core E-stack 20 and the armature 32, "upper flux" refers to the magnetic flux generated in air gap 46, "upper current" refers to the current in upper coil 24, and "upper voltage" refers to the voltage applied to upper coil 24. Likewise, "lower force" refers to mechanical force generated between the lower core E-stack 22 and the armature 32, "lower flux" refers to the magnetic flux generated in air gap 48, "lower current" refers to the current in lower coil 26, and "lower voltage" refers to the voltage applied to the lower coil 26. Subscripts "U" and "u" will be used to indicate "upper" quantities, and "L" and "1" will be used for "lower" quantities. Both coils 24 and 26 have the same resistance R and the same number of turns N.

Figure 3:
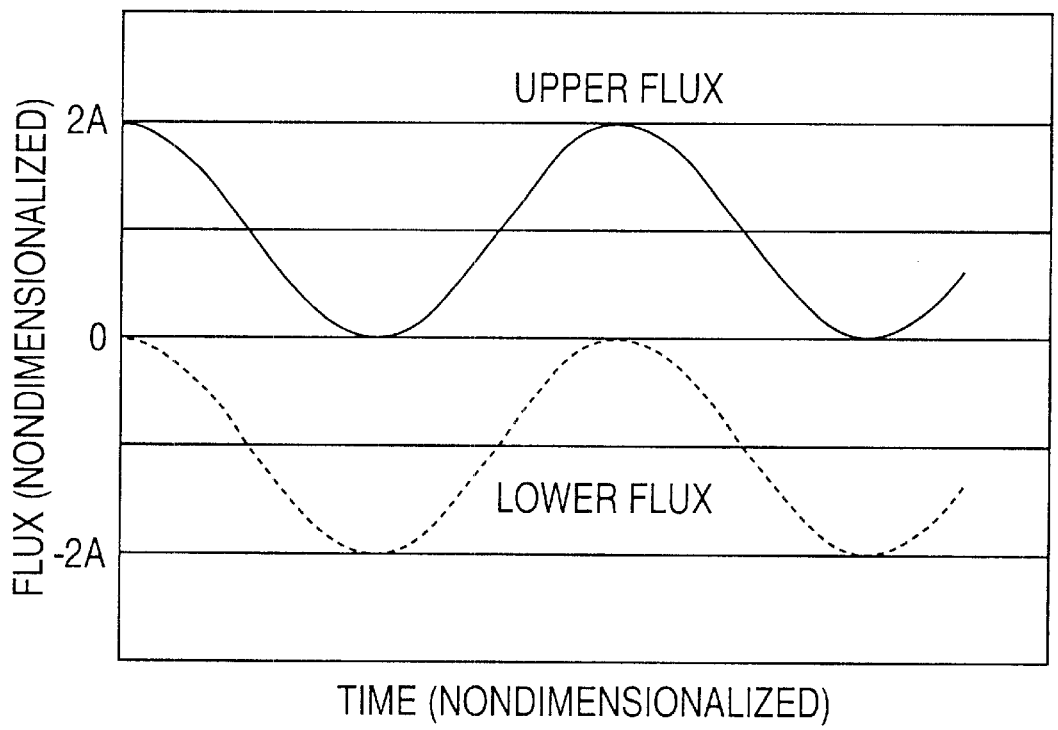
FIG. 3 shows waveforms of ideal flux waveforms for both halves of a two-sided VR motor.

In FIG. 3 are plotted sinusoidal waveforms of $\phi_U$ (upper flux) and $\phi_L$ (lower flux). The mathematical expressions for these waveforms are as follows:

$$\phi_U = A + A\cos(\omega t)$$

$$\phi_L = -A + A\cos(\omega t)$$

Applying the $F_{18} \phi^2$ relation to these expressions yields:

$$F_U \sim \phi_U^2 = A^2 + 2A^2\cos(\omega t) + A^2\cos^2(\omega t)$$
$$= A^2[1 + 2\cos(\omega t) + 0.5(1 + \cos(2\omega t))]$$
$$F_U \sim A^2[1.5 + 2\cos(\omega t) + \cos(2\omega t)]$$

$$F_L \sim \phi_L^2 = A^2 - 2A^2\cos(\omega t) + A^2\cos^2(\omega t)$$
$$= A^2[1 - 2\cos(\omega t) + 0.5(1 + \cos(2\omega t))]$$
$$F_L \sim A^2[1.5 - 2\cos(\omega t) + \cos(2\omega t)]$$

And, the net force generated between the core assembly and the armature assembly is:

$$F_U - F_L \sim 4A^2 \cos(\omega t)$$

So, if one could, by some means, generate the $\phi_U$ (upper flux) and $\phi_L$ (lower flux) waveforms as described here, then one has a dynamic force motor that generates a low-distortion oscillating force at the same frequency as that of the generated flux waveforms. It is an object of this invention to demonstrate means by which operation close to this "ideal" case can be achieved without resorting to the complexity of flux measuring devices and feedback circuits such as those described in U.S. Pat. No. 5,621,293 to Gennesseaux.

Figure 4:
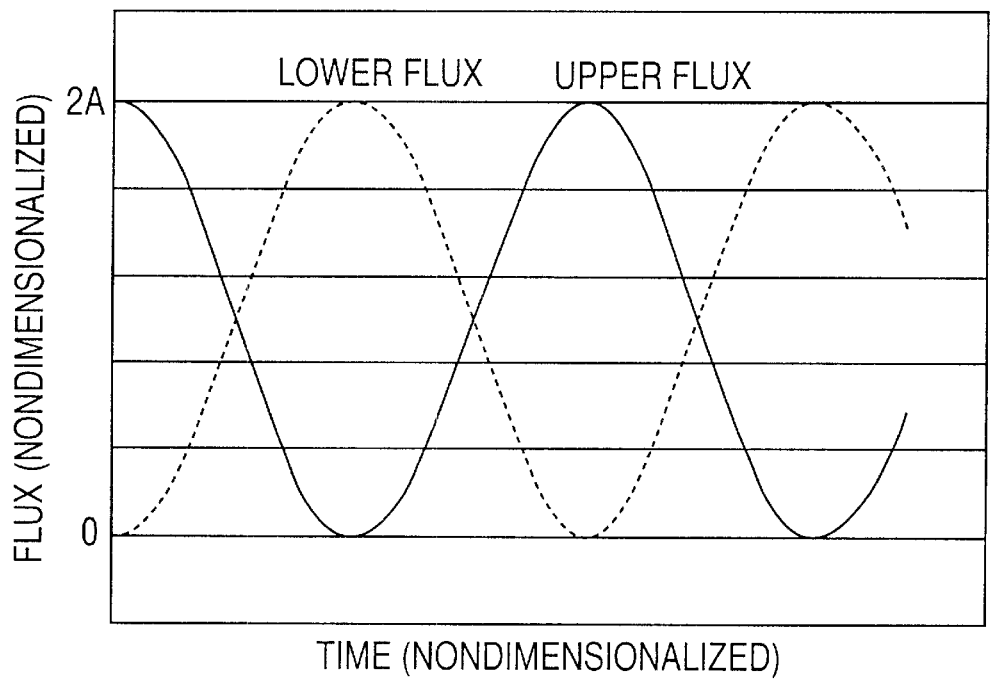
FIG. 4 shows an alternate set of ideal flux waveforms for both halves of a two-sided VR motor.

It is worth noting that one could alternately define the lower flux $\phi L$ in the motor by $$\phi_L = A + A\cos(\omega t - 180°)$$
$$= A - A\cos(\omega t)$$

as shown in FIG. 4. This results in the same expression for $F_L$ determined earlier, namely:

$$F_L \sim \phi_L^2 = A^2 - 2A^2\cos(\omega t) + A^2\cos^2(\omega t)$$
$$= A^2[1 - 2\cos(\omega t) + 0.5(1 + \cos(2\omega t))]$$
$$F_L \sim A^2[1.5 - 2\cos(\omega t) + \cos(2\omega t)]$$

Thus, in terms of the net force generated between the armature and the core of the motor, the flux waveforms of FIG. 3 and FIG. 4 produce the same result.

Figure 5:
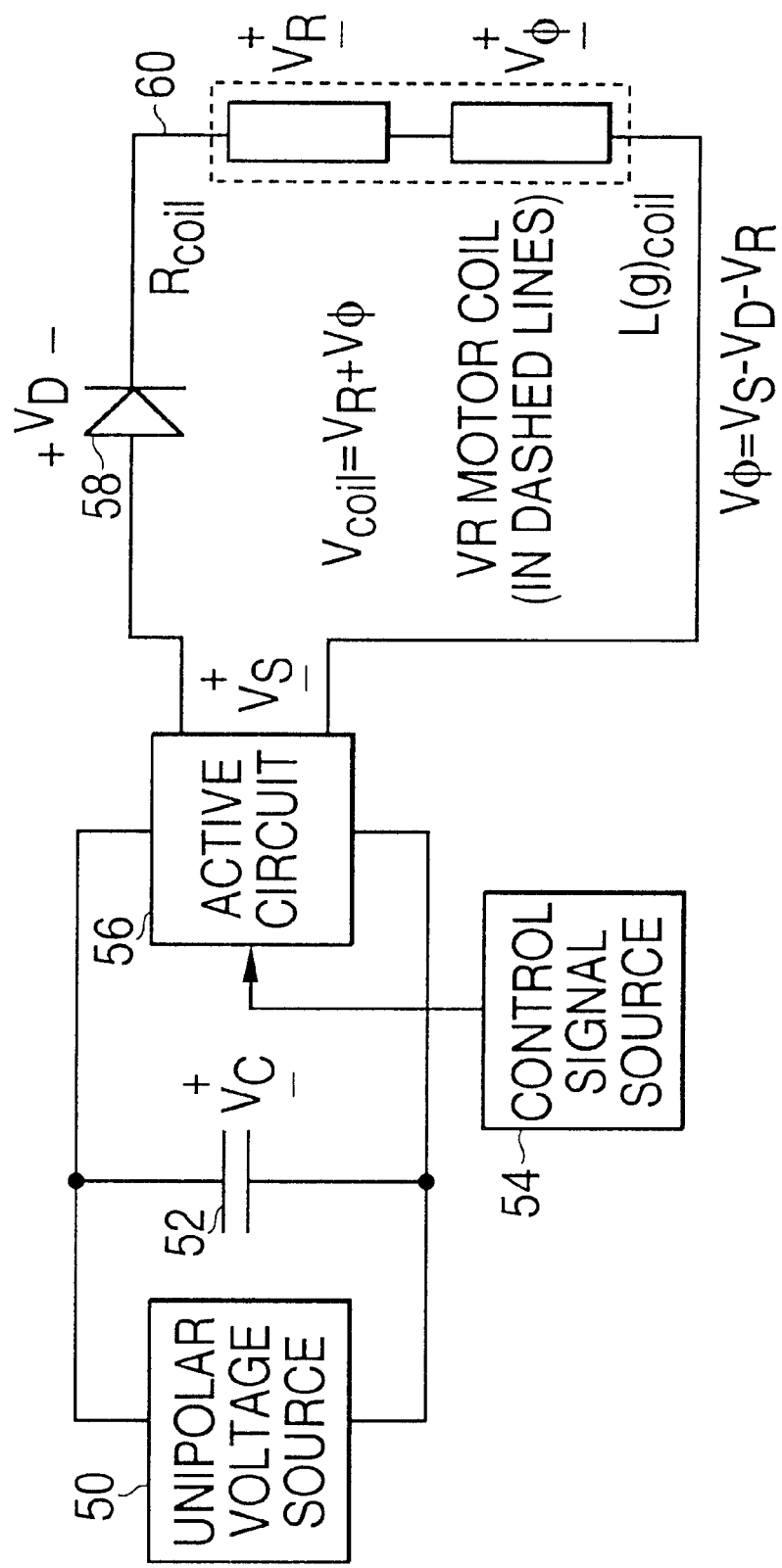
FIG. 5 shows a circuit diagram of a VR motor, with a unipolar voltage source (with filtering capacitor), an active circuit (for motor drive), a controller to drive the active circuit, a diode to assure unidirectional current flow, and a representative VR motor coil, in accordance with an embodiment of the present invention.
Figure 17:
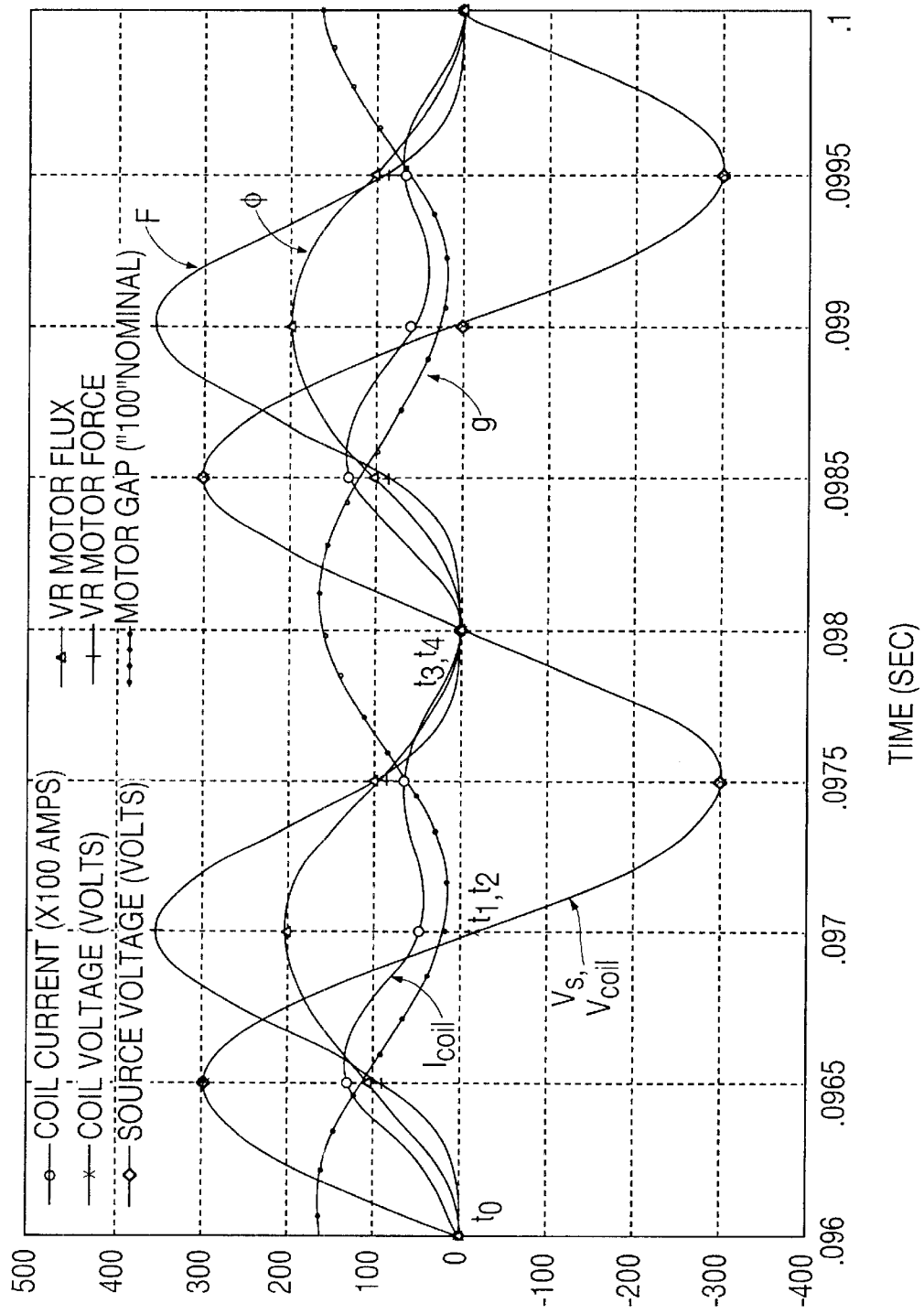
FIG. 17 shows a plot of flux, current, force, and voltage waveforms for an ideal motor controlled in accordance with an embodiment of the present invention.

To provide a better understanding of the invention, consider the following relation that was presented earlier, $$v = N\frac{d\phi}{dt} + iR,$$

in association with FIG. 5, in which a typical motor coil (modeled as a series combination of an inductor L(g) and a resistor R) is shown wired to an active circuit 56 (typically a linear or switching voltage amplifier) in series with a conventional diode rectifier 58. The "L(g)" designator is used for the inductor as a reminder that the inductance of the coils in a VR motor is a strong function of the motor gap length. In a first embodiment of this invention, the active circuit 56 in FIG. 5 applies a sinusoidal voltage ($V_s$) to this series diode-coil combination, and, for an ideal diode (no forward voltage drop) and an ideal coil (no resistance), the resulting motor flux waveform is an offset sinusoid as shown in FIG. P1. Note that this flux waveform has the same form as the "ideal" waveforms discussed above (see FIGS. 3 and 4), and that this flux waveform results regardless of any variations in the motor gap length (the associated current waveform in FIG. P1 shows significant non-sinusoidal behavior consistent with the varying gap length). Note also that the representative waveforms shown in FIG. 17 reflect a gap excursion of about 70%, which is a very large value relative to conventional VR motor control. FIG. 17 also shows a source voltage $V_s$ as a bi-polar periodic voltage waveform, as well as showing a coil current $I_{coil}$ having a positive, unipolar current value at all times. The motor coil shown in FIG. 5 is representative of the single coil in a single-core motor (FIG. 1) or of one coil in a two-core motor (FIG. 2). Thus, with an ideal diode and coil, one can employ simple voltage control to generate the ideal, gap-independent flux waveforms discussed earlier. Also shown in FIG. 5 is a uni-polar voltage source 50, which is coupled in parallel to a capacitor 52 and to the active circuit 56. Control signal source 54 provides control for the active circuit 56. The uni-polar voltage source 50 provides a uni-polar output voltage, and may be configured by rectifying an AC voltage with or without filtering, or by rectifying, filtering, and regulating an AC voltage, as two possible examples of such a circuit.

Figure 18:
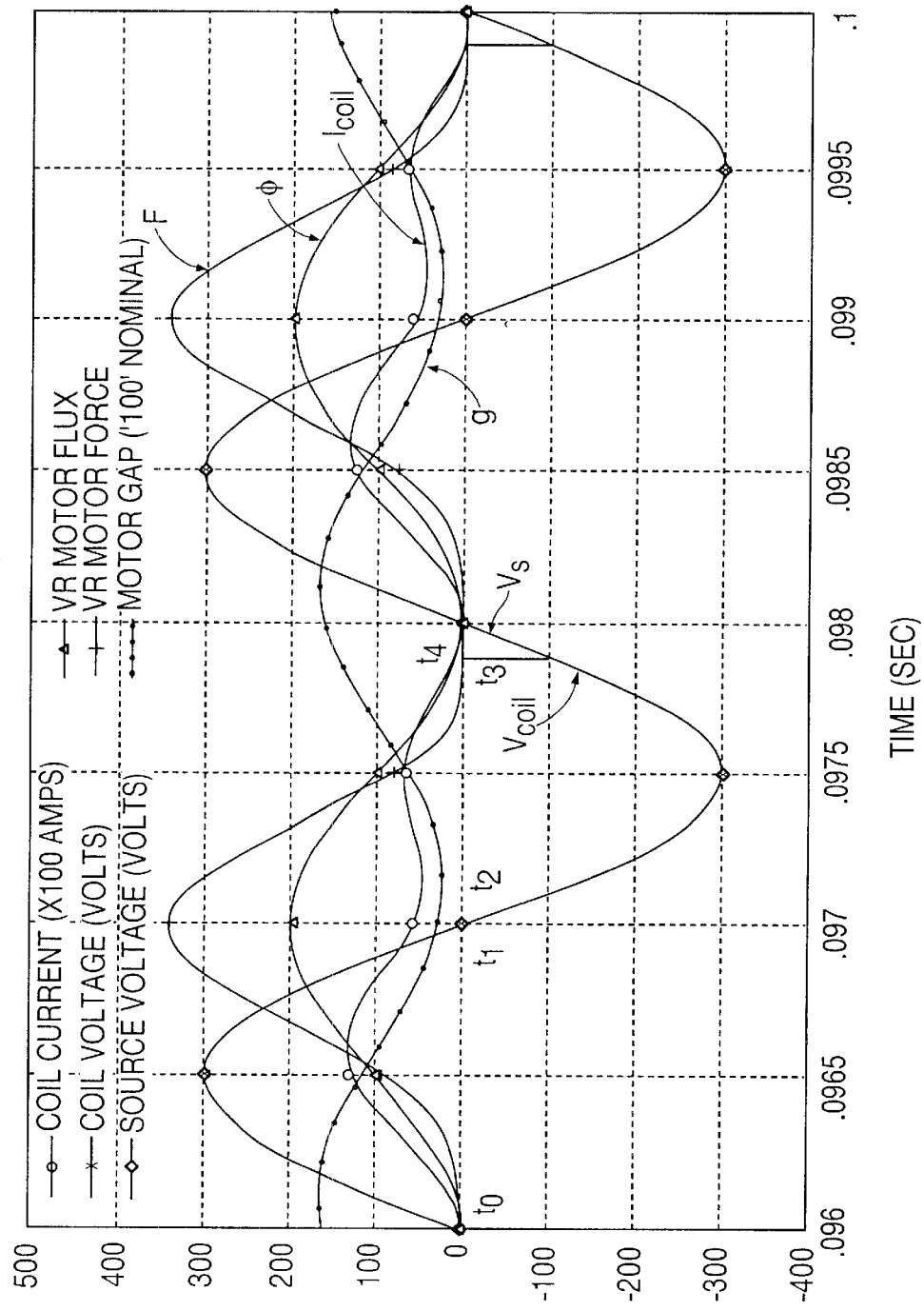
FIG. 18 shows a plot of flux, current, force, and voltage waveforms for a typical motor controlled in accordance with an embodiment of the present invention.

Based on computer simulations performed by the inventor, it has been demonstrated that, in the presence of non-zero diode forward voltage drop and finite coil resistance, one can, with simple, open-loop control schemes in accordance with this invention, generate flux waveforms that very nearly match the ideal flux waveforms discussed above, and that these waveforms, like the ideal waveforms, can be generated while allowing very large gap excursions (up to 100%). Referring again to FIG. 5, but with a coil resistance of 3 ohms ($R_{coil}=3\Omega$) and a forward diode voltage drop of 1 volt ($V_D=1V$), it is shown in FIG. 18 that the resulting flux waveform is very nearly identical to the offset sinusoid shown in FIG. 17. Note that the voltage drops across the coil resistance and the diode tend to reduce the effective voltage available to increase the motor flux ($V_\phi$ is less than $V_s$ when one is attempting to increase the motor flux), and these voltage drops tend to increase (in magnitude) the effective (negative) voltage available to decrease the motor flux ($V_\phi$ is greater than $V_s$ when one is attempting to decrease the motor flux). This tendency for the motor flux to slew away from zero more slowly than it returns towards zero is a feature of the invention, as it is the physical phenomena through which open-loop motor stability is guaranteed. Briefly stated, as long as one applies a zero-mean dynamic voltage to the series diode-coil shown in FIG. 5, and the load attached to the motor contains no power source, the resulting flux waveform is guaranteed to periodically return to zero.

While this mode of operation guarantees a stable, well-behaved flux waveform, it does not assure that the armature and core will not come in contact with each other. Operating frequency, initial motor gap, applied voltage, and other dynamic system forces all influence the magnitude of the motor armature stroke, and those skilled in the art will appreciate that a well designed motor must take all of these factors into account. The present invention does, however, with a simple open-loop control scheme, assure a predictable and stable dynamic flux waveform in the presence of very large gap variations, thus freeing a motor designer to concentrate on these other issues.

Figure 19:
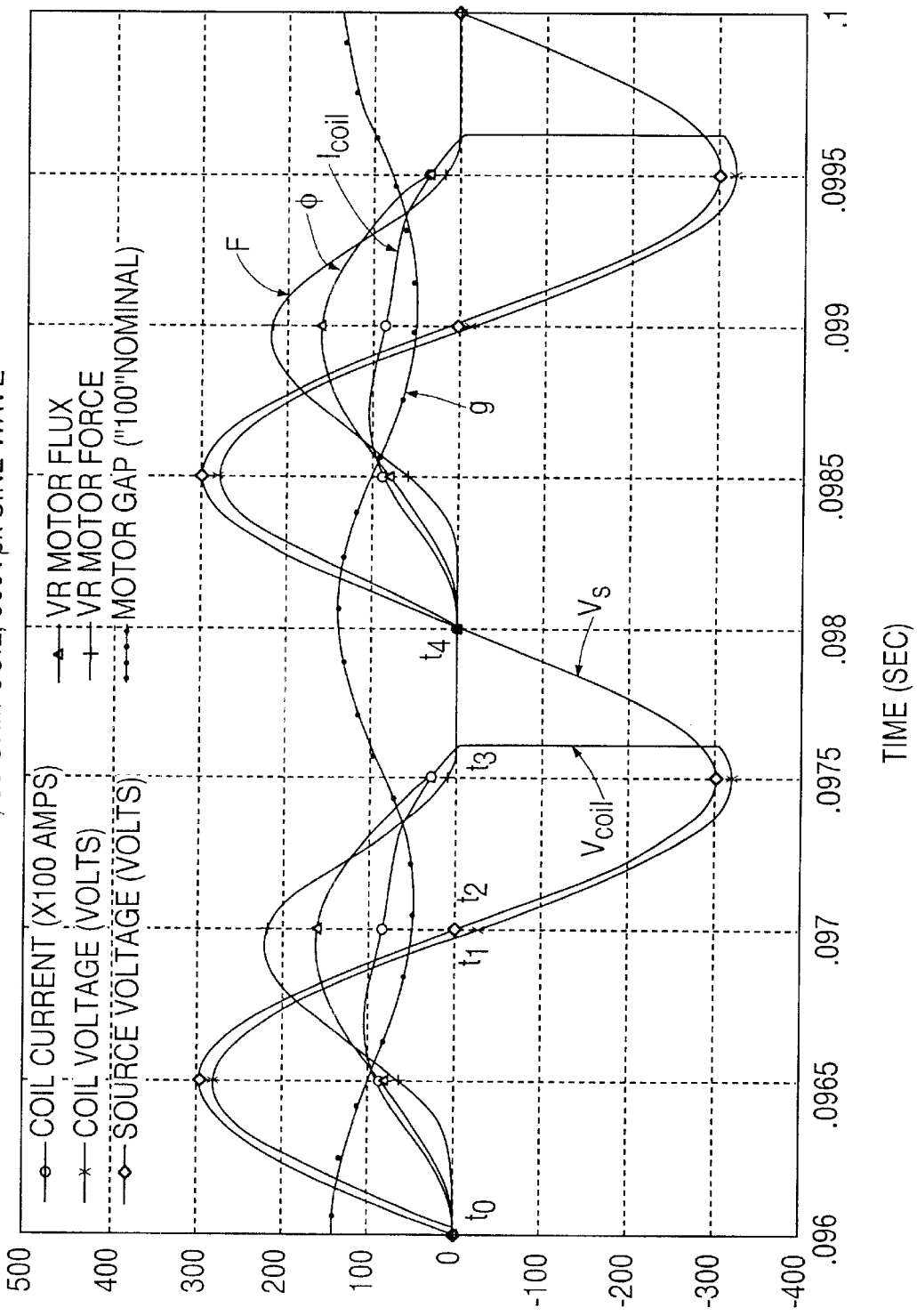
FIG. 19 shows a plot of flux, current, force, and voltage waveforms for a motor controlled that has exaggerated electrical properties in accordance with an embodiment of the present invention.

One implication of this tendency for the flux waveform to slew towards zero more rapidly than it slews away from zero is seen in the comparison of FIGS. 17 and 18. In FIG. 17 (ideal diode and no coil resistance), the flux waveform $\phi$ returns to zero at the exact instant that the sign of the applied voltage $V_s$ changes from negative to positive to initiate the next cycle of the dynamic signal (this event is indicated by $t_3$ and $t_4$ being at the same instant in time in FIG. 17). When the same control scheme is applied to a real motor coil and diode (FIG. 18, 1V diode, 3 ohm coil), the asymmetry in the flux slewing characteristic results in the flux waveform $\phi$ returning to zero prior to the end of the cycle. This is graphically indicated by the time difference between $t_3$ and $t_4$ in FIG. 18, which aids one in understanding that the presence of the diode voltage drop and the coil resistance serve to enhance the "guaranteed return-to-zero" attribute of the invention. To further illustrate these effects, waveforms for highly exaggerated diode voltage drop (20 V) and coil resistance (30 ohm) are plotted in FIG. 19, showing an even larger return-to-zero time ($t_3$ to $t_4$) for the coil current.

Much of the conventional art of VR motor control is directed towards minimizing the distortion in the generated motor force or, put another way, towards attaining pure sinusoidal drive. It is worth examining the extent to which the invention achieves this goal. For example, with the example motor coil discussed above (3 ohm coil resistance R), an inductance (over a wide range of gap lengths) of 200 mH was measured, based on tests performed on a motor by the inventor. At 500 Hz, an inductive (L) impedance 628 ohms was measured, which is 99.5% of the total coil impedance ($|j\omega L+R|$) of 631 ohms. At this design operating frequency, the distortion introduced by the finite coil resistance is minimal.

To minimize the adverse impact of the diode forward voltage drop, one could simply offset the drive voltage by an amount equal to this voltage drop. However, caution must be exercised when deviating from the zero-mean-voltage aspect of the invention that guarantees open-loop flux stability in variable gap VR motors, since slightly too much offset voltage applied to a low resistance coil (such as is typical for these motors) can lead to a "flux runaway" condition where the flux and current increase to an unacceptably high level, often magnetically clamping the armature and core to each other at the motor gap. In such a runaway condition, the flux will increase to a point where the magnetic material saturates, and the current will increase to a point where a fuse is blown or a voltage amplifier malfunctions. This may result in a magnetic clamping of the armature and core to each other at the motor gap.

Figure 20:
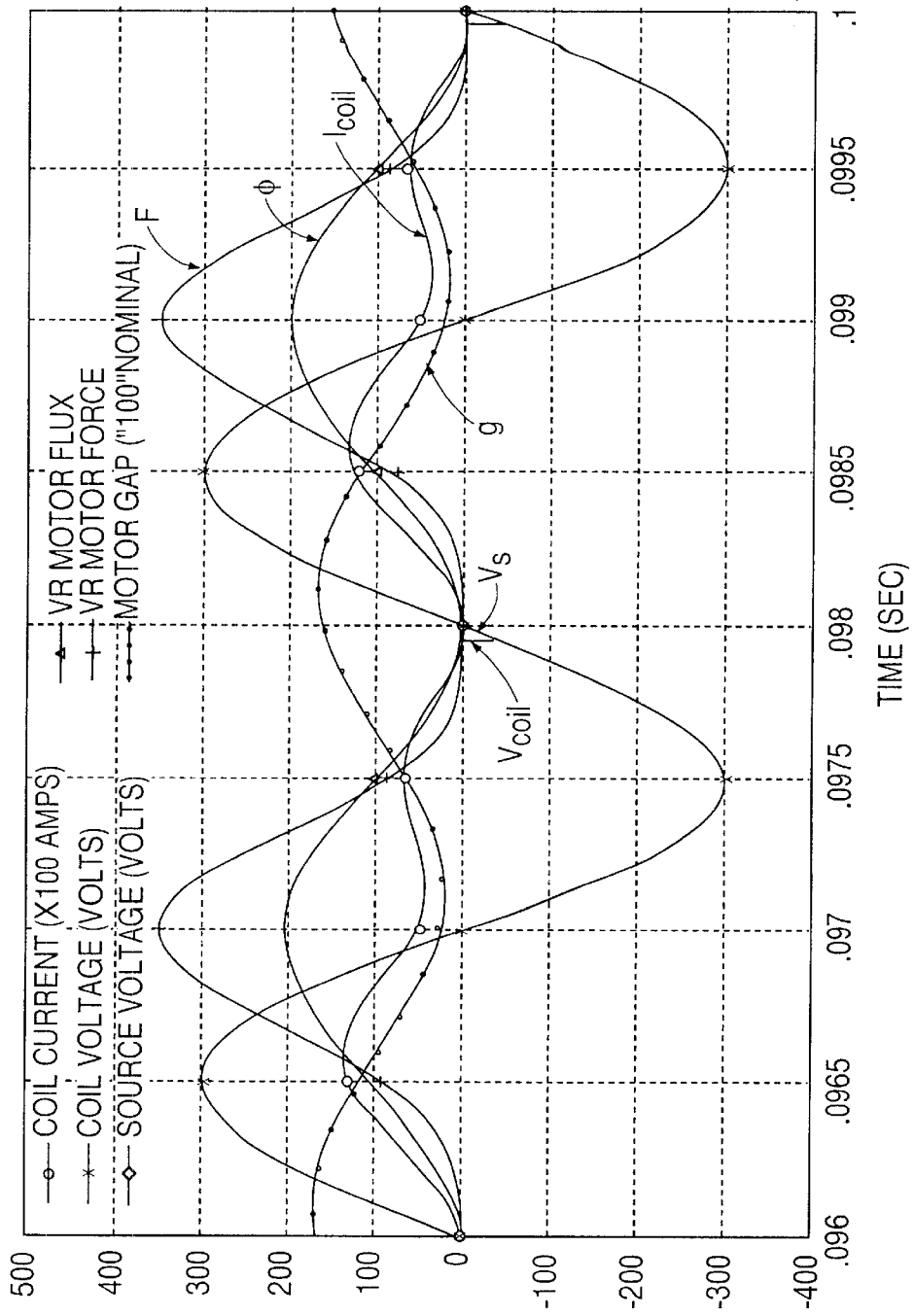
FIG. 20 shows a plot of flux, current, force, and voltage waveforms for a typical motor controlled with a voltage having a slight voltage offset, in accordance with an embodiment of the present invention.

However, a slight addition of offset voltage can reduce flux waveform distortion, as demonstrated in FIG. 20. The waveforms in FIG. 20 reflect operating conditions identical to those for FIG. 18 except for the incorporation of 2.5V of DC offset (about 1% of the peak voltage value) in the drive waveform Vs. Note that this adjustment reduces the "end of cycle" distortion (reflected in the $t_3$–$t_4$ difference discussed earlier). Increasing this offset further would likely violate the "return to zero each cycle" feature of the invention, and in that case one would observe the flux $\phi$ to grow without bound until the motor magnetic material (e.g., motor iron) saturates.

In a similar manner, one could compensate for the iR distortion discussed above. If the coil resistance is known, and the coil current is measured, one could simply add the voltage iR(t) to the original sinusoidal voltage. Combining the compensation for the diode voltage drop and the iR voltage drop gives:

$$V_{s\text{-}compensated} = A\sin(\omega t) + V_D + i_{coil}R_{coil}.$$

Thus, in theory, one can completely compensate for the effects of coil resistance and diode forward voltage drop. Again, though, if either of these correction terms is slightly too large, one can easily end up in a flux "runaway" condition, and the motor operation will no longer be stable.

Figure 21:
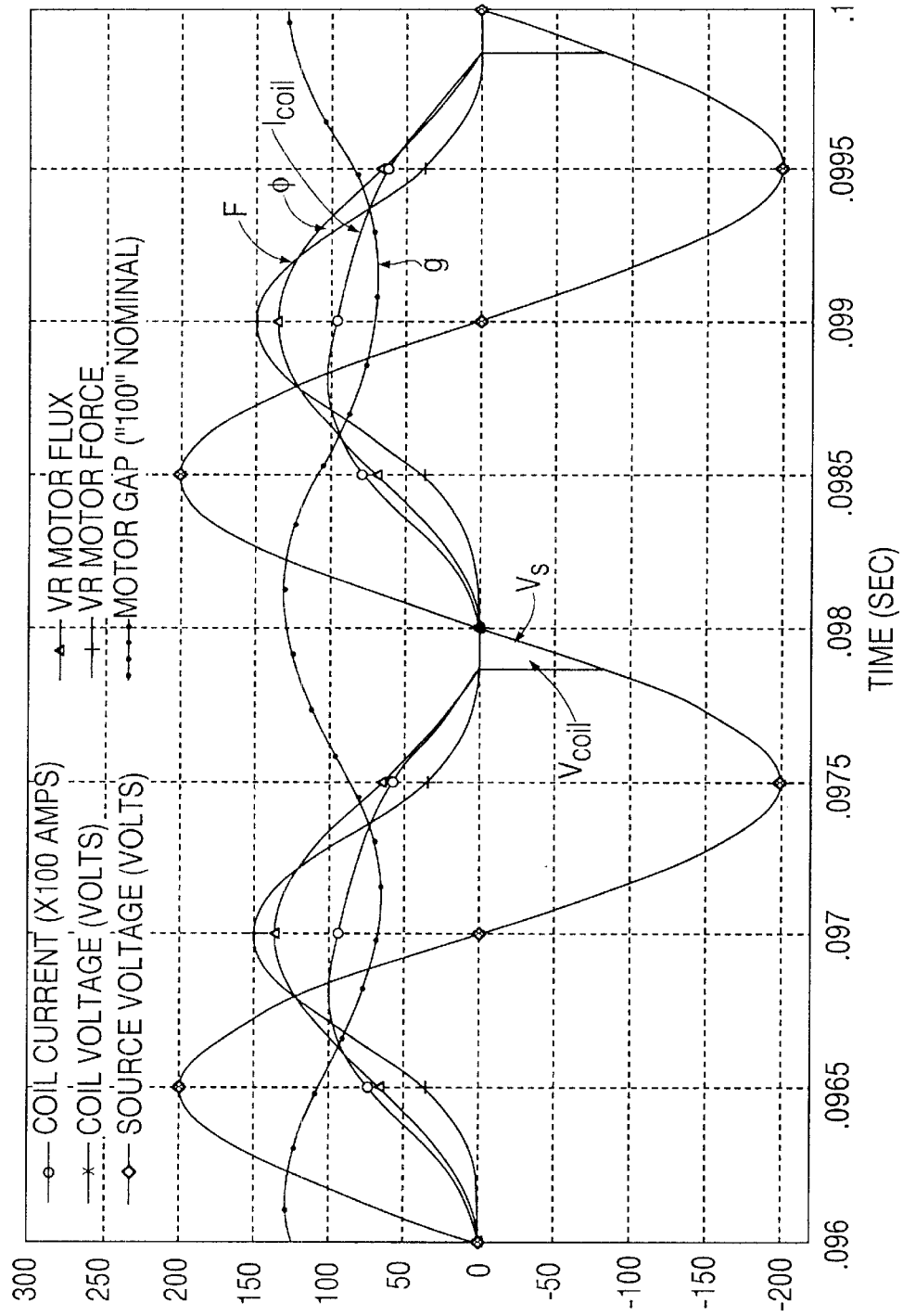
FIG. 21 shows a plot of flux, current, force, and voltage waveforms, in which a lower amplitude drive is used than what is shown in FIG. 18.

For many applications of VR dynamic force motors, one requires a simple scheme for varying the amplitude of the generated force. In the invention, this is accomplished by simply adjusting the peak-to-peak magnitude of the applied voltage: higher applied pk-pk voltage yields higher peak flux which yields higher dynamic forces. As long as the mean (D.C.) value of the applied voltage is zero, then open-loop stability is guaranteed for any magnitude of applied dynamic voltage. Even if the VR motor is driven into magnetic saturation, the invention still assures stable operation. An example of varying the drive voltage amplitude (that is, amplitude adjustment) is shown in FIG. 21, where the peak drive voltage is 200V (compared with 300V peak in FIG. 18).

The very-nearly-sinusoidal flux waveform observed in FIG. 18 can be readily developed in the upper portion of a two-sided VR motor, such as the one shown in FIG. 2 (see undashed line in FIG. 3). In addition, it is very straightforward to use the same open-loop voltage control techniques in accordance with the present invention to generate the complementary lower flux (see dashed line in FIG. 3). In this manner, there is realized one feature of the invention, namely the generation of low-distortion dynamic force without resorting to complicated sensors or feedback circuits. However, if one were to generate this flux waveform in a one-sided motor such as the motor shown in FIG. 1, the resulting motor force would be (per the analysis above):

$$F_L \sim \phi_L^2 = A^2 + 2A^2\cos(\omega t) + A^2\cos^2(\omega t)$$
$$= A^2[1 + 2\cos(\omega t) + 0.5(1 + \cos(2\omega t))]$$
$$F_L \sim A^2[1.5 + 2\cos(\omega t) + \cos(2\omega t)]$$

Here, the lower subscript L is used to indicate the force, etc., in a one-sided motor. Note that this generated force, $F_L$, contains substantial second harmonic (in fact, the total harmonic distortion, or THD, is 50%). That is, for every pound of force produced at c, there is also experienced 0.5 pounds of force at 2$\omega$. For the many applications that require lower distortion force from a one-sided motor, some additional embodiments of the invention are presented.

It is a well known property of electromagnetic VR motors that one cannot generate an electromagnetic force between the core and the armature that tends to push them apart. Put another way, the electromagnetic forces between an "active" component (such as the core in the present invention) and a "passive" component (such as the armature in the present invention) are always attractive (one can generate repulsive forces in motors that incorporate permanent magnets, or that have two cores interacting directly across a common air gap). Designs that incorporate permanent magnets are outside the scope of this invention). So, for applications of the present invention, it is desirable to explore schemes that presume motor forces that vary between zero and some peak value; such force waveforms can be viewed as exhibiting separate static and dynamic force components.

The simplest such force waveform that would yield a zero-THD (pure sinusoidal) output can be represented by:

$$F_{motor} = A + A\cos(\omega t)$$

where A is the static force component and $A\cos(\omega t)$ is the dynamic force component. Since $F \sim \phi^2$, to realize this force waveform from a one-sided motor requires:

$$\phi_{motor} \sim \sqrt{F_{motor}} = \sqrt{A + A\cos(\omega t)}$$

and, to generate this flux waveform in the motor requires:

$$\begin{aligned}v_{applied} &= N\frac{d\phi_{motor}}{dt} + iR \\ &= N\frac{d\sqrt{A + A\cos(\omega t)}}{dt} + iR \\ &= NA\omega \frac{-1}{2\sqrt{A + A\cos(\omega t)}}\sin(\omega t) + iR\end{aligned} \quad (0.1)$$

While generation of the waveform described by equation (0.1) would be fairly complicated using analog circuitry, one can readily generate this waveform using standard waveform generation equipment. A computer may be programmed to provide such a waveform, for example. This voltage waveform (without the iR compensation) is shown graphically as waveform $V_s$ in FIG. 22, and it is best described as a series of cosine half-cycles. Such a voltage waveform to obtain low distortion operation corresponds to a second embodiment of the invention. Note also the smooth, sinusoidal force waveform that results even for realistic values of diode forward voltage drop and coil resistance. A frequency domain analysis of the second embodiment of the invention reveals no detectable motor force at frequencies other than 0 Hz and ω Hz (500 Hz for the frequency plot of time waveforms of FIG. 22 that is shown in FIG. 23). As with the first embodiment, the applied waveform exhibits a zero mean value, thus assuring flux waveform stability and a "return to zero" for the flux and current at least once each cycle. Also, the applied waveform can be slightly offset as described with reference to the first embodiment, if needed.

Figure 22:
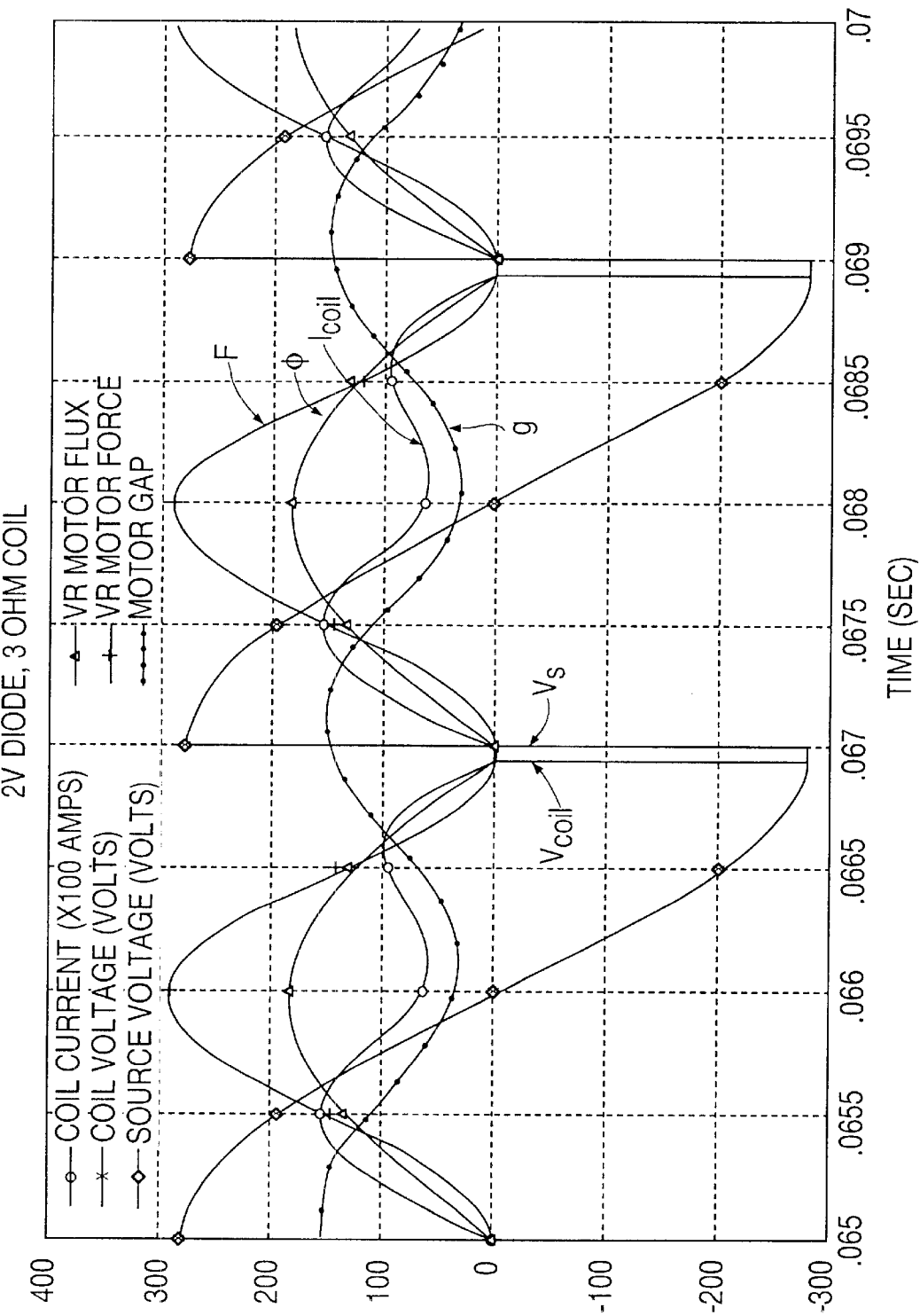
FIG. 22 shows time domain waveforms for controlling a typical VR motor coil that is driven with cosine half-waves, in accordance with an embodiment of the present invention.
Figure 23:
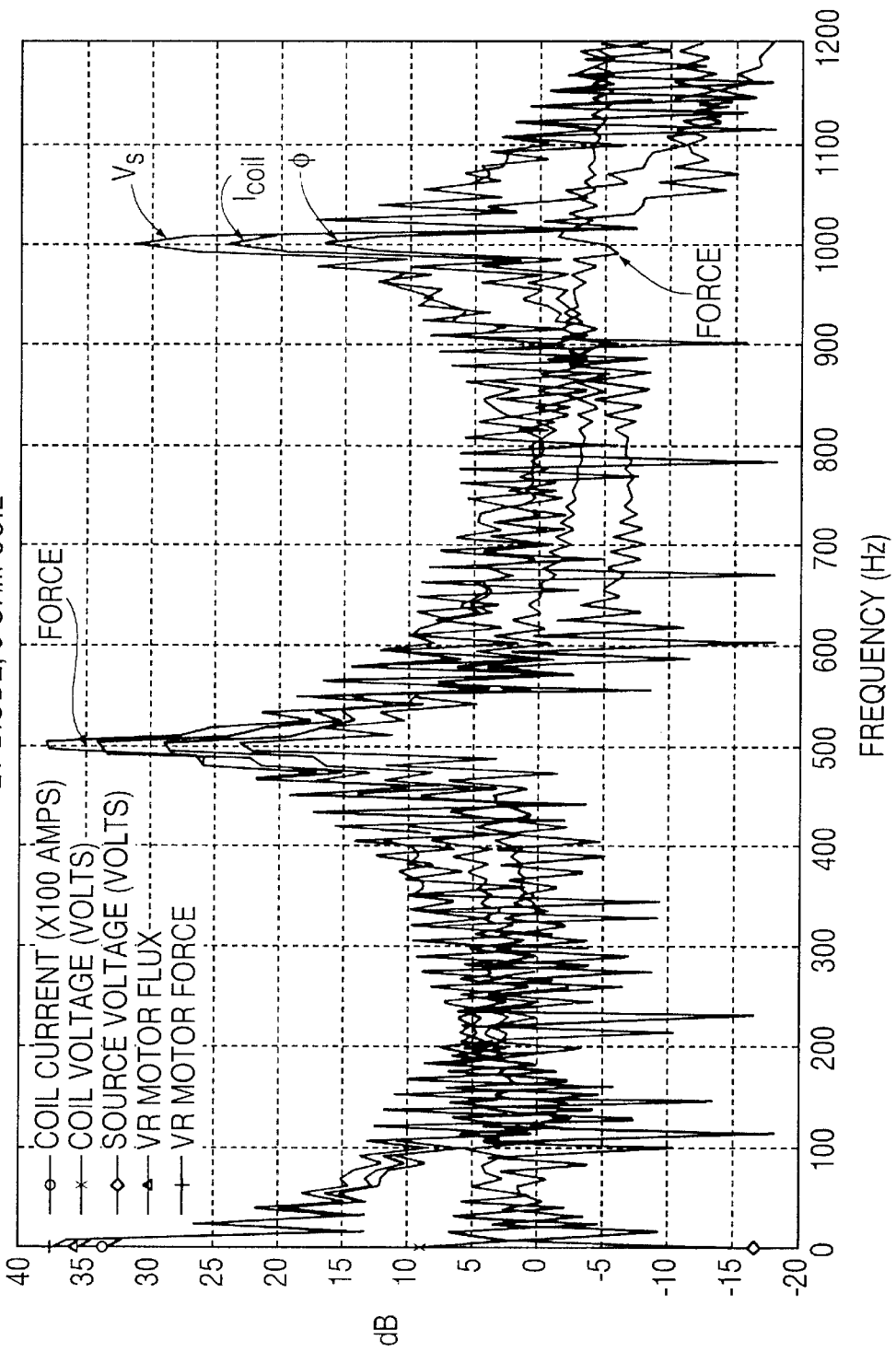
FIG. 23 shows frequency domain waveforms for controlling a typical VR motor coil that is driven with cosine half-waves, in accordance with an embodiment of the present invention.
Figure 24:
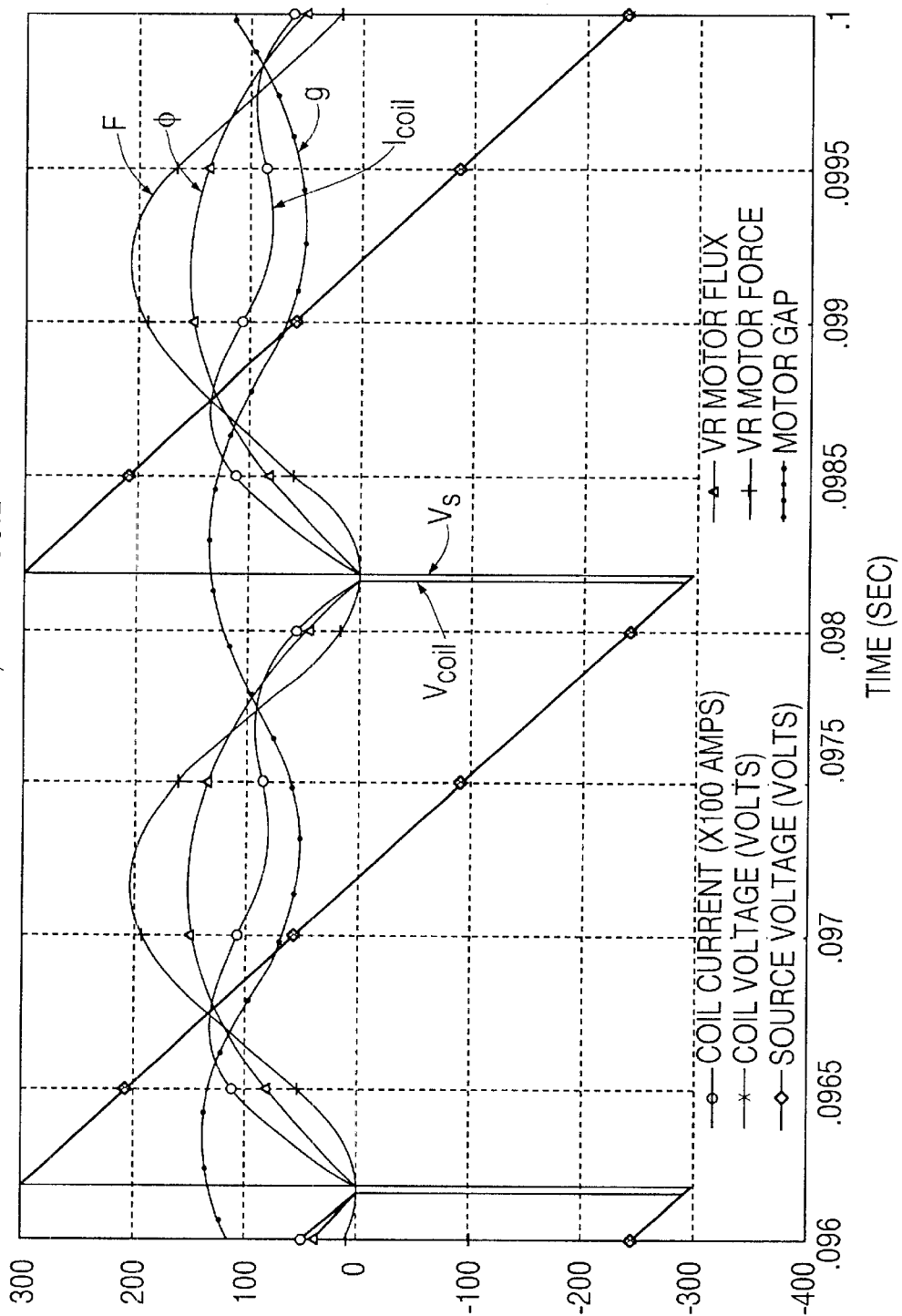
FIG. 24 shows time domain waveforms for controlling a typical VR motor coil that is driven with sawtooth waves, in accordance with an embodiment of the present invention.
Figure 25:
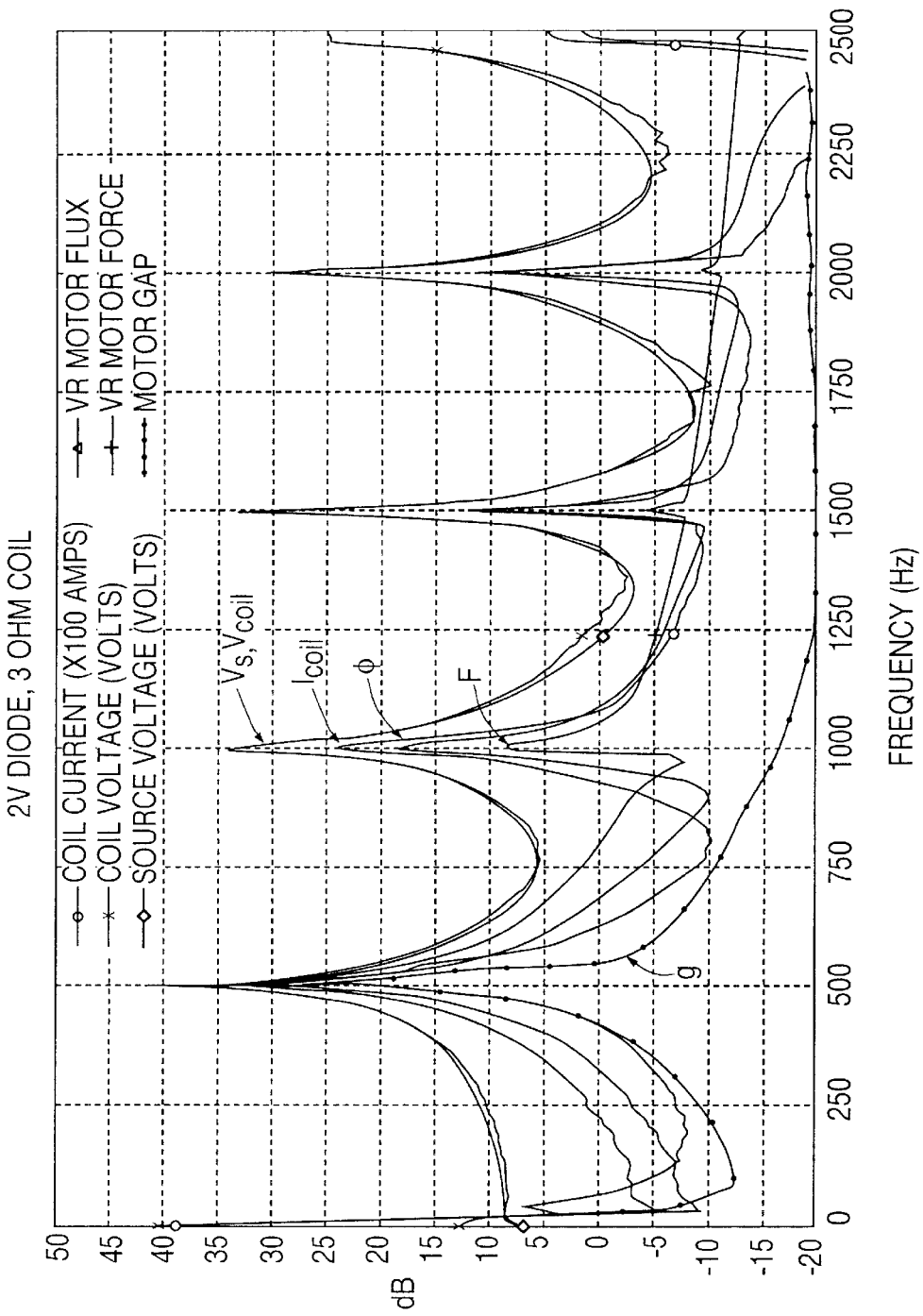
FIG. 25 shows frequency domain waveforms for controlling a typical VR motor coil that is driven with sawtooth waves, in accordance with an embodiment of the present invention.

Visual inspection of FIGS. 22 and 23 (time and frequency plots of waveforms, respectively) reveals that the "cosine half-cycles" waveform is fairly similar to a common, easily generated "sawtooth" waveform. Based on generation of a sawtooth waveform in accordance with a third embodiment of the invention (see FIGS. 24 and 25 for time and frequency plots of waveforms, respectively), one also observes a smooth, nearly sinusoidal force waveform. Frequency domain analysis of this waveform reveals that the force waveform has a second harmonic amplitude (at 2ω) approximately 30 dB below the amplitude observed at the fundamental excitation frequency (ω). This 30 dB difference represents a 1000:1 amplitude difference. Higher harmonics are all 40 dB below the fundamental (or lower). As with the first and second embodiments, the sawtooth embodiment has a zero mean value to assure flux stability. Also, the sawtooth embodiment may be provided with a small DC offset, if desired. However, if DC offset is used for the sawtooth embodiment, care must be taken so that a flux runaway condition does not occur.

A fourth embodiment of the invention will now be described with respect to motor operation at more than one frequency. Many applications require a dynamic force motor capable of generating force at more than one frequency. Traditionally, multi-frequency VR motor force generation has been severely complicated by the square-law relationship between force and flux $F \sim \phi^2$ as well as the nonlinearities introduced by traditional current control ($\phi \sim i/g$). For these applications, voice-coil actuators are often employed. Unfortunately, voice-coil actuators are heavy, expensive, and inefficient.

In the fourth embodiment of the invention, there is provided a control scheme by which dynamic force can be generated at multiple discrete frequencies. For the sake of brevity, a two-frequency example is shown, but the technique is readily extendable to any number of discrete frequencies.

As was demonstrated earlier for the single-frequency case, one starts by assuming the simplest two-frequency waveform that can be generated by a one-sided VR motor, namely:

$$F_{motor} = A + B + A\cos(\omega_1 t) + B\cos(\omega_2 t)$$

where A+B is the static force component and $A\cos(\omega_1 t)$ and $B\cos(\omega_2 t)$ are the dynamic force components. Since $F \sim \phi^2$, to realize this force waveform from a one-sided motor requires:

$$\phi_{motor} \sim \sqrt{F_{motor}} = \sqrt{A + B + A\cos(\omega_1 t) + B\cos(\omega_2 t)}$$

and, to generate this flux waveform in the motor requires:

$$\begin{aligned}v_{applied} &= N\frac{d\phi_{motor}}{dt} + iR \\ &= N\frac{d\sqrt{A + B + A\cos(\omega_1 t) + B\cos(\omega_2 t)}}{dt} + iR \\ &= \left[\frac{-1}{2\sqrt{A + B + A\cos(\omega_1 t) + B\cos(\omega_2 t)}}\right] \\ &\quad (NA\omega_1\sin(\omega_1 t) + NB\omega_2\sin(\omega_2 t)) + iR\end{aligned} \quad (0.2)$$

Figure 26:
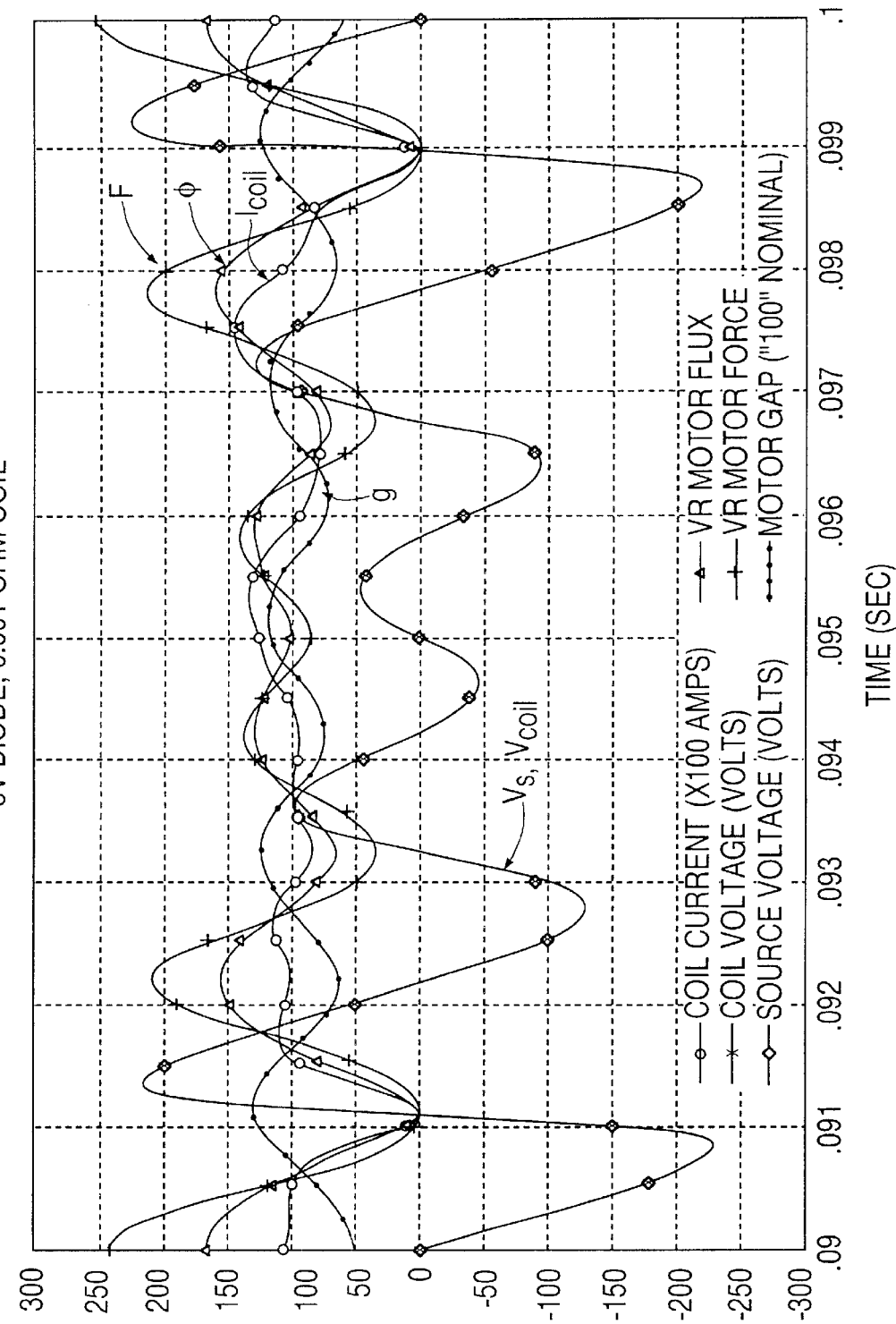
FIG. 26 shows time domain waveforms showing two-frequency cosine segment operation of an ideal VR motor coil, in accordance with an embodiment of the present invention.
Figure 27:
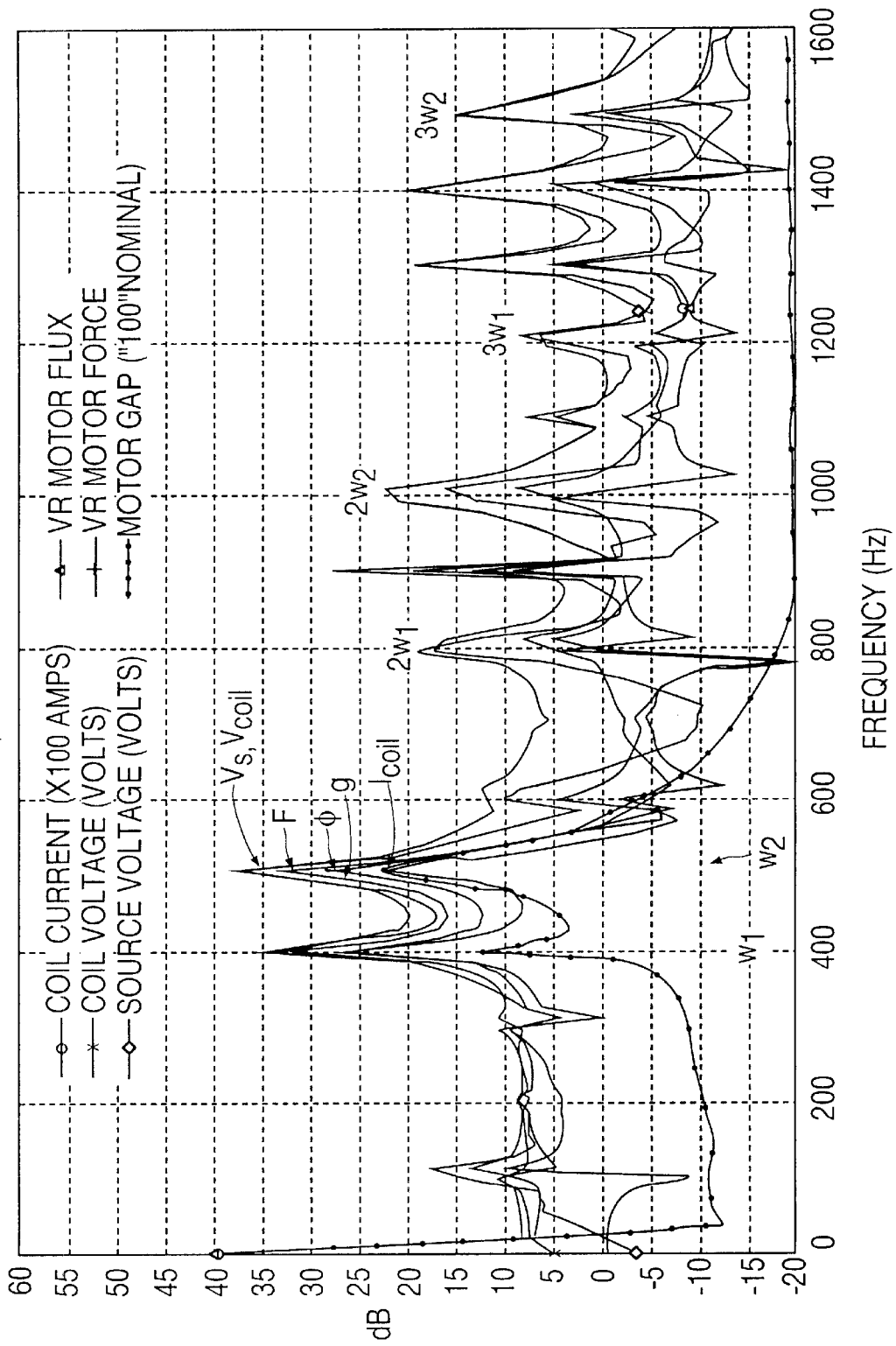
FIG. 27 shows frequency domain waveforms showing two-frequency cosine segment operation of an ideal VR motor coil, in accordance with an embodiment of the present invention.
Figure 28:
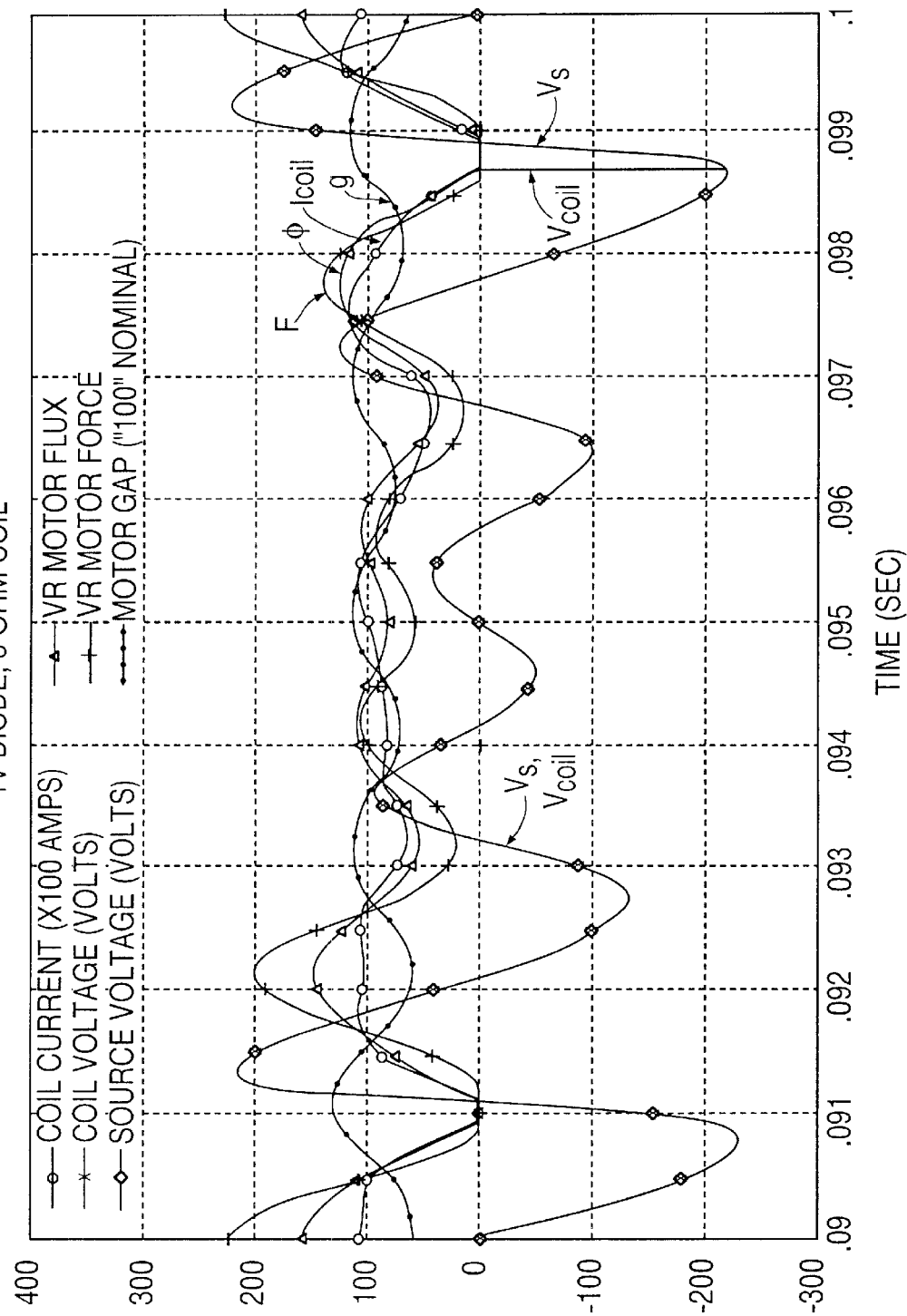
FIG. 28 shows time domain waveforms showing two-frequency cosine segment operation of a typical VR motor coil, in accordance with an embodiment of the present invention.
Figure 29:
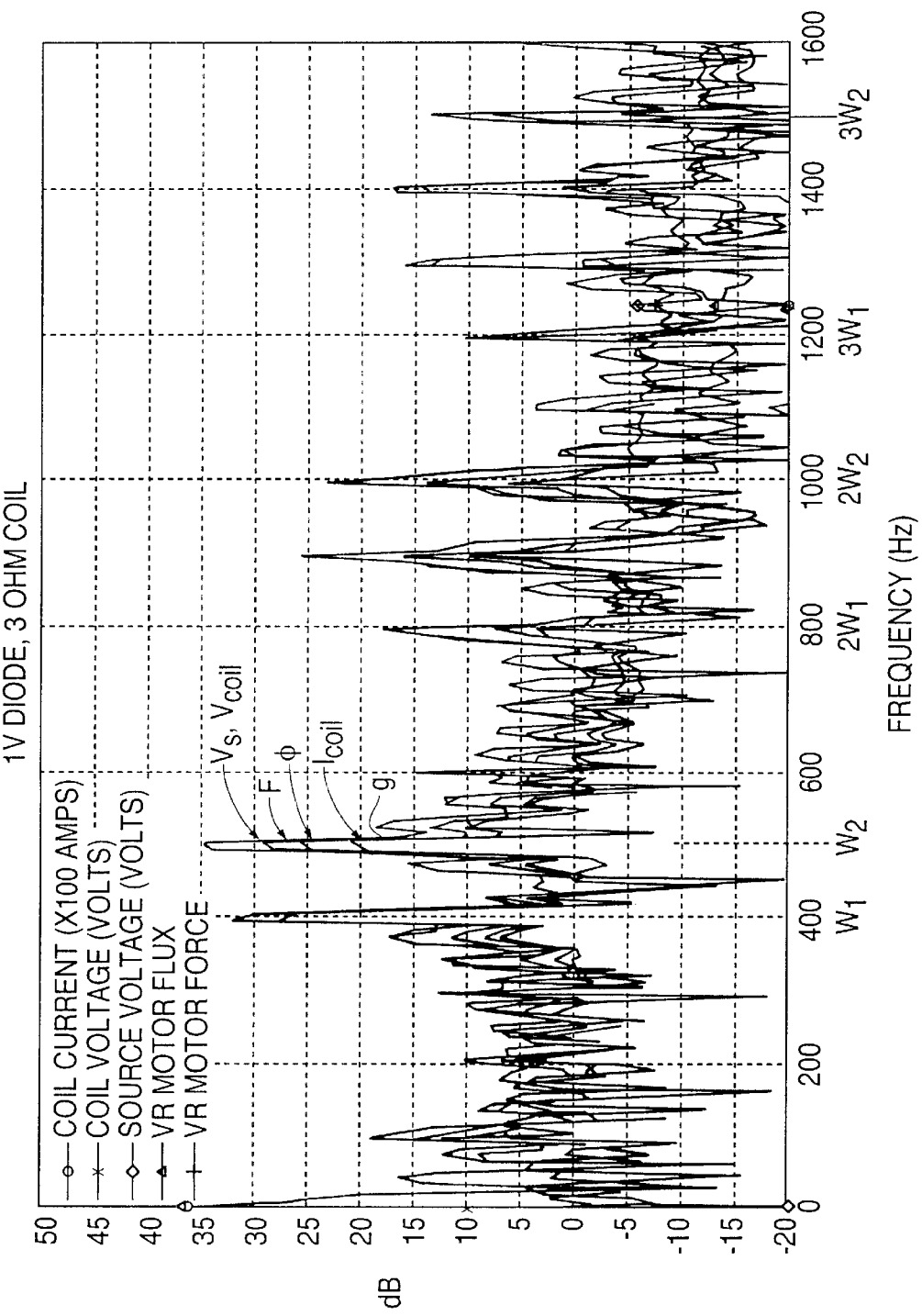
FIG. 29 shows frequency domain waveforms showing two-frequency cosine segment operation of a typical VR motor coil, in accordance with an embodiment of the present invention.

Two-frequency operation of a one-sided motor is demonstrated graphically in FIGS. 26, 27, 28 and 29 (FIGS. 26 and 28 are time plots, and FIGS. 27 and 29 are frequency plots). In FIG. 26, waveforms for a "0 volt" diode and a 0.001 ohm coil are shown (per FIG. 5); here the strongest distortion component is about 25 dB lower than the two fundamental force components. When this method is applied to a more realistic 1 volt diode and 3 ohm coil (FIG. 28), the distortion components are somewhat stronger (−20 dB), but still quite low. This multi-frequency technique is readily extended beyond the two frequencies demonstrated in this example. For a multi-frequency drive, the necessary flux is given by:

$$\phi_{motor} = \sqrt{F_{motor}}$$

$$= \sqrt{\sum_{n=1}^{\#\ of\ freq} (A_n + A_n\cos(\omega_n t))}$$

$$1 \leq n < \#\ of\ freq.$$

for which the appropriate drive voltage is:

$$v_{applied} = N\frac{d\phi_{motor}}{dt} + iR$$

$$= N\frac{d\sqrt{\sum_{n=1}^{\#\,of\,freq}(A_n + A_n\cos(\omega_n t))}}{dt} + iR$$

$$= \left[\frac{-1}{2\sqrt{\sum_{n=1}^{\#\,of\,freq}(A_n + A_n\cos(\omega_n t))}}\right]$$

$$\left(N\sum_{n=1}^{\#\,of\,freq} A_n\omega_n\sin(\omega_n t)\right) + iR$$

$1 \le n < \#$ of freq.

A fifth embodiment of the invention will now be described in detail. While some applications of VR dynamic force motors require low distortion (nearly sinusoidal) applied force, there are many applications for these motors where the driven load is very insensitive to the presence of substantial harmonics in the generated force waveforms. Examples of such "distortion tolerant" loads are any resonant loads that only respond appreciably at one fundamental frequency; a further example of this is a resonant acoustic chamber driven at its fundamental resonance frequency.

Figure 6:
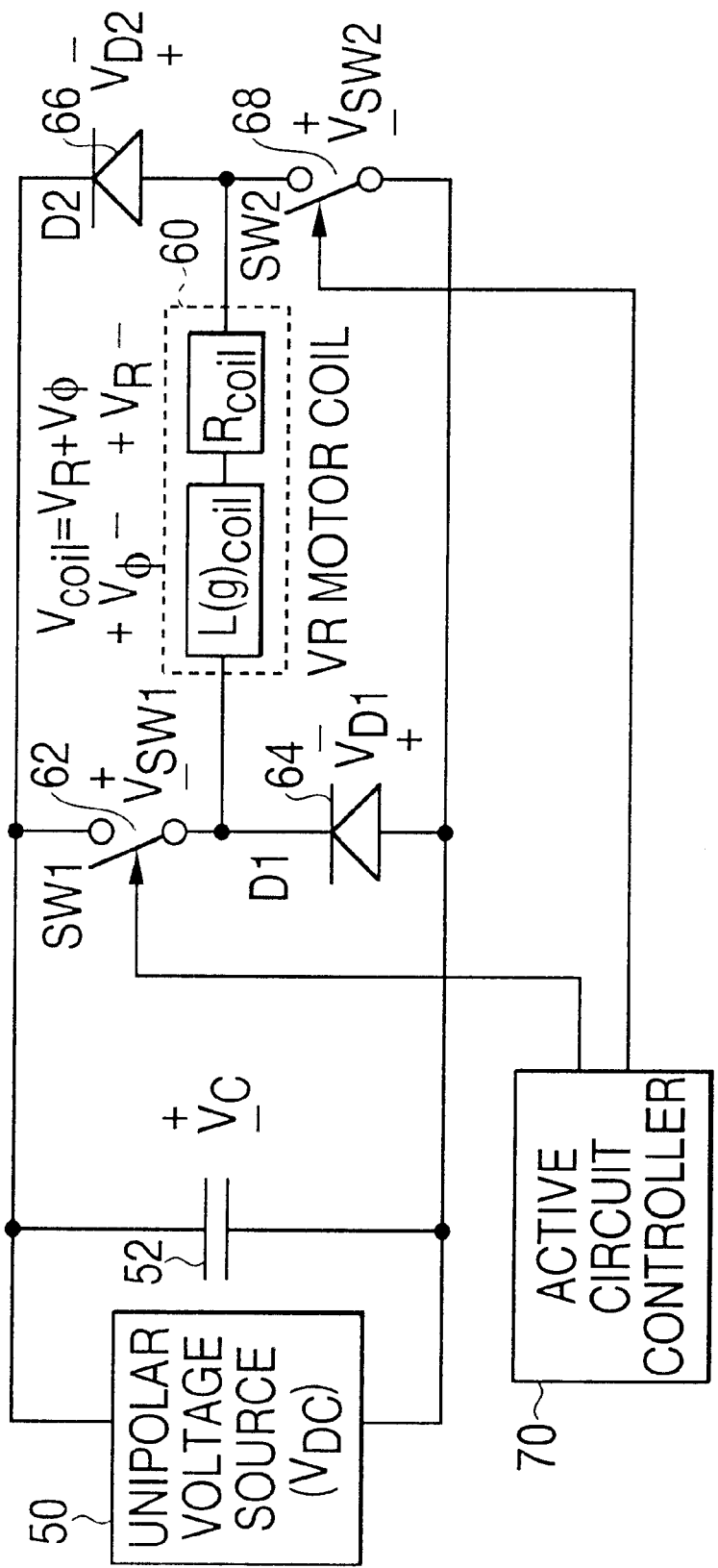
FIG. 6 shows a dual forward circuit topology as applied to a coil of a VR motor in accordance with an embodiment of the present invention.

For these distortion-tolerant VR motor applications, the fifth embodiment of the invention is provided. With reference to FIG. 6 (which shows an output topology commonly used to drive switched reluctance motor coils) and FIGS. 30 and 31, consider the following switching sequence:

1. Turn on switch SW1 62 and switch SW2 68 at time $t_0$ (times $t_n$ are annotated in FIGS. 30, 31 and 32). This leads to $v_{coil}=V_{DC}-2V_{SW-on}$ where $V_{SW-ons}$ is the voltage drop across SW1 or SW2 when in the on, or conducting, state. SW1 62 and SW2 68 can be any of several types of semiconductor or electromechanical controlled switch. The time from $t_0$ to $t_1$ is termed Phase 1. During Phase 1, the flux in the coil slews higher in a linear fashion; the coil current is generally increasing, but may be highly distorted and may decrease due to gap-induced impedance changes. During Phase 1, coil current flows through SW1 62 and SW2 68.

2. At time $t_1$, turn off SW1 62; leave SW2 68 turned on. This leads to $v_{coil}=-(V_{diode}+V_{SW-on})$.* The time from $t_1$ to $t_2$ is termed Phase 2. During Phase 2, the motor flux is nearly constant; coil current will vary in a manner consistent with motor gap motion. The coil current "freewheels" through diode D1 64 and SW2 68.

3. At time $t_2$, turn off SW2 68. This leads to $v_{coil}=-(2V_{diode}+V_{DC})$. The time from $t_2$ to $t_3$ is termed Phase 3. During Phase 3, the motor flux decreases in a linear fashion, and the coil current generally decreases. During this phase, the coil current freewheels through diode D1 64 and diode D2 66.

4. At time $t_3$, the coil current and motor flux reach zero, at which point no further current flows in D1 and D2, and these diodes passively return to their reverse-biased, or blocking, state. For the remainder of the cycle (until $t_5$), no voltage is applied to the motor and no current flows in the motor coil.

In an alternate sequence, one could choose to turn off SW2 68 in Phase 2, thus having the coil current freewheel through SW1 62 and D2 66. The voltages seen at the motor would be identical for this alternate scenario. FIG. 6 also shows a unipolar voltage source 50 connected in parallel with a capacitor 52, and with an active circuit controller providing the control for switching the switches SW1 62 and SW2 68 based on the above-described sequence.

Figure 30:
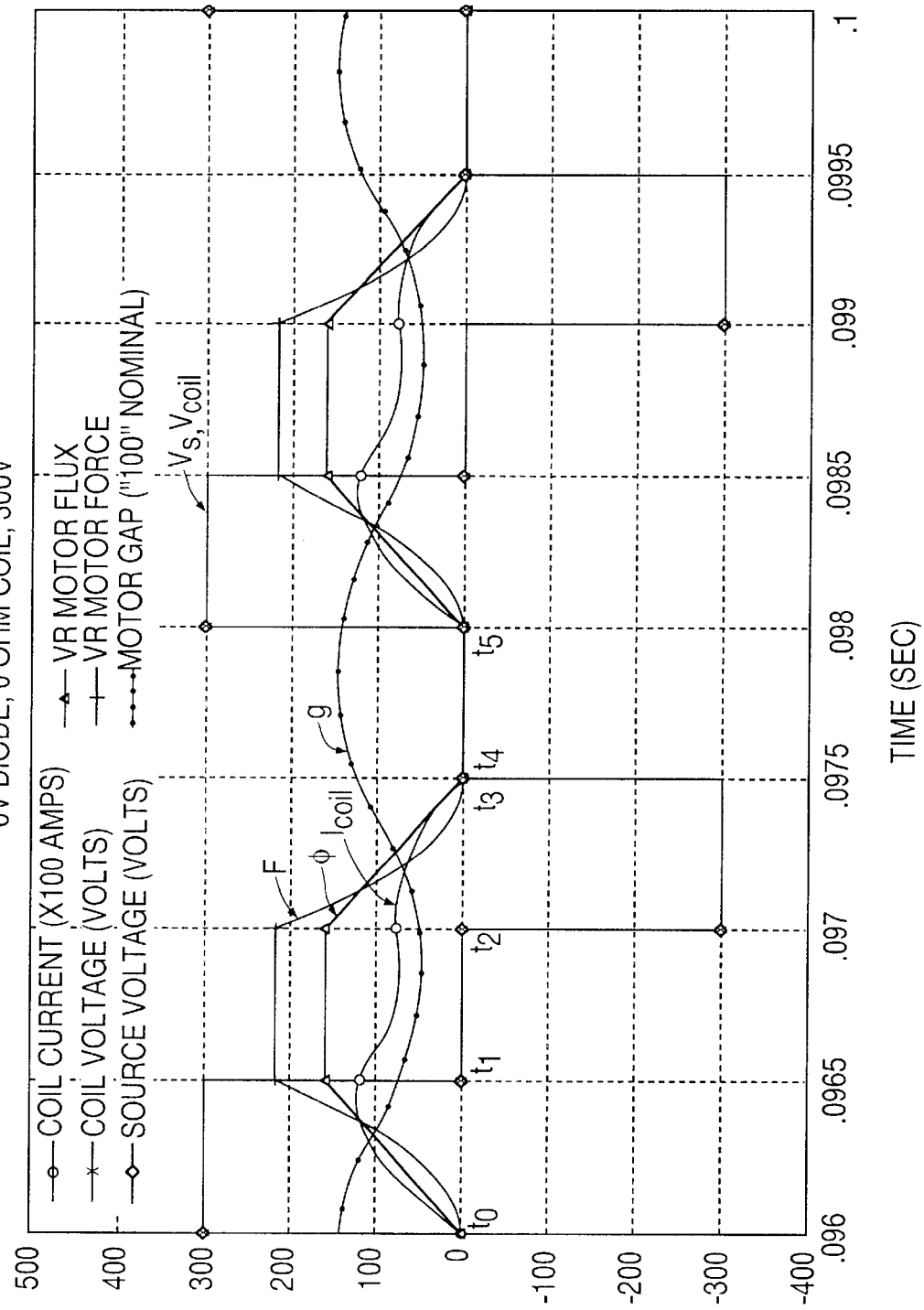
FIG. 30 shows time domain waveforms of pulse drive of an ideal VR motor coil, with 300V/25% duty cycle, in accordance with an embodiment of the present invention.
Figure 31:
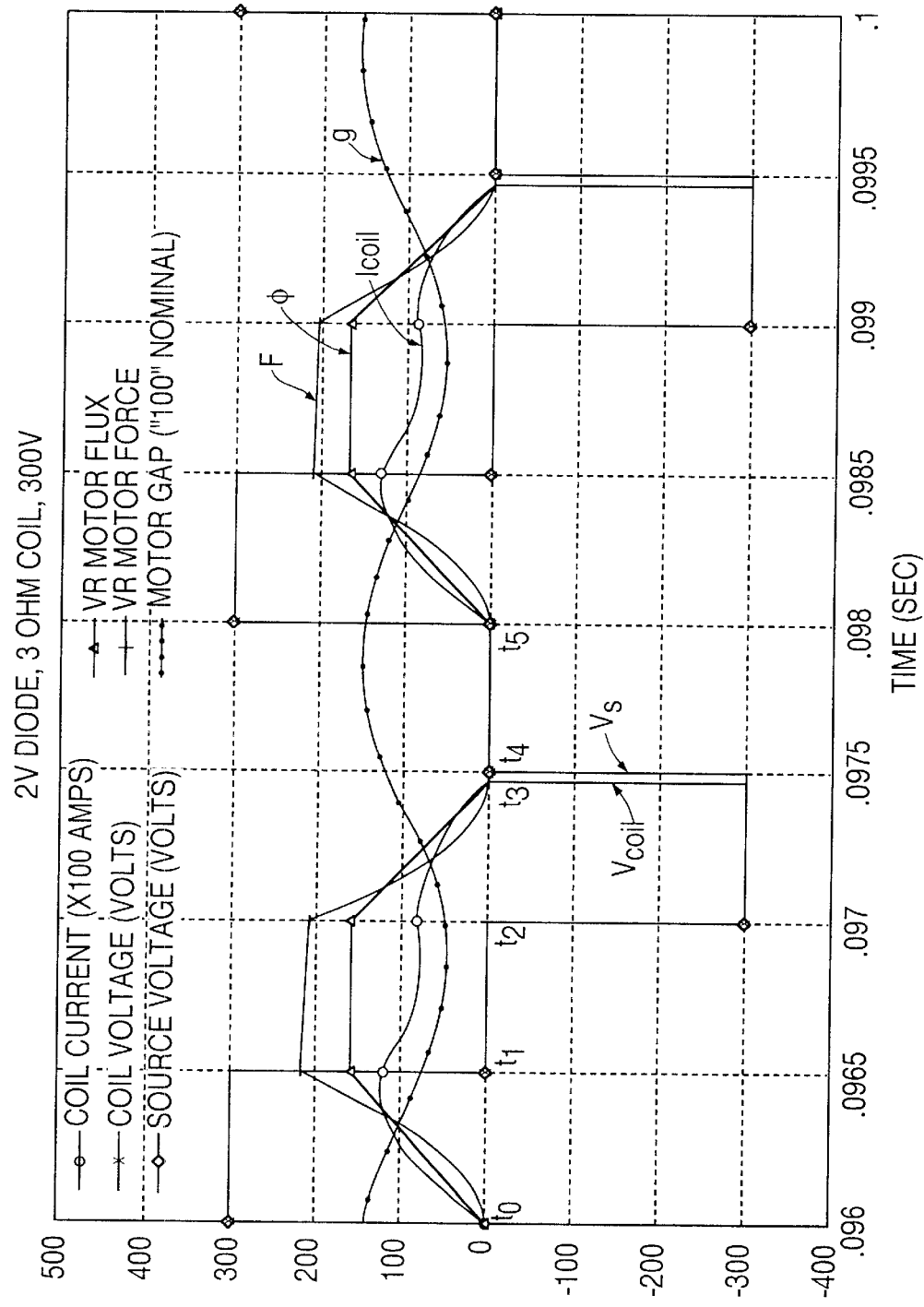
FIG. 31 shows time domain waveforms of pulse drive of a typical VR motor coil, with 300V/25% duty cycle, in accordance with an embodiment of the present invention.
Figure 32:
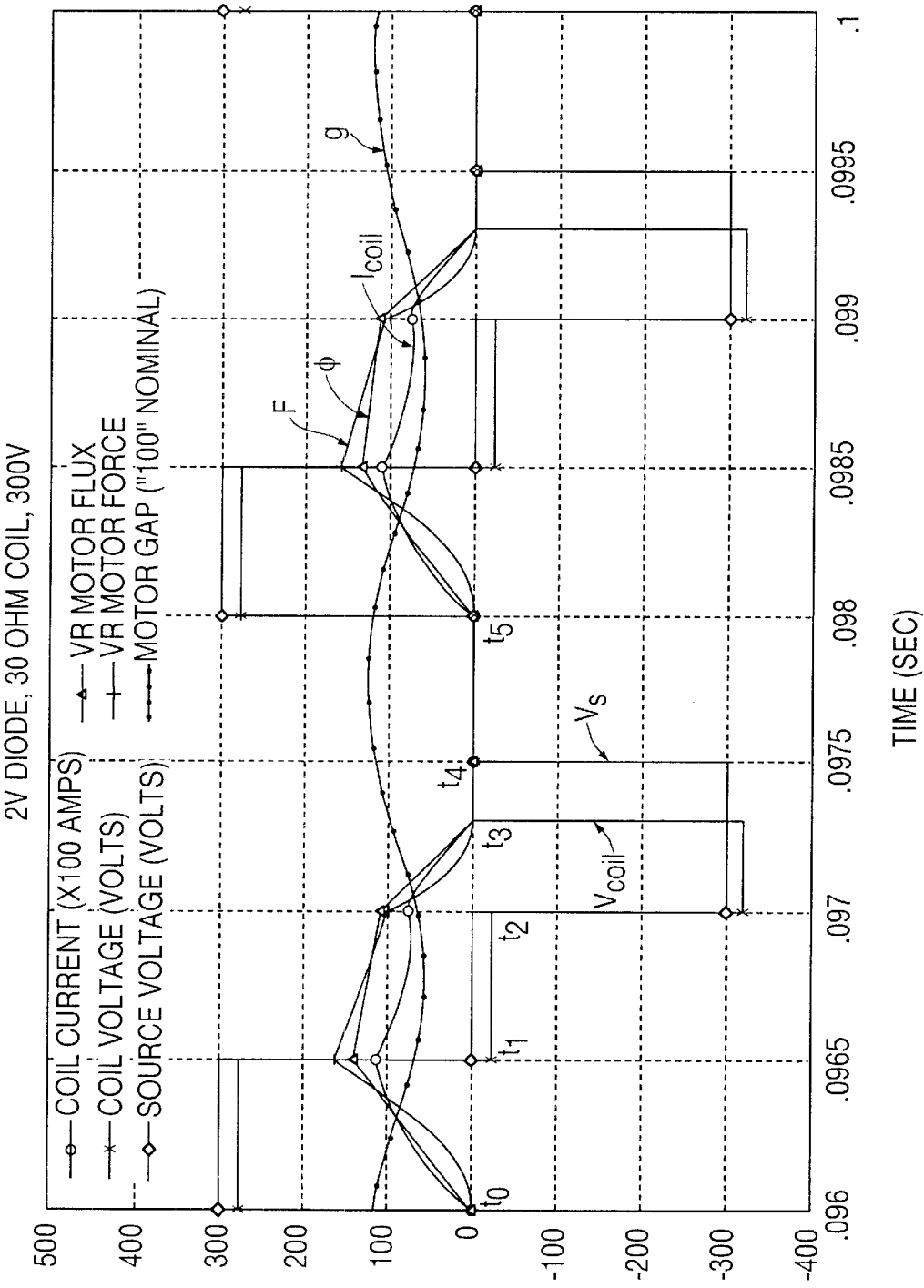
FIG. 32 shows time domain waveforms of pulse drive of a motor coil having exaggerated electrical properties, with 300V/25% duty cycle, in accordance with an embodiment of the present invention.

FIGS. 30, 31, and 32 show voltage, flux, force, current, and gap length waveforms for a representative VR motor excited by this discontinuous pulsed waveform. Note that, consistent with the voltage-flux relationship described earlier for the VR motor, the applied voltage pulses lead to a trapezoidal shaped flux profile. Although the strongest frequency component of the associated force waveform will be at the frequency determined by $f=1/(t_5-t_0)$, this generated dynamic force will clearly exhibit substantial dynamic forces at harmonics of this fundamental frequency. Thus, the fifth embodiment of the invention is very useful for those applications where a very low distortion sinusoidal applied force is not required.

As discussed earlier, semiconductor and ohmic voltage drops in the drive circuits for these VR motors serve to drive the motor flux and coil current towards zero more rapidly than away from zero (for a zero-mean applied dynamic voltage). Thus, referring to FIG. 31, the time it takes to increase the motor flux to its peak value (time $t_0$ to $t_1$) is slightly greater than the time to reduce the flux from its peak to zero (time $t_2$ to $t_3$). A highly exaggerated example of this behavior is shown in FIG. 32, where the coil has 30 ohms of DC resistance, and the transistors and diodes have 10 volts of on-state voltage drop. Here the "ramp-up" time is clearly longer than the "ramp-down" time.

As described earlier, open-loop stability of a VR motor controlled by an embodiment of the invention is dependent on the applied voltage having a mean (DC) value of no greater than zero. Examples were presented in which this mean value could be slightly increased to compensate for the effects of semiconductor and ohmic voltage drops, but these examples came with the requisite warnings that such schemes, if not very carefully employed, could destabilize the VR motor drive schemes.

Figure 33:
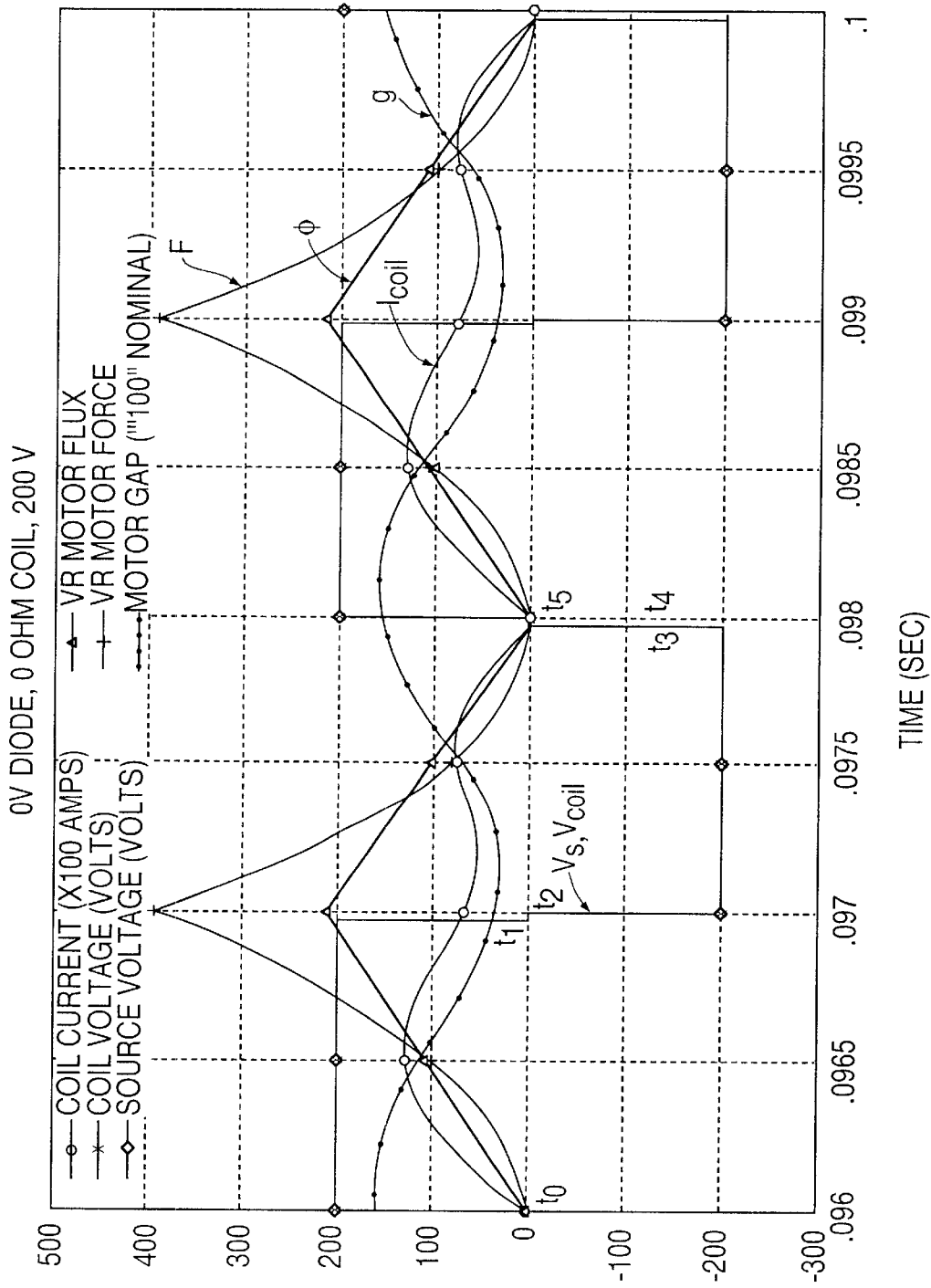
FIG. 33 shows time domain waveforms of pulse drive of an ideal VR motor coil, with 200V/49.5% duty cycle, in accordance with an embodiment of the present invention.
Figure 34:
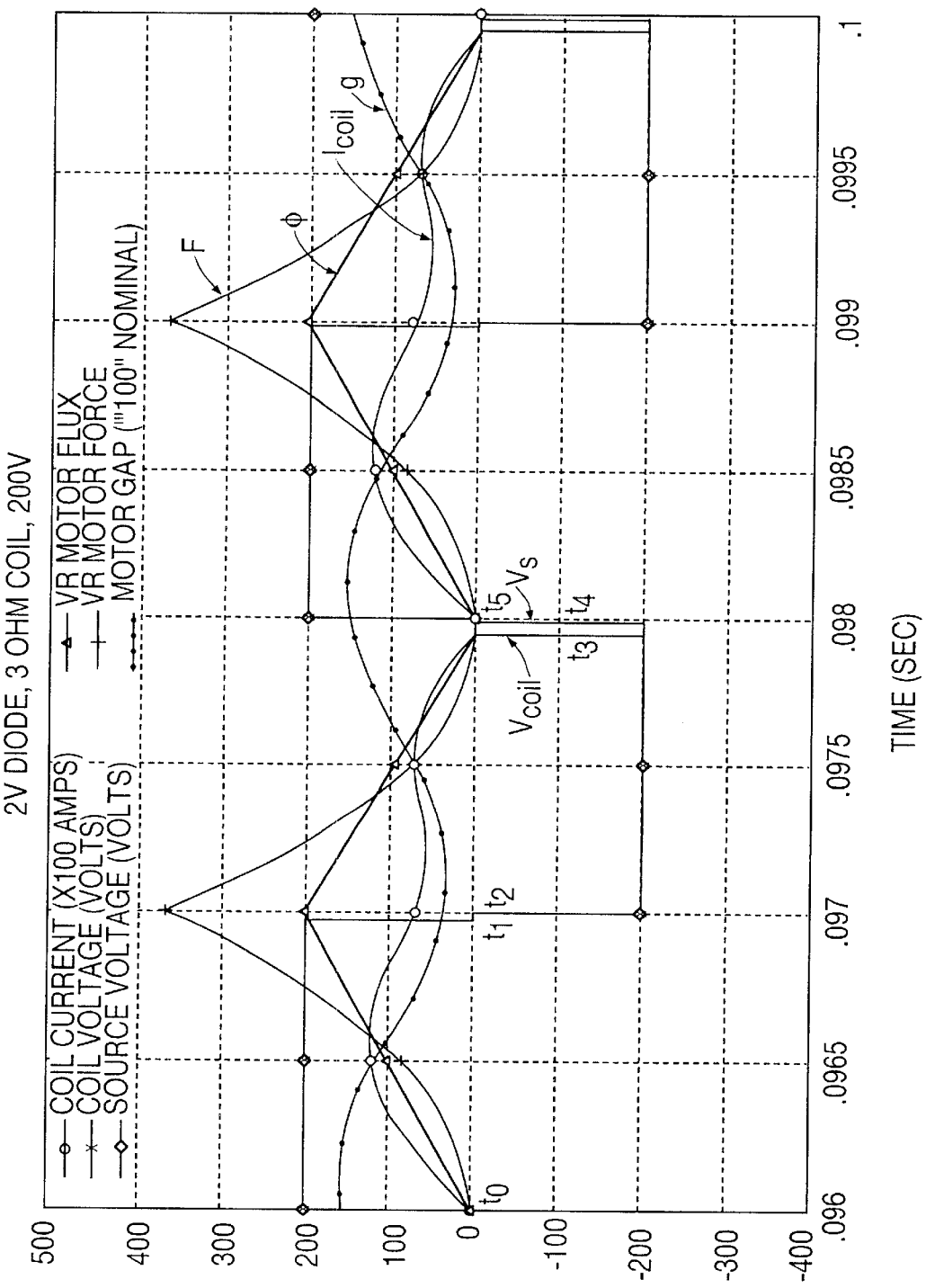
FIG. 34 shows time domain waveforms of pulse drive of a typical VR motor coil, with 200V/49.5% duty cycle, in accordance with an embodiment of the present invention.
Figure 35:
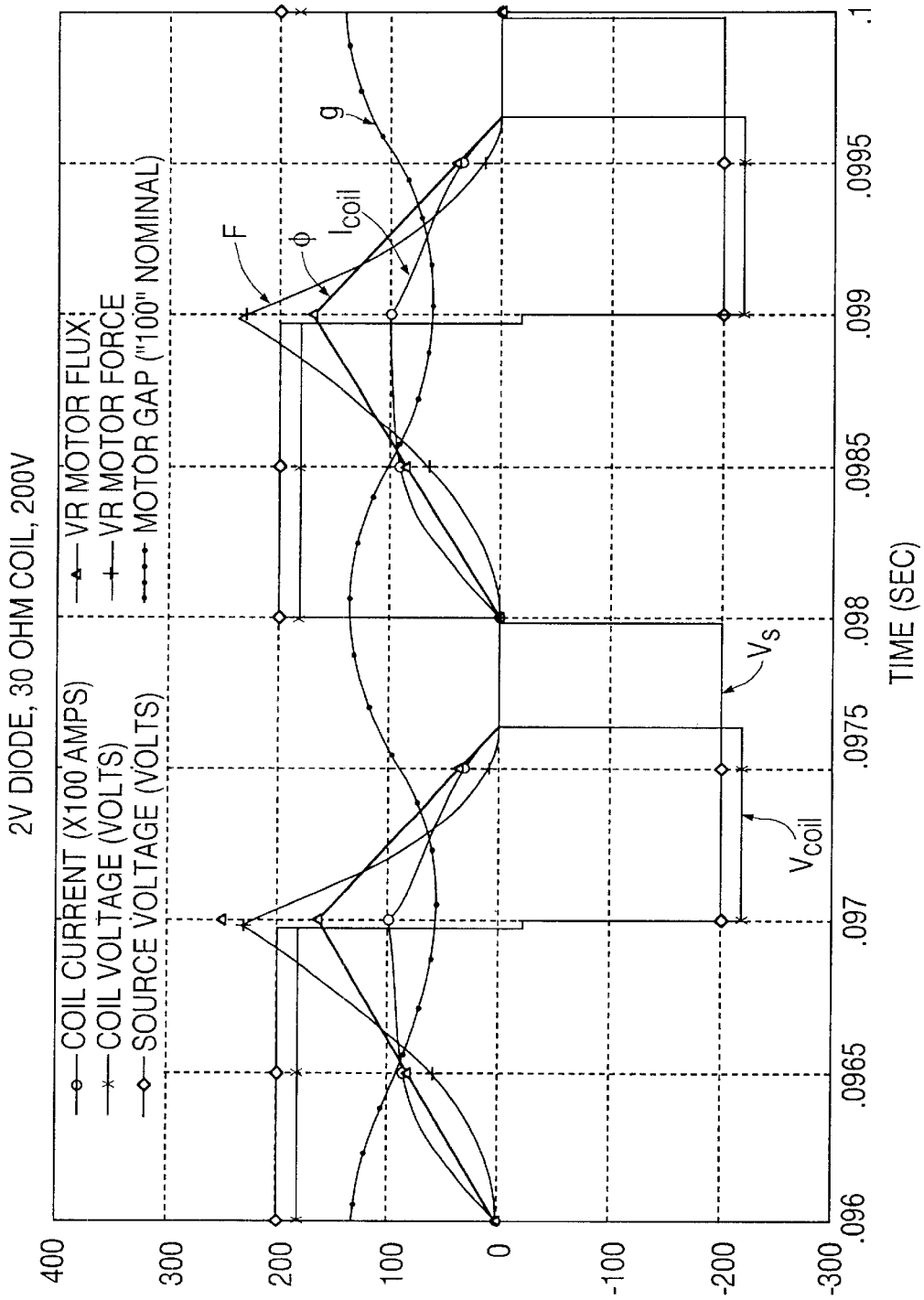
FIG. 35 shows time domain waveforms of pulse drive of a motor coil having exaggerated electrical properties, with 200V/49.5% duty cycle, in accordance with an embodiment of the present invention

The equivalent stability criterion for a pulse drive scheme is that the "ramp up" time ($t_0$ to $t_1$) cannot exceed 50% of the total cycle time ($t_0$ to $t_5$). Because of the slew-rate asymmetries discussed earlier, such a restriction guarantees that the motor flux and coil current will return to zero at least once per cycle, and flux runaway conditions will be avoided. One could consider slightly increasing this percentage (up to 51%) to compensate for the aforementioned voltage drops in any real motor system, but, again, there is the danger of overcompensating and thus negating the inherent open-loop stability guaranteed by the invention. Example waveforms of a system running at 49.5% duty cycle are shown in FIGS. 33, 34, and 35.

Figure 36:
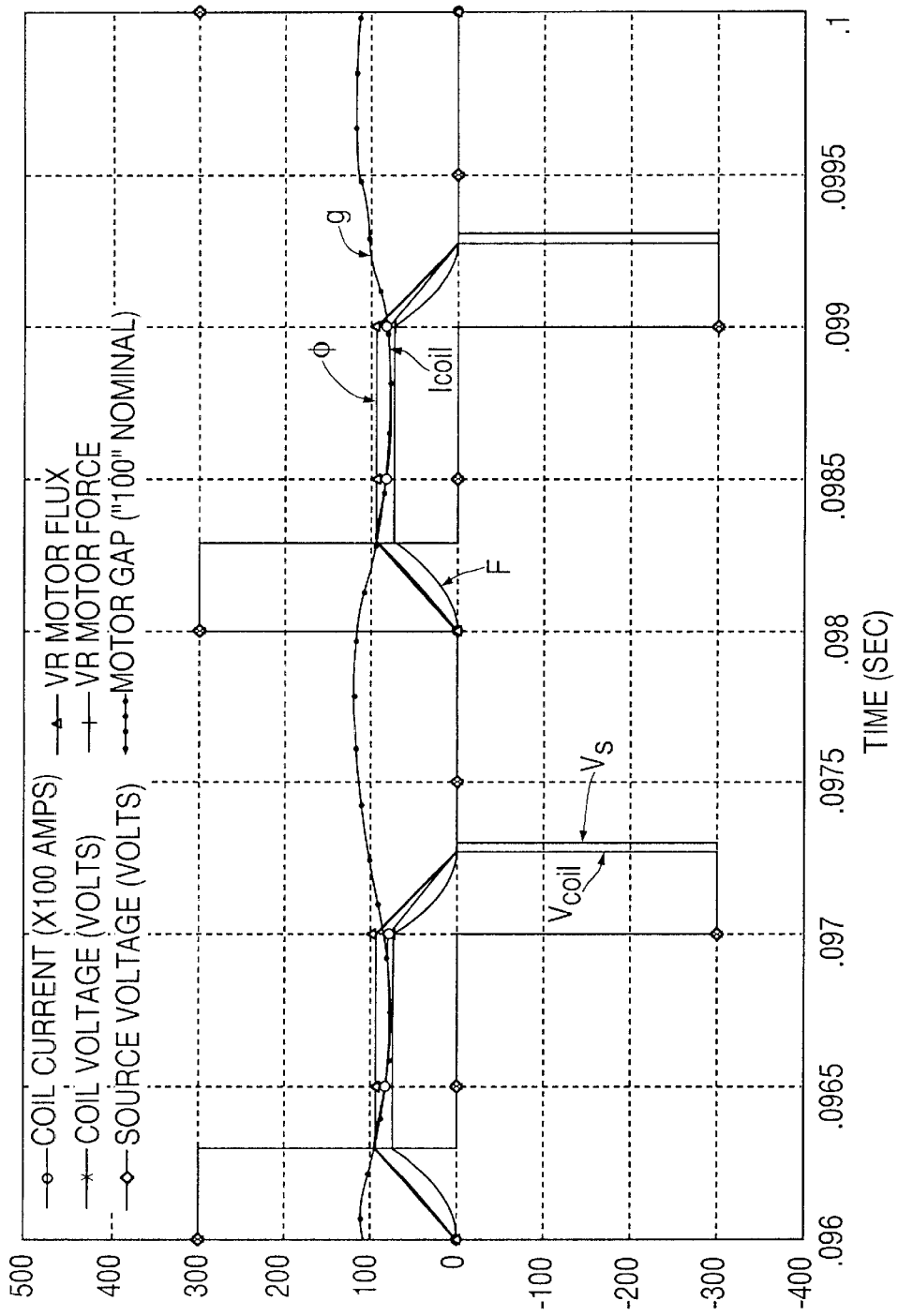
FIG. 36 shows time domain waveforms of pulse drive of a typical VR motor coil, with 300V/15% duty cycle, in accordance with an embodiment of the present invention.
Figure 37:
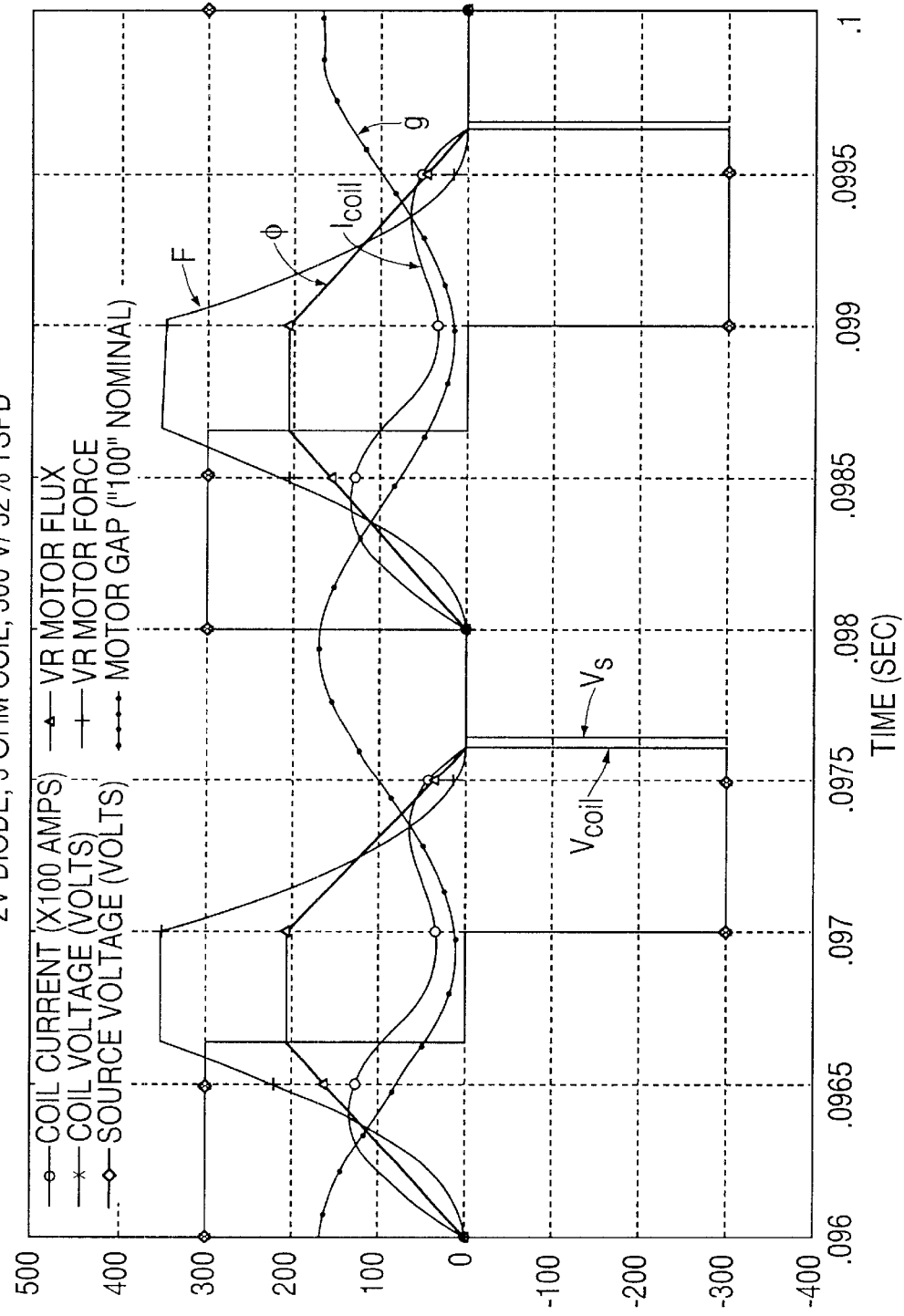
FIG. 37 shows time domain waveforms of pulse drive of a typical VR motor coil, with 300V/32% duty cycle, in accordance with an embodiment of the present invention.

Amplitude adjustment is accomplished in the earlier described embodiments by varying the amplitude of the applied voltage waveform. With pulsed, or switched, systems, where a fixed voltage is alternately switched on and off the load, one generally varies the pulse width, or duty cycle, of the output waveform. The pulse drive sixth embodiment of the invention accomplishes amplitude adjustments in this manner; simply varying the duty cycle of the waveform between 0% and 50% achieves the full range of motor amplitudes (see FIGS. 36 and 37 for example 15% and 32%. waveforms; FIG. 31 shows a 25% waveform).

While the fifth embodiment of the invention exhibits substantial harmonic distortion in the generated motor force, for those applications where such distortion is acceptable, this embodiment offers several distinct advantages over other drive schemes. First, the pulse drive method employs a switching-type output scheme, which generally exhibits much lower semiconductor losses than equivalent linear amplifiers. In addition, since typical pulse width modulation (PWM) switching amplifiers switch their output transistors at a frequency much higher than the desired fundamental output frequency (for a 500 Hz force waveform, a PWM amplifier switching at 20–40 kHz would commonly be employed), the pulse drive scheme discussed here will have lower switching losses by a factor of about 40:1 (20 kHz/500 Hz).

In addition to the advantage derived from the lower switching rate, half of the switching events in the switches SW1 62 and SW2 68 (whereby each may be configured by a transistor, for example) fall into the soft-switching category, which is defined as a device switching event that occurs when no current is flowing in the device. In contrast, a hard-switching event is defined as a device switching event that occurs when current is flowing in the device. Generally, hard switching events dissipate substantially more energy than soft switching events. The turn-on of SW1 62 and SW2 68 at the beginning of Phase 1 (see description above) is a soft-switching event; the turn-off of these devices (at the ends of Phases 2 and 3) are hard-switching events (turn-off occurs while current is still flowing in the transistors). In a typical PWM voltage amplifier, most of the switching events are hard switching.

Yet another advantage to soft-switching schemes is that they typically generate less electrical noise (conducted or radiated) than their hard-switching counterparts. Because the design requirement to make a rapid transition between ON and OFF states is eased, one can switch the transistors more gradually, thus substantially reducing the high frequency content of any radiated or conducted energy.

Besides the lower amplifier losses, the pulse drive scheme described here offers the potential to achieve higher maximum output force levels at the fundamental output frequency than would be possible with a sine-wave drive scheme. Those skilled in the art will appreciate that, for a given motor with its associated face area at the motor air gap, the peak electromagnetic force that can be generated between the armature and the core is given (to a first approximation) by:

$$F_{peak} = \frac{B_{sat}^2 A}{2\mu_0}$$

where $B_{sat}$ is the saturation flux density of the E and I stack material (typically an iron alloy), A is the total area of the ends of the E legs, and $\mu_0$ is the permeability of free space.

FIG. 7 shows sinusoidal (dashed curve) and trapezoidal (solid-line curve) flux waveforms (the trapezoidal waveform derives from a 25% duty cycle pulse drive scenario) that can be used in accordance with the fifth embodiment. Note that both waveforms vary between 0 and $B_{sat}$, the maximum flux density achievable for the motor in question. Designating the magnitude of the sinusoidal waveform as 1.0, it can readily be found that the Fourier coefficient of the fundamental frequency component of the trapezoidal waveform is about $1.14B_{sat}$, or 14% greater than the magnitude of the sinusoid. Applying the same analysis to the corresponding force waveforms (also in FIG. 7) reveals that the fundamental frequency force component of the trapezoidal waveform is 30% greater than its sinusoidal counterpart (this increased force is intuitively consistent with the greater area found underneath the Pulse Drive Force curve relative to the area underneath the Sin Drive Force curve). Thus, the pulse drive scheme, with its attendant trapezoidal waveform, offers a way by which one can generate additional electromagnetic force within the constraints of a given motor geometry. Note that since the pulse drive scheme generates larger amounts of harmonic distortion, one should expect to observe higher dissipation in the magnetic structure of the motor (relative to sinusoidal drive) when using this scheme.

Inspection of FIG. 6 reveals that this circuit is a unipolar design, meaning that current can only flow through the load in one direction. Thus, this circuit inherently implements the functionality of the series diode-coil circuit discussed above, but without the addition of the series diode.

In a sixth embodiment of the invention, switches SW1 62 and SW2 68 of FIG. 6 are switched on and off using a high frequency, PWM scheme, where the modulation of the high frequency chopping signal varies with the application (it could be any of the sinusoidal, cosine segment, or other schemes discussed earlier). Since the drive circuit is inherently unipolar, one observes the same behavior as if these schemes were implemented with a bipolar amplifier and a series diode-coil. To guarantee open-loop stability, the average duty cycle generated by the PWM circuit must be no greater than 50%. For such embodiments, the PWM waveform is generated in the same Active Circuit Controller 70 in FIG. 6 used to generate the lower frequency drive pulses discussed earlier. This Active Circuit Controller 70 is generally a device capable of generating any user-defined pulse train, and it often contains a microprocessor or other computer element. One such commercially-available controller is Part # MC688332, manufactured by Motorola.

When using schemes that employ open-loop modulation of an output PWM stage, one is sensitive to variations in the amplitude of the D.C. voltage supplying the circuit. In particular, if one utilizes an unregulated rectifier supply that converts 60 Hz AC line power to unregulated DC power, one will experience 120 Hz or 60 Hz ripple of the output voltage of this supply. This ripple, when applied to an open-loop-driven output stage, leads to 120 Hz or 60 Hz amplitude modulation of the output flux realized in a motor. If this amplitude modulation is problematic, it can be reduced with additional power supply filtering or can be compensated by "pre-modulating" the duty cycle requested of the PWM amplifier at a synchronized 120 Hz or 60 Hz rate. Switching amplifiers that measure the actual output voltage and use this measurement in a feedback configuration to compensate for power supply variations are not subject to this amplitude modulation distortion. Such "voltage feedback" amplifiers are still open-loop devices for the purpose of the present invention, since they do not explicitly measure any states inherent to the motor coil(s) being driven.

While many of the embodiments of the invention discussed so far have been presented in the context of a one-sided VR motor (such as that shown in FIG. 1), all of these embodiments are equally applicable to a two-sided VR motor (for example, as shown in FIG. 2), and even to other types of motors, such as a multiple-operating-frequency (f1/f2) motor, or motors such as the ones shown in FIGS. 13 and 14. A previous example demonstrated the operation of a two-sided motor excited with complementary sinusoidal flux waveforms; in this example, successful operation of the motor was accomplished by phasing the left and right flux waveforms so that the peak left flux occurred when the right flux was zero and the peak right flux occurred when the left flux was zero. With such phasing, the peak net force between the armature and the core assembly alternates between pulling left and pulling right. If the two core halves are identical, then the static (D.C.) components of the left and right forces will balance, resulting in a net zero static force between the armature and the core assembly. As discussed above, for properly phased offset-sinusoidal flux waveforms in the left and right motor gaps, the second harmonic terms cancel, leaving one with a sinusoidal output force.

Each of the embodiments described herein is applicable to two-sided VR motors. In general, for those drive schemes that exhibit harmonic force distortion when applied to a one-sided motor, one observes cancellation of the even distortion terms ($2\omega$, $4\omega$, $6\omega$, and so on). Thus, while the complementary nature of the two-sided motor does not completely eliminate distortion terms, is greatly reduces them. For all of these drive schemes, the proper phasing of the signals is that which synchronizes the zeroes of one flux waveform with the peaks of the other (as discussed for the sinusoid above).

Furthermore, each of the embodiments is applicable to other types of motors that have the following features in common: an air gap between a core and a moving part, motion, coils, and use of electromagnetic force to provide motion. For example, wrap-around motors, EIE motors, IEI motors, or f1/f2 motors may be operated in accordance with any of the embodiments described herein.

Since, for any realizable motor assembly, it is unlikely that the left and right nominal gap lengths will be identical, it is instructive to consider how this motor behaves for unequal gaps. Recalling the basic operating equation for the drive schemes of the invention, $$v = N\frac{d\phi}{dt} + iR,$$

it is noted that, as discussed earlier, the relationship between applied coil voltage and resultant motor flux is independent of gap length (except for the small iR distortion term). Thus, while the current observed in the left and right motor coils may be different for the same applied voltage, the developed flux (and force) on the left and right sides will be the same (assuming identical coils and core geometries).

Figure 8:
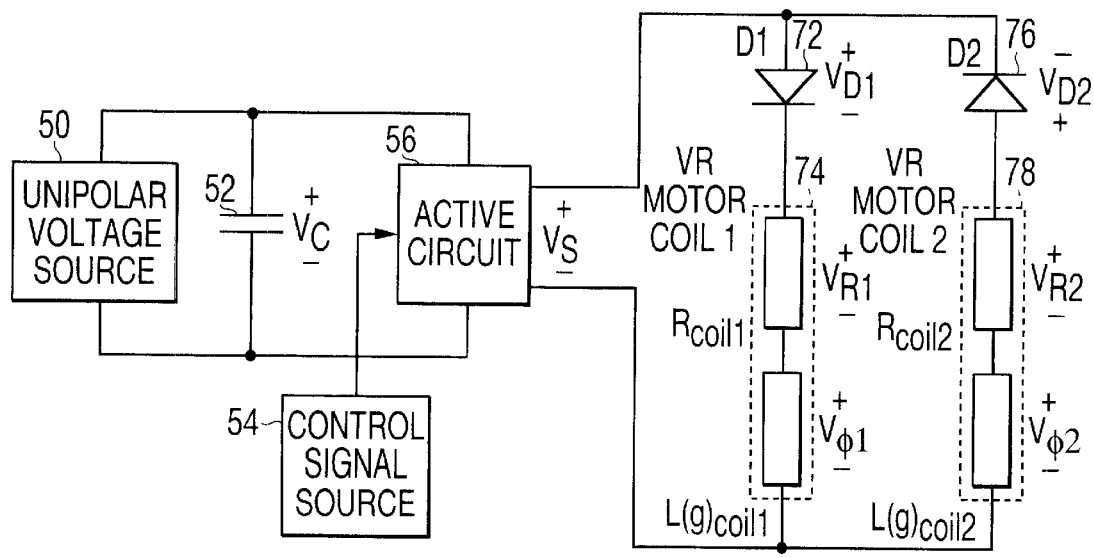
FIG. 8 shows a circuit used to drive reverse-parallel diode-coil pairs for a two-sided motor, in accordance with an embodiment of the present invention (with this circuit, a two-sided motor can be driven with a single active circuit)

One way of achieving the proper phasing of the left and right flux waveforms is to drive the left and right coils in the manner shown by FIG. 8, in accordance with a seventh embodiment of the invention. Here, an active circuit 56, for example a bipolar amplifier, is used to drive the two coils, each with a series diode, diode 72 with coil 74, diode 76 with coil 78. Each diode (72 and 76) conducts in the opposite direction relative to the amplifier output voltage $V_s$. These two diode-coil pairs are driven in parallel by the active circuit amplifier 56 in accordance with the connections shown in FIG. 8. As noted above, the currents in these two coils will be different to the degree that the nominal air gap lengths are different. However, the net D.C. current flow from the amplifier 56 is limited to the difference between the two individual D.C. coil currents in coils 74 and 78.

Figure 9:
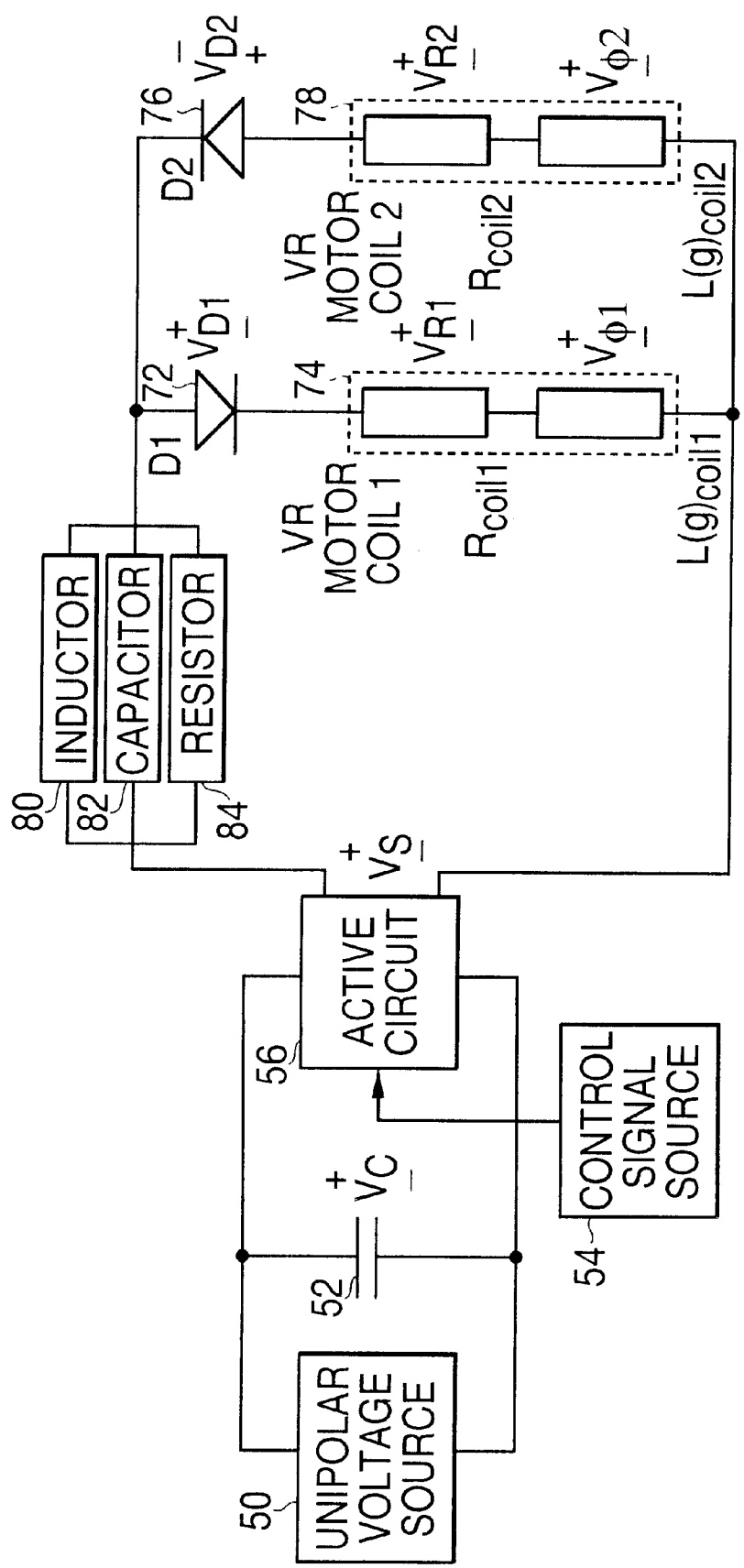
FIG. 9 shows a circuit similar to that shown in FIG. 8, but with an LCR element inserted in series with the reverse-parallel diode-coil pairs, in accordance with an embodiment of the present invention.

A variation on this scheme is shown in FIG. 9, which shows an eighth embodiment of the invention, in which a series capacitor 82 has been inserted between the amplifier and the pair of motor coils and diodes shown in FIG. 8 (as in FIG. 8, the active circuit 56 comprises a linear or switching voltage amplifier). Optionally, a resistor 84 and an inductor 80 may be added in parallel to the series capacitor 82. The addition of the series capacitor 82 permits one to realize a resonant voltage boost from the L-R-C circuit formed by the motor coils 74 and 78 ($L_{coil}+R_{coil}$//$L_{coil2}+R_{coil2}$) and the series capacitor 82 (C). However, in the absence of the optional inductor and/or resistor, the DC voltage across the capacitor will be non-zero to the extent that the motor air gaps are of unequal lengths (the motor coil with a larger gap will experience a higher coil current for the same applied voltage). These unbalanced currents cause net charge to build up on the series capacitor to maintain the same DC current in both coils; this capacitor voltage is polarized in such a way that the coil with the larger gap experiences a net reduction in the applied voltage, and the coil with the smaller gap experiences a net increase. Thus, the side of the motor with the smaller gap generates larger forces, thus acting to destabilize the motor. The extent to which such destabilization is acceptable depends on, among other things, the stiffness of the armature suspension and the degree of mismatch of the gap lengths. One can alleviate this destabilization by installing in parallel with the series capacitor 82 an inductor 80 and resistor 84 of suitable value so that the DC unbalance current can flow, but not of such value that the voltage boosting effect of the resonant circuit is disturbed. The determination of appropriate values for the inductor 80 and resistor 84 is readily ascertainable to one skilled in the art.

Each of the embodiments of the invention described heretofore have not required any active feedback control for their successful implementation (they are all open-loop schemes). There is a class of embodiments of the invention that relies on a combination of open-loop voltage control for the dynamic component of the drive signal (like the schemes discussed above) and low-frequency current control for bias adjustment to achieve stable, large gap excursion operation of VR dynamic force motors.

As discussed above, application of a zero-mean dynamic voltage signal to a series diode-coil (as in FIG. 5) results in current and flux waveforms that slew towards zero more rapidly than they slew away from zero. Thus, in real-world applications with finite voltage-drop diodes and finite resistance coils, these waveforms exhibit, to a greater or lesser extent, "zero-clipping" for part of each cycle of the dynamic waveform. Several embodiments of the invention employ low-frequency current feedback to minimize this zero-clipping behavior, while other embodiments utilize no feedback at all. Use of low-frequency current feedback is described below in connection with a ninth embodiment of the invention.

Consider, for example, the response of a VR motor coil to application of the voltage waveform:

$$v_{applied} = A\,cos(\omega_1 t) + B\,cos(\omega_2 t)$$

to the series diode-coil combination of FIG. 5. With an ideal load (zero diode voltage drop, zero resistance coil), one expects a resultant flux waveform of the form:

$$\omega \sim A + B + A\,sin(\omega 1 t) + B\,sin(\omega 2 t)$$

This waveform has an envelope at the difference frequency $|\omega_1 - \omega_2|$, the peaks of which are at zero. Because of the asymmetric stewing characteristics discussed earlier for applications with finite diode voltage drop and finite resistance coils, the peaks of the flux waveform envelope are clipped at zero.

Figure 38:
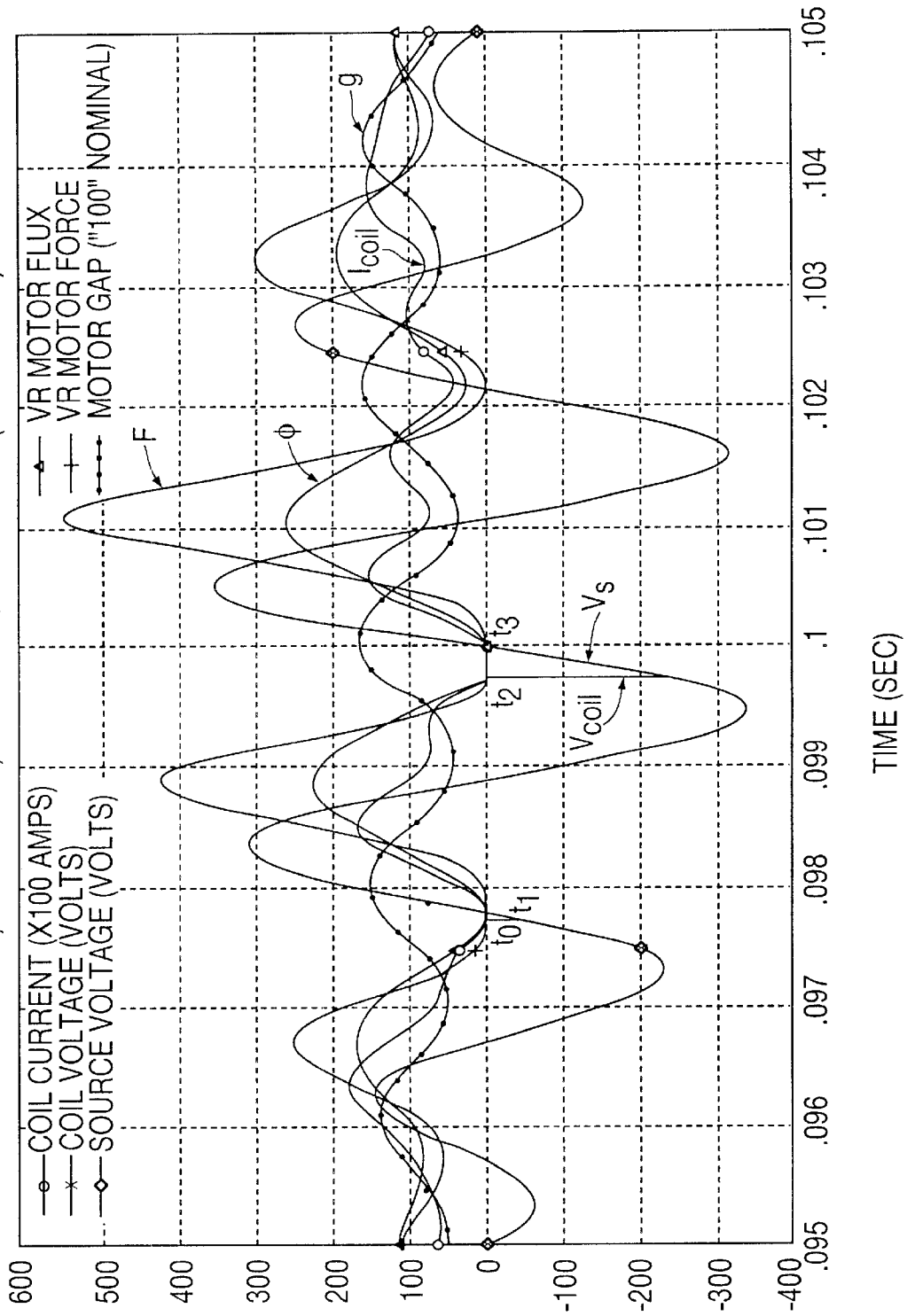
FIG. 38 shows time domain waveforms of two-frequency sinusoidal operation of a typical VR motor coil with no offset adjustment, in accordance with an embodiment of the present invention.
Figure 39:
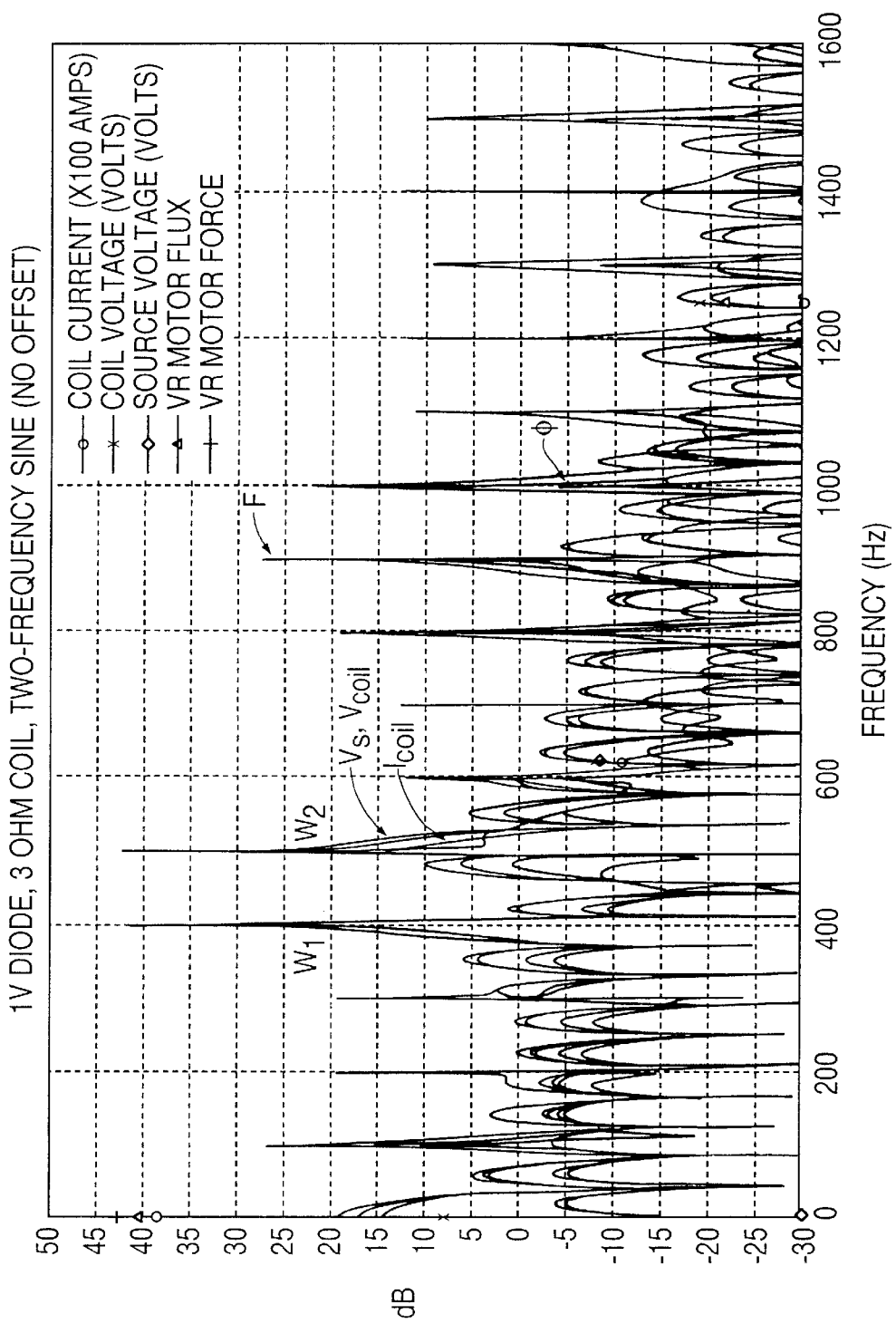
FIG. 39 shows frequency domain waveforms of two-frequency sinusoidal operation of a typical VR motor coil with no offset adjustment, in accordance with an embodiment of the present invention.

Inspection of FIGS. 38 and 39 reveals the effect of asymmetric slewing on this two-frequency flux waveform. As the envelope of the flux waveform swells towards a peak, one observes successive tip "collisions" as the flux and current reach zero. From $t_0$ to $t_1$ there can be seen a minor clipping of the flux waveform, but from $t_2$ to $t_3$ the flux waveform experiences substantial zero clipping. While this clipping may not appear to the naked eye to be substantial, it can introduce significant flux and force components at $\omega_1 \pm |\omega_1 - \omega_2|$ and $\omega_2 \pm |\omega_1 - \omega_2|$ (see FIG. 39 for a frequency domain analysis). To a great extent, these distortion components are not cancelled by employing this drive scheme with a two-sided motor. Thus, reducing or eliminating these distortion components by reducing zero clipping offers the potential for significantly improved motor performance.

As discussed earlier, one can measure the coil current and the voltage drop across the series diode (again as in FIG. 5) and use these measurements to pre-compensate the applied coil voltage with:

$$V_{s\text{-}compensated} = A\sin(\omega t) + V_D + i_{coil}R_{coil}.$$

where $V_D + i_{coil}R_{coil}$ represents an offset voltage added to $A\sin(\omega t)$. As noted earlier, if the compensation term $V_D + i_{coil}R_{coil}$ is slightly too large, one can end up in an unstable flux "runaway" condition where the motor flux increases until the motor material is saturated, and the armature is magnetically clamped to the core face.

Figure 40:
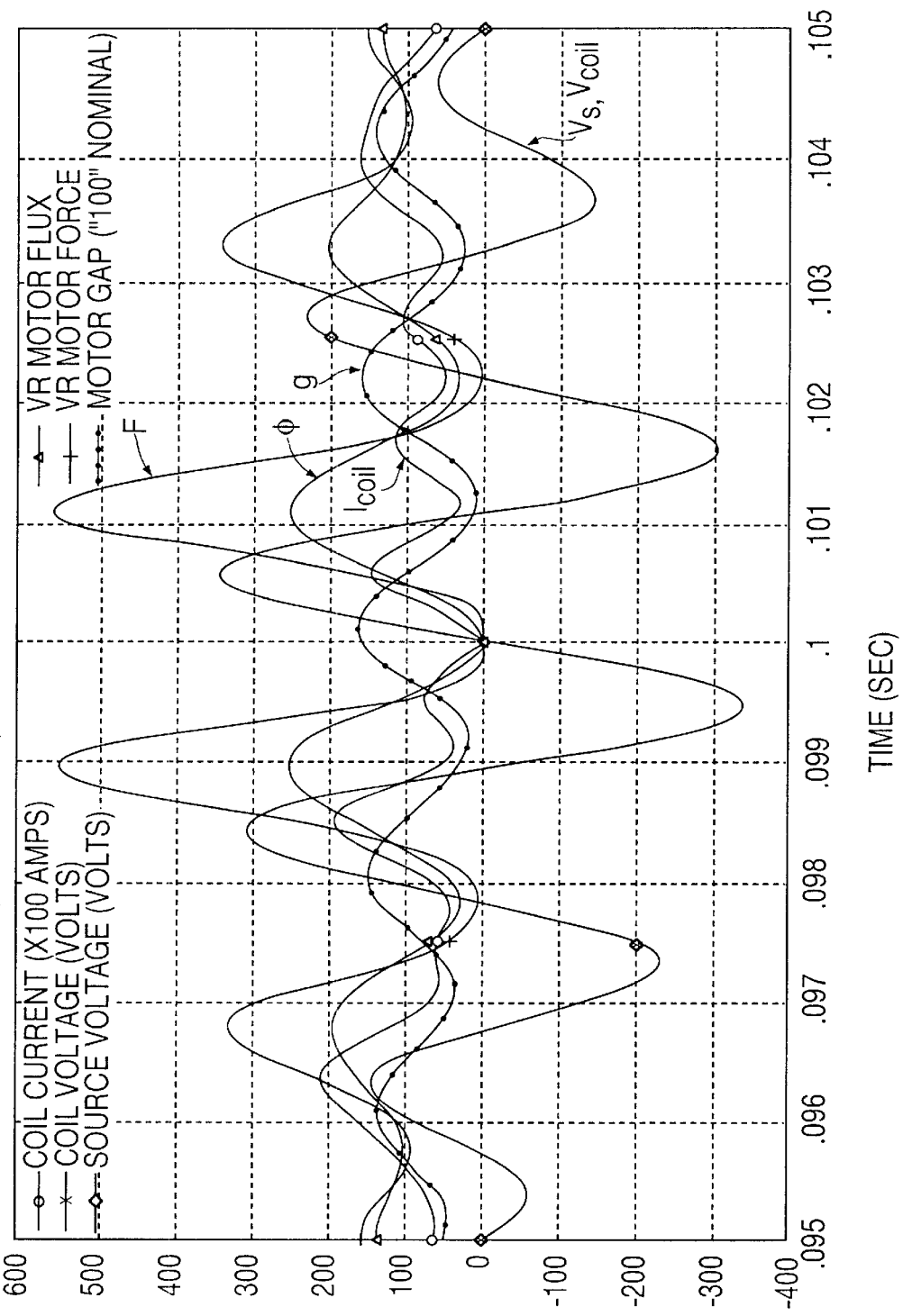
FIG. 40 shows time domain waveforms of two-frequency sinusoidal operation of a typical VR motor coil with 4V offset adjustment, in accordance with an embodiment of the present invention.
Figure 41:
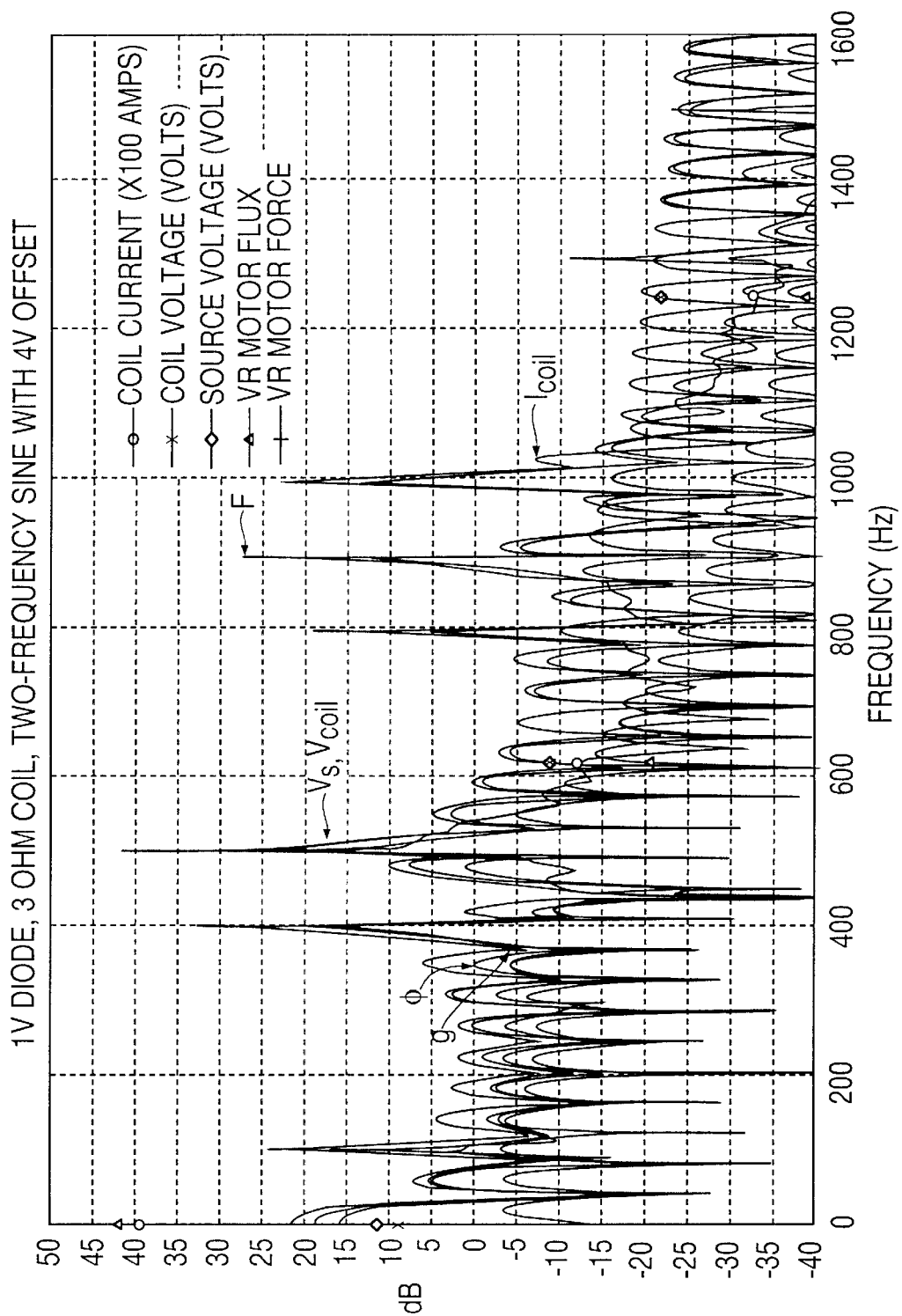
FIG. 41 shows frequency domain waveforms of two-frequency sinusoidal operation of a typical VR motor coil with 4V offset adjustment, in accordance with an embodiment of the present invention.

To implement this sort of compensation in a stable manner, consider the following embodiment of the invention: rather than simply adding $V_D + i_{coil}R_{coil}$ to the drive voltage (and suffering the uncertainties and thermal drifts associated with $V_D$ and $R_{coil}$), implement means by which one can detect the presence of the zero clipping phenomenon discussed above, and slowly adjust the DC component of $V_{s\text{-}compensated}$ until this zero clipping is minimized (but not reduced to zero). By adjusting the feedback circuit so that some minimal amount of zero clipping is still exhibited, one is assured that a flux runaway condition is not present. See FIGS. 40 and 41 for an example of introducing such offset compensation, which is a 4V offset in the shown example.

Figure 10:
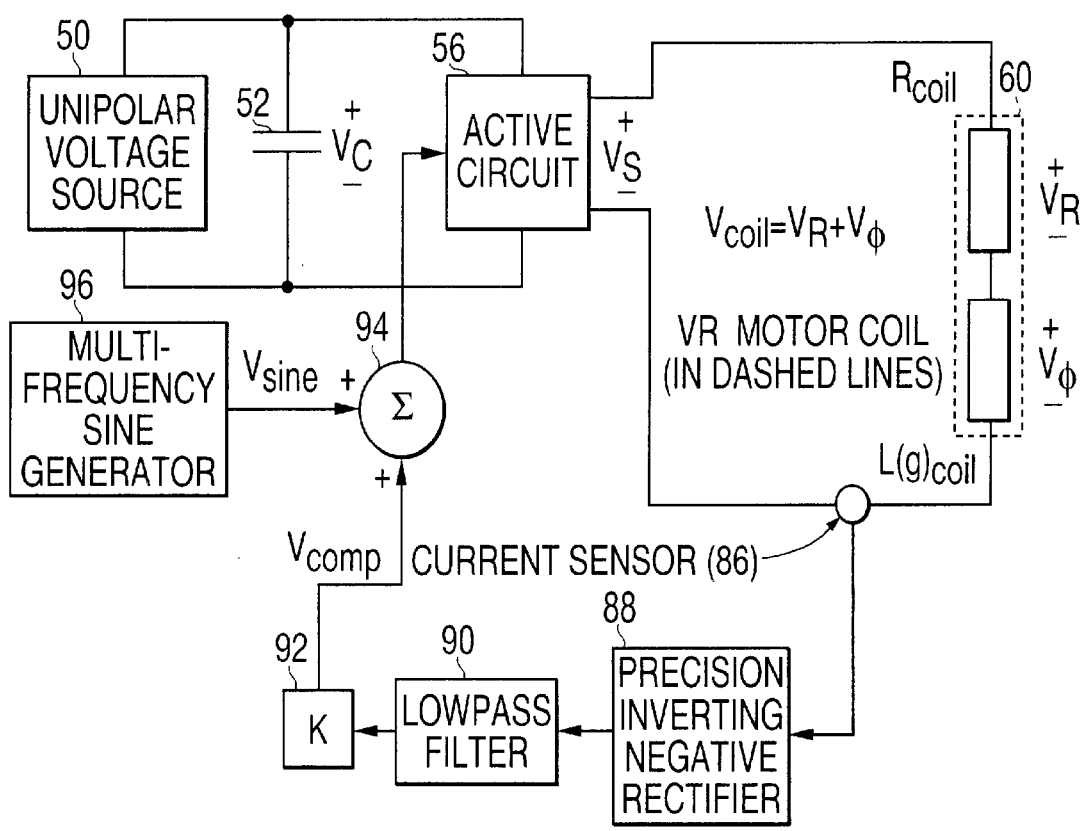
FIG. 10 shows a circuit to implement automatic offset adjustment of a VR motor coil drive voltage, in accordance with an embodiment of the present invention.

Because of the relationship that the flux in an electromagnetic circuit is zero when the current is zero (regardless of the gap length), one can reliably detect flux zero clipping by determining whether or not current zero clipping is present. One implementation of the ninth embodiment of the invention is shown in FIG. 10, where the multi-frequency sine wave signal is generated by multi-frequency sine generator 96. Here, the series diode used to guaranteed positive-only current flow is removed; in this circuit, "positive-only" current flow is maintained via an automatic offset adjusting mechanism. Since, as stated above, the circuit works by minimizing the magnitude of the current pulses that actually go below zero (since the series diode has been removed, such negative pulses are possible), one can simply measure the current waveform via various sensing devices (such as current sensor 86), pass this signal through a precision inverting negative rectifier circuit 88 that removes all except the negative current pulses, then the signal is passed through a low-pass-filter 90, then the signal is gain adjusted using gain adjustment unit 92. The output of the gain adjustment unit 92 is fed back to a summing device 94, so as to adjust the DC output offset voltage generated by the power amplifier. In FIG. 10, the active circuit 56 comprises a bipolar linear or switching amplifier and has as its input the summed $V_{sine}$ and $V_{comp}$ signals from the summing device 94. The continued presence of negative current clipping pulses is required to keep $V_{comp}$ from decaying back towards zero. Thus, the circuit achieves balance between the low pass filter working to reduce the compensation voltage, and the presence of the negative current clipping pulses acting to increase the compensation voltage. One may adjust the gain of the feedback voltage (by gain adjustment unit 92) so that the magnitude of the remaining negative current pulses is very small.

Although the example presented here is for two distinct drive frequencies, this method of compensating the output voltage to correct for the effects of asymmetric slewing works well for single frequency applications as well as for multi-frequency situations (more than two frequencies).

Figure 11:
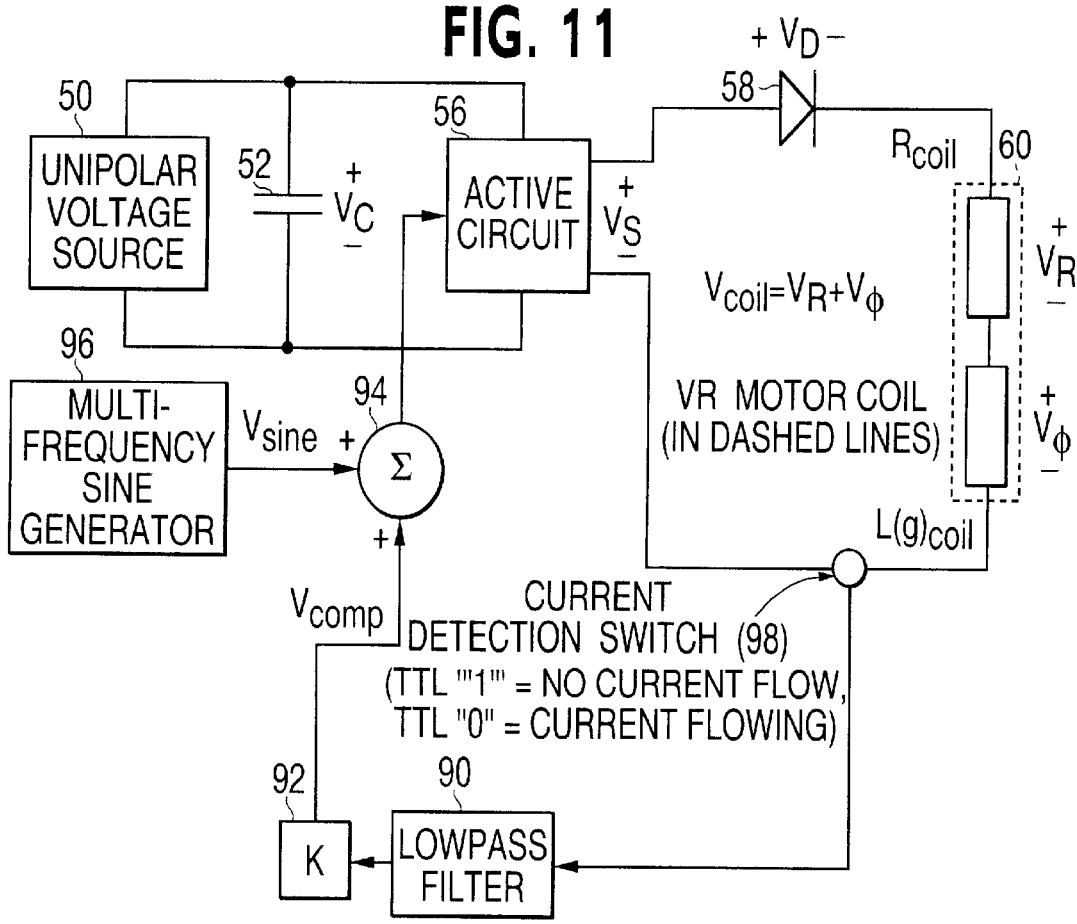
FIG. 11 shows another embodiment of a circuit to implement automatic offset adjustment of a VR motor coil drive voltage.

An additional implementation of the ninth embodiment of the invention is best understood by referring to the circuit in FIG. 11. FIG. 11 shows a scheme for ensuring that the coil current becomes zero at least once per cycle while ensuring that the coil current is unipolar (diode 58 in FIG. 11 prevents the flow of reverse current). In FIG. 11, a diode 58 is inserted in series with the motor coil 60, and a threshold-type current detection switch (or sensor) 98 monitors the current in the motor coil 60. This threshold-type current sensor 98 provides a digital binary output that is high (Boolean true) when no current is flowing in the coil 60, and low (or zero, Boolean false) when current is flowing in the coil 60. In the same manner as discussed above, this signal is filtered via low-pass filter 90 and gain adjusted via gain adjustment unit 92, and the gain-adjusted-and-filtered output is employed to adjust the output offset of the power amplifier so that the peaks of the current signal are repeatedly zero, but for minimal. time. Note that the configuration of FIG. 11 can also be applied to the unipolar output stage shown in FIG. 6.

Figure 12:
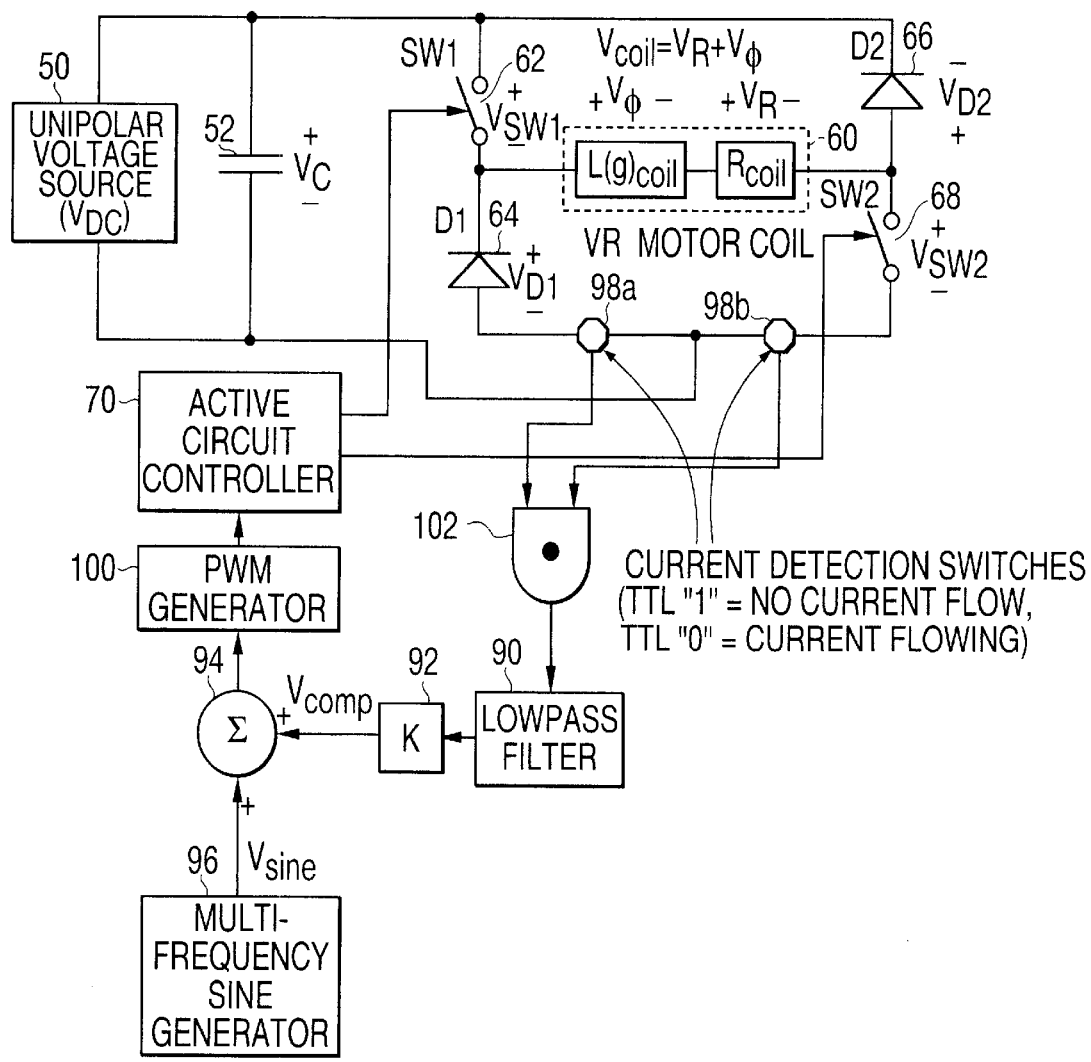
FIG. 12 shows yet another embodiment of a circuit to implement automatic offset adjustment of a VR motor coil drive voltage.

A tenth embodiment that employs threshold current sensors is presented in FIG. 12. Here, threshold current sensors (or current detection switches) 98a and 98b are placed in both bottom legs of a unipolar output bridge (formed by switch SW1 62, switch diode D1 64, diode D2 66 and switch SW2 68 in FIG. 12), the signals from which are combined with a logical AND gate 102 before being filtered by a filter 90 and employed as a feedback source in the manner described above with respect to FIGS. 10 and 11. In FIG. 12, voltage drive for the motor coil 60 is accomplished via PWM generator 100 and the active circuit controller 70 which, in FIG. 12, includes primarily appropriate gate drive circuitry for SW1 62 and SW2 68. Note that a current detection switch (such as 98a or 98b) could be placed in series with motor coil 60, such that an offset adjustment scheme is implemented very similar to that described above for FIG. 11.

The circuits of FIGS. 11 and 12 strictly preclude any negative current from flowing, whereas small amounts of negative current can flow in the circuit of FIG. 10.

Many applications of VR motors require that the ratio between output force amplitude and input command signal be reasonably constant over a certain bandwidth (colloquially, this is described as "flat" response). To the extent that one can compensate for gap variations, flat response is generally regarded as characteristic of most of the current control schemes described in the prior art. Voltage control schemes, including those of the present invention, typically exhibit the strong frequency dependent response function discussed below.

For the VR motors discussed here, the relationship between motor force and motor flux is frequency invariant (this is true for both current and voltage control schemes). However, the relationship between motor coil voltage and motor flux exhibits a strong $1/\omega$ relationship, while the relationship between current and flux is generally flat. Mathematically, this result is obtained when the defining relationship between voltage and flux is transformed into the frequency domain:

$$\phi(t) = \int \frac{v(t) - i(t)R}{N} dt + C$$

$$\phi(t) \simeq \int \frac{v(t)}{N} dt + C \quad \text{(time domain)}$$

$$\Phi(j\omega) \simeq \frac{1}{\omega}\left(\frac{V(j\omega)}{jN}\right) \quad \text{(frequency domain)}$$

Here it is seen that, for a given applied voltage amplitude, the resultant flux (and associated force) decreases for increasing operating frequency.

In applications where the VR motor is expected to receive at the command input a broadband signal (such as white noise or music) and generate a low-distortion force representation of such an input signal, this $1/\omega$ characteristic can prove difficult to compensate. However, in situations such as those described in the present invention, where the input command signal comprises a request for dynamic force at a number of specified discrete frequencies, one can readily pre-compensate the input command signals to account for the $1/\omega$ characteristic of the motor when driven with a voltage control scheme. Such pre-compensation is particularly trivial when the command signals are generated via a microprocessor-based (or other) computer system; here, pre-compensation involves simply multiplying the command amplitude by the ratio of the instantaneous frequency and a selected reference frequency. Such open-loop pre-compensation has been employed in VR motor research and development by the inventor and by others employed with Macrosonix Corp.

Figure 16:
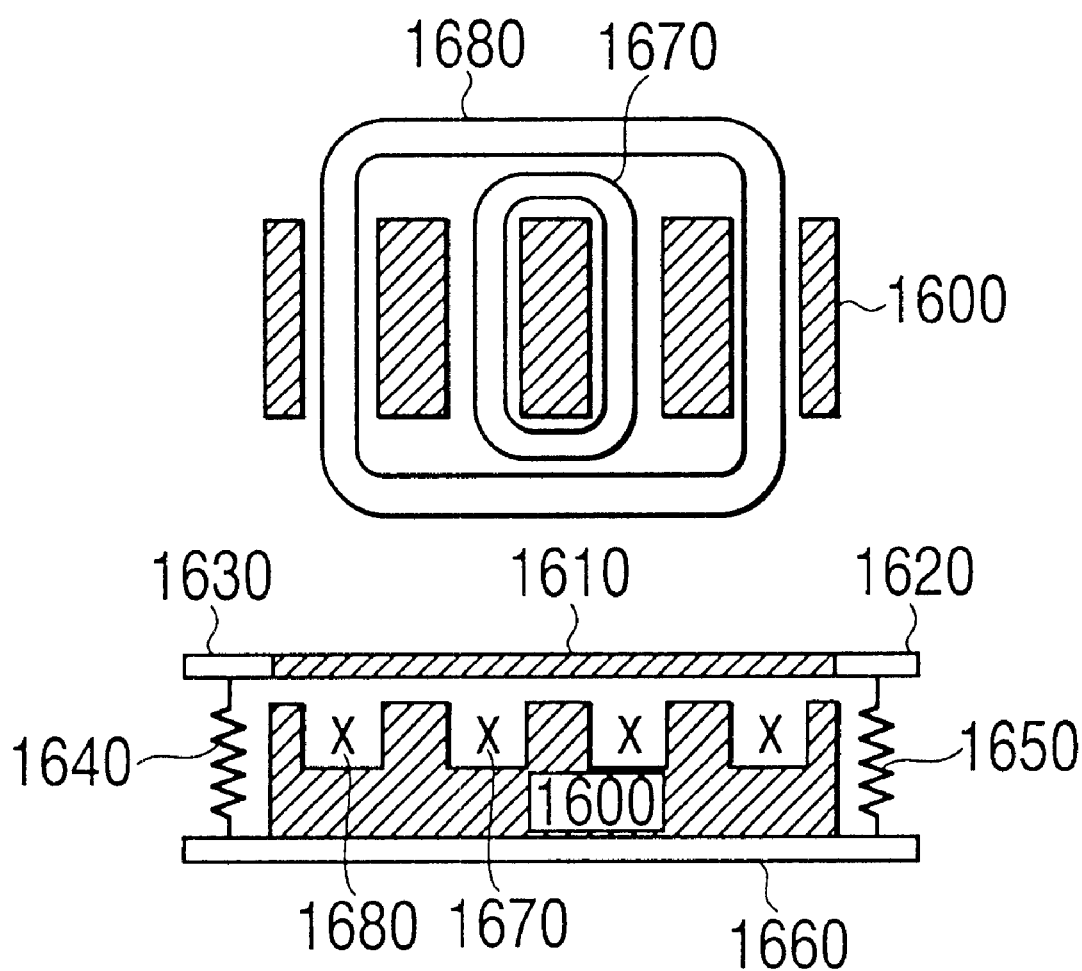
FIG. 16 shows a multiple-coil motor that may be controlled in accordance with any of the embodiments of the present invention.

It will be appreciated by those skilled in the art that the VR motor topologies shown are merely illustrative and do not represent the many shapes and styles of VR motor that are attainable. For example, one could envision motor structure with multiple coils and independent flux paths, each coil independently excited by one embodiment of the present invention. Also, the VR motor could be constructed using a round, axisymmetric topology rather than the "square" topology illustrated here. And, a VR motor can be constructed using an I-E-I topology rather than the E-I-E structure shown in FIG. 2. Such alternate topologies are presented in FIGS. 13 and 14. FIG. 13 shows an IEI motor, and FIG. 14 shows a "round" motor (having annular rings). FIG. 15 shows a spiro-wrap construction technique, whereby a plurality of sheet steel elements are banded together to form the constituent components of a "round" topology motor such as shown in FIG. 13. Also, one could envision a motor structure with multiple coils and independent flux paths, each coil independently excited by one embodiment of the invention. FIG. 16 shows a top and a side view of a multiple coil motor core 1600 (with support structures 1620, 1630, 1660, springs 1640, 1650, coils 1670, 1680, and armature 1610) that may be controlled in accordance with one or more embodiments of the present invention.

In addition, one skilled in the art can envision other circuits and control scheme implementations that, while not described here in detail, fall within the scope of the present invention. For example, one could implement the pulse drive control scheme discussed earlier by first turning off SW2 and then later turning off SW1 (this variation has the current freewheeling phase occur in the upper bridge devices in FIG. 6). Another circuit variation is the Oulton drive circuit which utilizes a split-unipolar power supply in conjunction with ground-referenced motor coils (this circuit uses fewer components, but must experience balanced currents for proper operation). Yet another variation uses a conventional bipolar voltage amplifier and series diode (as in FIG. 5) to implement the pulse drive scheme discussed with FIG. 6.

As various changes could be made in the above embodiments without departing from the spirit scope of the invention, it should be understood that all matter contained in the above description or shown in the accompanying drawings shall be interpreted as illustrative and not in a limiting sense. Furthermore, those skilled in the art will appreciate that other embodiments not described herein are possible, and that these may also fall within the scope of the invention.

For example, the present invention is also applicable to controlling an E-E motor having coils on the armatures, whereby the two coils work together to provide motor movement.

What is claimed is:

1. A method of controlling a VR motor, comprising:
   providing, via an open-loop active circuit, a dynamic voltage to a coil of said motor to result in a substantially unipolar current flowing in the coil, said periodic voltage being applied so as to maintain control of said motor irrespective of instantaneous motor gap and driven load characteristics,
   wherein the VR motor is one of a one-sided motor and a two-sided motor, and wherein the coil is provided on one of a core and an armature of the VR motor.

2. A method of controlling a VR motor that is operable at a plurality of operating frequencies, comprising:
   receiving a signal that includes a plurality of discrete frequencies, as a command input to the VR motor;
   precompensating the command input in accordance with a $1/\omega$ characteristic of the VR motor; and
   generating a low-distortion force representative of the command input,
   wherein the VR motor is one of a one-sided motor and a two-sided motor.

3. A method of controlling a VR motor, comprising:
   providing, via an open-loop active circuit, a bipolar periodic voltage to a coil of said motor to result in a substantially unipolar current flowing in the coil, said periodic voltage being applied so as to maintain control of said motor irrespective of instantaneous motor gap and driven load characteristics, said bi-polar periodic voltage being derived from a uni-polar voltage source,
   wherein the VR motor is one of a one-sided motor and a two-sided motor.

4. A method of controlling a VR motor, comprising:
   providing, via an open-loop active circuit, a dynamic voltage to a coil of said motor to result in a substantially unipolar current flowing in the coil, said periodic voltage being applied so as to maintain control of said motor irrespective of instantaneous motor gap and driven load characteristics;
   generating a voltage by one of a linear and switching unipolar voltage amplifier; and
   offsetting the generated voltage so to minimize an amount of time when zero current is flowing from the unipolar voltage amplifier to said coil of said motor,
   wherein the VR motor has an armature and a core with a linearly varying gap between the armature and the core, and
   wherein said offset voltage is determined as an open-loop value not derived from any feedback source.

5. A method of controlling a VR motor, comprising:
   providing, via an open-loop active circuit, a dynamic voltage to a coil of said motor to result in a substantially unipolar current flowing in the coil, said periodic voltage being applied so as to maintain control of said motor irrespective of instantaneous motor gap and driven load characteristics, wherein said dynamic voltage is generated by a switching voltage amplifier, a switching frequency of said switching voltage amplifier being equal to or greater than a frequency of a dynamic force of said VR motor.

6. A method of controlling a VR motor, comprising:

providing, via an open-loop active circuit, a dynamic voltage to a coil of said motor to result in a substantially unipolar current flowing in the coil, said periodic voltage being applied so as to maintain control of said motor irrespective of instantaneous motor gap and driven load characteristics, wherein said dynamic voltage is maintained at a constant amplitude in spite of variations in the amplitude of the power supply voltage provided to said active circuit, said maintaining accomplished by varying the requested dynamic voltage drive level in a manner out-of-phase with the variations in the amplitude of said power supply voltage.

7. A method of controlling a VR motor, comprising:

providing, via an open-loop active circuit, a dynamic voltage to a coil of said motor to result in a substantially unipolar current flowing in the coil, said periodic voltage being applied so as to maintain control of said motor irrespective of instantaneous motor gap and driven load characteristics, wherein said dynamic voltage includes a series of repeating half-cosine segments, said segments varying from a positive peak of a cosine wave to a negative peak of the cosine wave followed by a step transition back to the positive peak of a cosine wave.

8. A method of controlling a VR motor, comprising:

providing, via an open-loop active circuit, a dynamic voltage to a coil of said motor to result in a substantially unipolar current flowing in the coil, said periodic voltage being applied so as to maintain control of said motor irrespective of instantaneous motor gap and driven load characteristics, wherein said dynamic voltage is a combination of repeating half-cosine segments, said repeating half-cosine segments occurring at multiple discrete frequencies, a waveform for said dynamic voltage being defined by $$V_{dynamic} = \left[\frac{-1}{2\sqrt{\sum_{n=1}^{\# of\ freq}(A_n + A_n\cos(\omega_n t))}}\right]$$

$$\left(N\sum_{n=1}^{\# of\ freq} A_n\omega_n\sin(\omega_n t)\right) + iR,$$

$1 \leq n \leq $ # of frequencies.

9. A method of controlling a VR motor, comprising:

providing, via an open-loop active circuit, a dynamic voltage to a coil of said motor to result in a substantially unipolar current flowing in the coil, said periodic voltage being applied so as to maintain control of said motor irrespective of instantaneous motor gap and driven load characteristics, wherein the VR motor has an armature and a core with a linearly varying gap between the armature and the core, and wherein said dynamic voltage is a cyclical sawtooth waveform.

10. The method according to claim 1, wherein said VR motor is the two-sided motor, and wherein a core circuit of said VR motor comprises:

a forward-biased diode in series with a first core conductive winding;

a reverse-biased diode in series with a second core conductive winding;

means to connect in parallel said forward and said reverse diode-coil series pairs; and means to apply a zero-mean-value dynamic voltage to said paralleled pairs.

11. A method of controlling a VR motor, comprising:

providing, via an open-loop active circuit, a dynamic voltage to a coil of said motor to result in a substantially unipolar current flowing in the coil, said periodic voltage being applied so as to maintain control of said motor irrespective of instantaneous motor gap and driven load characteristics, wherein the VR motor has an armature and a core with a linearly varying gap between the armature and the core, and wherein a core structure of said VR motor includes at least one core assembly, each said core assembly having a plurality of poles, a subset of said plurality of poles being encircled by distinct core conductive windings, said core conductive windings driven by independent means and exciting independent paths of magnetic flux, said windings being driven by one or more distinct frequencies.

12. A method of controlling a VR motor, comprising:

providing, via an open-loop active circuit, a dynamic voltage to a coil of said motor to result in a substantially unipolar current flowing in the coil, said periodic voltage being applied so as to maintain control of said motor irrespective of instantaneous motor gap and driven load characteristics, wherein the VR motor has an armature and a core with a linearly varying gap between the armature and the core, wherein said dynamic voltage follows a waveform:
$v(t) \approx V_{dc}$, $0 \leq t < t_1$ (Phase 1)
$v(t) \approx 0$, $t_1 \leq t < t_2$ (Phase 2)
$v(t) \approx -V_{dc}$, $t_2 \leq t < t_3$ (Phase 3)
$v(t) \approx 0$, $t_3 \leq t < T$ (Phase 4)

with period T, and wherein said time $t_2$ is equal to $T/2+\epsilon$, said time period $\epsilon$ being introduced to compensate for asymmetries in the slewing properties of said core circuit.

13. A method of controlling a VR motor, comprising:

providing, via an open-loop active circuit, a dynamic voltage to a coil of said motor to result in a substantially unipolar current flowing in the coil, said periodic voltage being applied so as to maintain control of said motor irrespective of instantaneous motor gap and driven load characteristics, wherein the VR motor has an armature and a core with a linearly varying gap between the armature and the core, wherein said dynamic voltage follows a waveform:
$v(t) \approx +V_{dc}$, $0 \leq t < t_1$ (Phase 1)
$v(t) \approx 0$, $t_1 \leq t < t_2$ (Phase 2)
$v(t) \approx -V_{dc}$, $t_2 \leq t < t_3$ (Phase 3)
$v(t) \approx 0$, $t_3 \leq t < T$ (Phase 4)

with period T, and wherein during said Phase 1 said v(t) is applied to said core conductive winding via two actively switched electrical devices, during said Phase 2 said v(t) is applied to said core conductive winding via one actively switched electrical device and one passive electrical device, during said Phase 3 said v(t) is applied to a core conductive winding of said VR motor via two passive electrical devices, and during said Phase 4 said v(t) is obtained by virtue of all active and passive electrical devices comprising an amplifier means for outputting said v(t) being in a non-conductive state.

14. A method of controlling a VR motor, comprising:

providing, via an open-loop active circuit, a dynamic voltage to a coil of said motor to result in a substantially unipolar current flowing in the coil, said periodic voltage being applied so as to maintain control of said motor irrespective of instantaneous motor gap and driven load characteristics, wherein the VR motor has an armature and a core with a linearly varying gap between the armature and the core, and wherein said dynamic voltage is generated by switching between two substantially fixed values of substantially equal magnitude and opposite sign at a frequency at least twice that of a highest desired dynamic force, a duty cycle of said switching modulated in such a manner that low frequency components of said dynamic voltage occur at frequencies to generate said dynamic force at desired frequencies.

15. The method according to claim 14, wherein an average duty cycle of said switched voltage waveform is less than or equal to 50%.

16. The method according to claim 14, wherein an average duty cycle of said switched voltage waveform is less than or equal to 50% plus a small offset value.

17. A method of controlling a VR motor, comprising:

providing a dynamic voltage to a coil of said motor so that a substantially unipolar coil current flows in the coil, said periodic voltage being applied so as to maintain control of said motor irrespective of instantaneous motor gap and driven load characteristics;

measuring the current in a core conductive winding of said VR motor; and generating a DC offset voltage that is summed with said applied dynamic voltage such that a time duration and magnitude of excursions of said measured current are minimized.

18. The method according to claim 17, wherein the VR motor is one of a one-sided motor and a two-sided motor.

19. The method according to claim 17, wherein an underdamped, reactive load is coupled to the VR motor.

20. The method according to claim 17, wherein a resonant load is coupled to the VR motor.

21. The method according to claim 19, wherein the load is an acoustic device.

22. A method of generating a substantially sinusoidal flux waveform for a variable reluctance (VR) motor, comprising:

applying a voltage waveform to a coil of the motor, the voltage waveform having a substantially zero mean, the voltage waveform being maintained irrespective as to a change in a size of the gap, wherein no current control with respect to the coil is utilized during operation of the motor, wherein the VR motor has an armature and a core in which the gap linearly varies in size between the armature and the core, wherein the voltage waveform is a periodic signal, and wherein the substantially sinusoidal flux waveform returns to a zero flux value between a cycle time $t_1$ and a cycle time $t_2$ with respect to a start time of each cycle of the substantially sinusoidal flux waveform, wherein $t_1$ corresponds to a time that is just prior to one full cycle of the substantially sinusoidal flux waveform, and $t_2$ corresponds to an end time of the one full cycle, wherein the substantially sinusoidal flux waveform maintains a zero voltage value for at least a fixed portion of each cycle of the substantially sinusoidal flux waveform.

23. A method of generating a substantially sinusoidal flux waveform for a variable reluctance (VR) motor, comprising:

applying a voltage waveform to a coil of the motor, the voltage waveform having a substantially zero mean, the voltage waveform being maintained irrespective as to a change in a size of the gap, wherein no current control with respect to the coil is utilized during operation of the motor, wherein the VR motor has an armature and a core in which the gap linearly varies in size between the armature and the core, and wherein the coil has a fixed resistance value and a fixed voltage value associated therewith, and wherein the voltage waveform has a mean value that is equal to the fixed voltage value.

24. A method of generating a substantially sinusoidal flux waveform for a variable reluctance (VR) motor, comprising:

applying a voltage waveform to a coil of the motor, the voltage waveform having a substantially zero mean, the voltage waveform being maintained irrespective as to a change in a size of the gap, wherein no current control with respect to the coil is utilized during operation of the motor, wherein the VR motor has an armature and a core in which the gap linearly varies in size between the armature and the core, and wherein the coil has a fixed resistance value, the method further comprising:

measuring a current flowing through the coil;

calculating an offset voltage value that is equal to the fixed resistance value multiplied by a value corresponding to the measured current; and offsetting the voltage waveform by the offset voltage value.

25. A method of controlling a variable reluctance (VR) motor, comprising:

applying a substantially zero-mean voltage waveform to a coil of the motor, wherein each cycle of the substantially zero-mean voltage waveform includes:

a first time period in which a first positive voltage value is provided;

a second time period in which a zero voltage value is applied; and a third time period in which a second negative voltage value is applied, wherein an absolute value of the first and second voltage values is substantially equal to each other, and wherein a substantially trapezoidal flux waveform that represents a flux within the gap is obtained as a result.

26. The method according to claim 25, wherein the first, second and third time periods are equal in time duration for said each cycle.

27. A method of controlling a variable reluctance (VR) motor, comprising:

applying a substantially zero-mean voltage waveform to a coil of the motor, wherein each cycle of the substantially zero-mean voltage waveform includes:
a first time period in which a first positive voltage value is provided;
a second time period in which a zero voltage value is applied; and
a third time period in which a second negative voltage value is applied,
wherein an absolute value of the first and second voltage values is substantially equal to each other, and
wherein the first, second and third time periods are unequal in time duration for said each cycle.

28. A method of controlling a multi-frequency variable reluctance motor that operates in at least a first operation frequency and a second operating frequency, comprising:
calculating a sinusoidal voltage to be applied to a coil of the motor, the sinusoidal voltage being calculated as A sin(($\omega$1)t+B sin($\omega$2)t+C, wherein A, B and C are constants; and
applying the sinusoidal voltage to the coil for at least a plurality of cycles of the sinusoidal voltage, the sinusoidal voltage being applied irrespective as to a gap width change between the core and the moving part.

29. The method according to claim 28, further comprising:
measuring a current I flowing through the coil,
wherein C is equal to I*R, R being a resistance of the coil, and
wherein C corresponds to a DC offset to be added to the sinusoidal voltage.

30. A control apparatus for a two-sided variable reluctance motor that has an armature and a stationary part with a first coil on the core and a second coil on the core, and with a first air gap between the first coil and the armature and a second air gap between the second coil and the armature, the control apparatus comprising:
a voltage source that provides a voltage waveform to the first and second coils;
a first diode that is provided between the voltage source and the first coil; and
a second diode that is provided between the voltage source and the second coil,
wherein an anode of the first diode and a cathode of the second diode are directly connected to the first and second coils, respectively.

31. The control apparatus according to claim 30, further comprising:
a capacitor disposed between the first coil and the voltage source, the capacitor also being disposed between the second coil and the voltage source,
wherein the capacitor provides a resonant voltage boost to a voltage output from the voltage source to the first and second coils.

32. A control apparatus for a variable reluctance motor that has a core with a coil and an armature, comprising:
an offset voltage source for providing a DC offset voltage;
a voltage source for outputting a sinusoidal voltage to the coil that is offset by the DC offset voltage;
a current sensing unit for sensing current presently passing through the coil;
a rectifying circuit that removes all portions of the sensed current except for negative current pulses; and
a low-pass filter that filters and output of the rectifying circuit,
wherein an output of the low-pass filter is provided to the offset voltage source to provide an adjustment signal to either increase, decrease or maintain a current value of the DC offset voltage.

33. The control apparatus according to claim 32, wherein the DC offset voltage is increased when the negative current pulses are above a fixed threshold level.

34. The control apparatus according to claim 32, wherein the current sensing unit is a current detection switch that outputs a binary value indicative as to whether or not current is flowing through the coil.

35. A method of controlling a VR motor, comprising:
providing, via an open-loop active circuit, a dynamic voltage to a coil of said motor to result in a substantially unipolar current flowing in the coil, said periodic voltage being applied so as to maintain control of said motor irrespective of instantaneous motor gap and driven load characteristics,
wherein the VR motor has an armature and a core with a linearly varying gap between the armature and the core,
wherein a first diode and a first switch are connected in series to each other on a first path,
wherein a second diode and a second switch are connected in series to each other on a second path,
wherein the first and second paths are connected in parallel to each other, and
wherein the dynamic voltage is provided across the first and second paths.

36. The method according to claim 35, wherein the coil of the motor is coupled between the a first point on the first path between the first switch and the first diode, and a second point on the second path between the second switch and the second diode.

37. The method according to claim 35, wherein the dynamic voltage is provided by a unipolar voltage source.

38. The method according to claim 35, wherein an active circuit controller provides control signals to control the first and second switches.

39. A method of controlling a variable reluctance (VR) motor, comprising:
applying a substantially zero-mean voltage waveform to a coil of the motor,
wherein each cycle of the substantially zero-mean voltage waveform includes:
a first time period in which a first positive voltage value is provided;
a second time period in which a zero voltage value is applied; and
a third time period in which a second negative voltage value is applied,
wherein an absolute value of the first and second voltage values is substantially equal to each other,
wherein the VR motor has an armature and a core with a linearly varying gap between the armature and the core, and
wherein the third time period occurs between the first time period and the second time period.

40. The method according to claim 27, wherein the third time period occurs between the first time period and the second time period.

41. The method according to claim 3, wherein the VR motor is a two-sided motor in which offset-sinusoidal flux waveforms are phased such that even harmonic terms cancel each other out.

* * * * *